(12) United States Patent
Puri et al.

(10) Patent No.: US 9,912,958 B2
(45) Date of Patent: Mar. 6, 2018

(54) CONTENT ADAPTIVE MOTION COMPENSATED PRECISION PREDICTION FOR NEXT GENERATION VIDEO CODING

(71) Applicant: Intel Corporation, Santa Clara, CA (US)

(72) Inventors: Atul Puri, Redmond, WA (US); Neelesh N. Gokhale, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 451 days.

(21) Appl. No.: 14/334,063

(22) Filed: Jul. 17, 2014

(65) Prior Publication Data
US 2014/0362921 A1 Dec. 11, 2014

Related U.S. Application Data

(63) Continuation-in-part of application No. PCT/US2013/078114, filed on Dec. 27, 2013, and a continuation-in-part of application No. PCT/US2013/069960, filed on Nov. 13, 2013.
(Continued)

(51) Int. Cl.
*H04N 19/44* (2014.01)
*H04N 19/176* (2014.01)
(Continued)

(52) U.S. Cl.
CPC ........... *H04N 19/44* (2014.11); *H04N 19/105* (2014.11); *H04N 19/119* (2014.11); *H04N 19/12* (2014.11);
(Continued)

(58) Field of Classification Search
None
See application file for complete search history.

(56) References Cited

U.S. PATENT DOCUMENTS

2004/0240550 A1* 12/2004 Suzuki .................. H04N 19/56
375/240.16
2005/0053134 A1* 3/2005 Holcomb ............... H04N 19/70
375/240.12

(Continued)

*Primary Examiner* — Christopher S Kelley
*Assistant Examiner* — Kaitlin A Retallick
(74) *Attorney, Agent, or Firm* — Jordan IP Law, LLC

(57) ABSTRACT

Techniques related to adaptive precision and filtering motion compensation for video coding may include, for example, determining, via a motion compensated filtering predictor module, a motion compensation prediction precision associated with at least a portion of a current picture being decoded, where the motion compensation prediction precision comprises at least one of a quarter pel precision or an eighth pel precision. Predicted pixel data of a predicted partition associated with a prediction partition of the current picture may be generated, via the motion compensated filtering predictor module, by filtering a portion of a decoded reference picture based at least in part on the motion compensation prediction precision. Prediction partitioning indicators associated with the prediction partition and a motion vector indicating a positional difference between the prediction partition and an associated partition of the decoded reference picture may be coded, via an entropy encoder, into a bitstream.

21 Claims, 32 Drawing Sheets

Related U.S. Application Data

(60) Provisional application No. 61/758,314, filed on Jan. 30, 2013, provisional application No. 61/725,576, filed on Nov. 13, 2012.

(51) Int. Cl.

| | | |
|---|---|---|
| *H04N 19/119* | (2014.01) | |
| *H04N 19/147* | (2014.01) | |
| *H04N 19/46* | (2014.01) | |
| *H04N 19/122* | (2014.01) | |
| *H04N 19/136* | (2014.01) | |
| *H04N 19/82* | (2014.01) | |
| *H04N 19/85* | (2014.01) | |
| *H04N 19/12* | (2014.01) | |
| *H04N 19/172* | (2014.01) | |
| *H04N 19/513* | (2014.01) | |
| *H04N 19/61* | (2014.01) | |
| *H04N 19/91* | (2014.01) | |
| *H04N 19/573* | (2014.01) | |
| *H04N 19/105* | (2014.01) | |
| *H04N 19/139* | (2014.01) | |
| *H04N 19/527* | (2014.01) | |

(52) U.S. Cl.
CPC ......... *H04N 19/122* (2014.11); *H04N 19/136* (2014.11); *H04N 19/139* (2014.11); *H04N 19/147* (2014.11); *H04N 19/172* (2014.11); *H04N 19/176* (2014.11); *H04N 19/46* (2014.11); *H04N 19/513* (2014.11); *H04N 19/527* (2014.11); *H04N 19/573* (2014.11); *H04N 19/61* (2014.11); *H04N 19/82* (2014.11); *H04N 19/85* (2014.11); *H04N 19/91* (2014.11)

(56) References Cited

U.S. PATENT DOCUMENTS

| | | | |
|---|---|---|---|
| 2008/0089420 A1* | 4/2008 | Karczewicz | H04N 19/13 375/240.18 |
| 2010/0086048 A1* | 4/2010 | Ishtiaq | H04N 19/105 375/240.16 |
| 2011/0206125 A1* | 8/2011 | Chien | H04N 19/52 375/240.16 |
| 2011/0243233 A1* | 10/2011 | Alshina | H04N 19/523 375/240.16 |
| 2011/0249745 A1* | 10/2011 | Chen | H04N 19/105 375/240.16 |
| 2012/0008686 A1* | 1/2012 | Haskell | H04N 19/105 375/240.16 |
| 2012/0229602 A1* | 9/2012 | Chen | H04N 19/597 348/43 |
| 2013/0003849 A1* | 1/2013 | Chien | H04N 19/13 375/240.16 |
| 2013/0039417 A1* | 2/2013 | Wang | H04N 19/176 375/240.12 |

\* cited by examiner

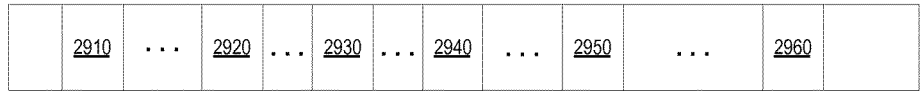
2900   FIG. 29
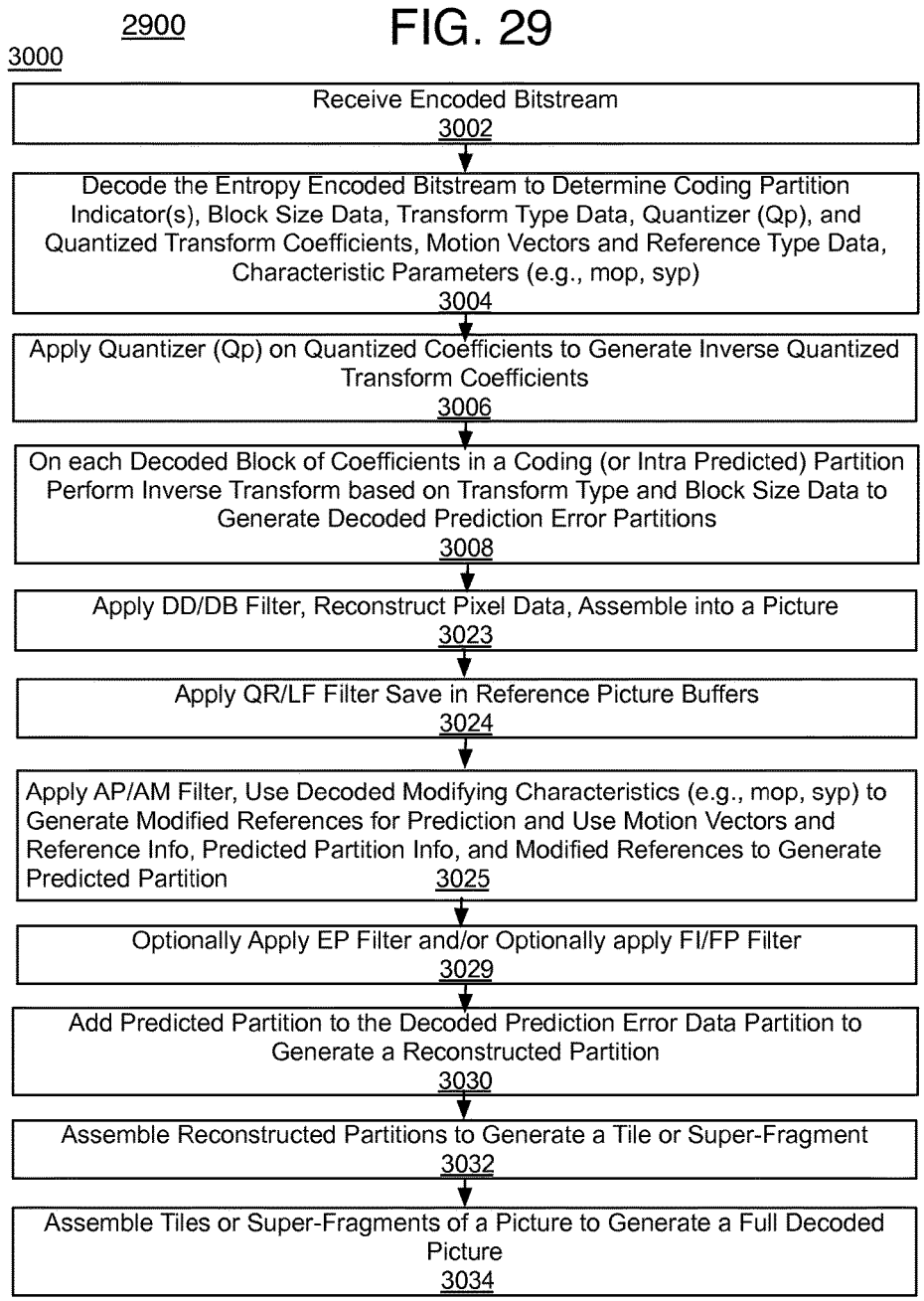
FIG. 30

3200

DETERMINE MOTION COMPENSATION PREDICTION PRECISION ASSOCIATED WITH AT LEAST A PORTION OF A CURRENT PICTURE BEING DECODED
3202

↓

GENERATE PREDICTED PIXEL DATA OF A PREDICTED PARTITION ASSOCIATED WITH A PREDICTION PARTITION OF THE CURRENT PICTURE
3204

↓

CODE PREDICTION PARTITIONING INDICATORS ASSOCIATED WITH THE PREDICTION PARTITION AND A MOTION VECTOR INDICATING A POSITIONAL DIFFERENCE BETWEEN THE PREDICTION PARTITION AND AN ASSOCIATED PARTITION OF THE DECODED REFERENCE PICTURE
3206

```
┌─────────────────────────────────────────────────────────────────┐
│ DECODE AN ENCODED BITSTREAM TO DETERMINE PREDICTION             │
│ PARTITIONING INDICATORS, A PLURALITY OF MOTION VECTORS, AND A   │
│ PLURALITY OF PREDICTION ERROR DATA PARTITIONS                   │
│                             3302                                │
└─────────────────────────────────────────────────────────────────┘
                                  ↓
┌─────────────────────────────────────────────────────────────────┐
│ DETERMINE A PREDICTION PARTITION OF THE CURRENT PICTURE BASED   │
│ ON THE PREDICTION PARTITIONING INDICATORS                       │
│                             3304                                │
└─────────────────────────────────────────────────────────────────┘
                                  ↓
┌─────────────────────────────────────────────────────────────────┐
│ DETERMINE A MOTION COMPENSATION PREDICTION PRECISION            │
│ ASSOCIATED WITH AT LEAST A PORTION OF A CURRENT PICTURE BEING   │
│ DECODED                                                         │
│                             3306                                │
└─────────────────────────────────────────────────────────────────┘
                                  ↓
┌─────────────────────────────────────────────────────────────────┐
│ GENERATE PREDICTED PIXEL DATA OF A PREDICTED PARTITION          │
│ ASSOCIATED WITH THE PREDICTION PARTITION OF THE CURRENT         │
│ PICTURE BY THE VIDEO DECODER                                    │
│                             3308                                │
└─────────────────────────────────────────────────────────────────┘
                                  ↓
┌─────────────────────────────────────────────────────────────────┐
│ ADD THE PREDICTED PIXEL DATA OF THE DECODED PREDICTED           │
│ PARTITION TO A PREDICTION ERROR DATA PARTITION OF THE PLURALITY │
│ OF PREDICTION ERROR DATA PARTITIONS                             │
│                             3310                                │
└─────────────────────────────────────────────────────────────────┘
                                  ↓
┌─────────────────────────────────────────────────────────────────┐
│ ADD THE FIRST RECONSTRUCTED PARTITION AND A SECOND              │
│ RECONSTRUCTED PARTITION TO GENERATE A RECONSTRUCTED TILE OR     │
│ SUPER-FRAGMENT                                                  │
│                             3312                                │
└─────────────────────────────────────────────────────────────────┘
                                  ↓
┌─────────────────────────────────────────────────────────────────┐
│ APPLY A DEBLOCK FILTER TO THE RECONSTRUCTED TILE OR SUPER-      │
│ FRAGMENT TO GENERATE A FIRST FINAL RECONSTRUCTED TILE OR        │
│ SUPER-FRAGMENT                                                  │
│                             3314                                │
└─────────────────────────────────────────────────────────────────┘
                                  ↓
┌─────────────────────────────────────────────────────────────────┐
│ ASSEMBLE THE FIRST FINAL RECONSTRUCTED TILE OR SUPER-           │
│ FRAGMENT AND A SECOND FINAL RECONSTRUCTED TILE OR SUPER-        │
│ FRAGMENT TO GENERATE A FINAL RECONSTRUCTED VIDEO FRAME          │
│                             3316                                │
└─────────────────────────────────────────────────────────────────┘
                                  ↓
┌─────────────────────────────────────────────────────────────────┐
│ TRANSMIT THE FINAL RECONSTRUCTED VIDEO FRAME FOR                │
│ PRESENTMENT                                                     │
│                             3318                                │
└─────────────────────────────────────────────────────────────────┘
```

FIG. 33

CONTENT ADAPTIVE MOTION COMPENSATED PRECISION PREDICTION FOR NEXT GENERATION VIDEO CODING

RELATED APPLICATIONS

The present application is a continuation-in-part of international application no. PCT/US2013/078114, filed 27 Dec. 2013, which in turn claims the benefit of U.S. Provisional Application No. 61/758,314 filed 30 Jan. 2013; the present application also is a continuation-in-part of PCT/US13/69960 filed 13 Nov. 2013, which in turn claims the benefit of U.S. Provisional Application No. 61/725,576 filed 13 Nov. 2012 as well as U.S. Provisional Application No. 61/758,314 filed 30 Jan. 2013"; the contents of which are expressly incorporated herein in their entirety.

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). HEVC is being developed in response to the previous H.264/AVC (Advanced Video Coding) standard not providing enough compression for evolving higher resolution video applications. Similar to previous video coding standards, HEVC includes basic functional modules such as intra/inter prediction, transform, quantization, in-loop filtering, and entropy coding.

The ongoing HEVC standard may attempt to improve on limitations of the H.264/AVC standard such as limited choices for allowed prediction partitions and coding partitions, limited allowed multiple references and prediction generation, limited transform block sizes and actual transforms, limited mechanisms for reducing coding artifacts, and inefficient entropy encoding techniques. However, the ongoing HEVC standard may use iterative approaches to solving such problems.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

The present description, developed within the context of a Next Generation Video (NGV) codec project, addresses the general problem of designing an advanced video codec that maximizes the achievable compression efficiency while remaining sufficiently practical for implementation on devices. For instance, with ever increasing resolution of video and expectation of high video quality due to availability of good displays, the corresponding bitrate/bandwidth required using existing video coding standards such as earlier MPEG standards and even the more recent H.264/AVC standard, is relatively high. H.264/AVC was not perceived to be providing high enough compression for evolving higher resolution video applications.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 29 illustrates an example bitstream;

FIG. 30 is a flow diagram illustrating an example decoding process;

FIG. 32 is a flow diagram illustrating an example video encoding process;

FIG. 33 is a flow diagram illustrating an example video decoding process;

DETAILED DESCRIPTION

Figure 1:
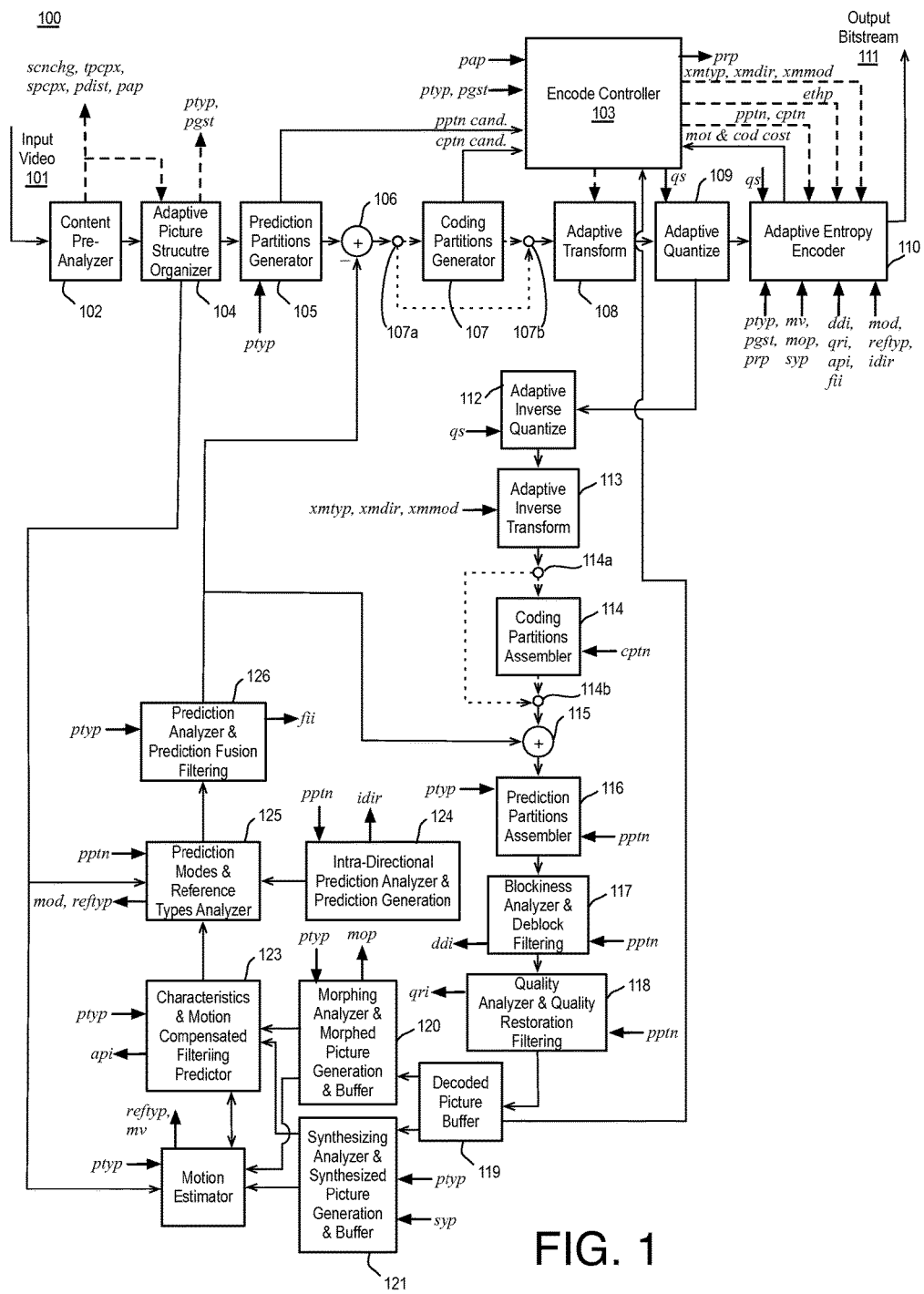
FIG. 1 is an illustrative diagram of an example next generation video encoder.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.); and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to adaptive precision and filtering motion compensation for video coding.

As discussed above, there are several reasons why HEVC standard's filtering subsystem, while a good step forward, may not be sufficient for getting full gains from filtering. For example, the H.264/AVC coding standard while it represents improvement over past MPEG standards, it is still very limiting in choices of prediction due to the following reasons: the choices for allowed prediction partitions are very limited; Motion Compensated filtering prediction uses a fixed filter regardless of the content or motion; and the accuracy of motion compensation is limited regardless of content or motion.

Standards based video coding approaches typically tend to squeeze higher gains by adaptations and fine tuning of legacy approaches. For instance, all standards based approaches heavily rely on adapting and further tweaking of motion compensated interframe coding as the primary means to reduce prediction differences to achieve gains.

Conversely, the approach(es) described in this disclosure, in addition to exploiting interframe differences due to motion, also may exploit other types of interframe differences (e.g., gain, blur, registration) that naturally exist in typical video scenes, as well as prediction benefits of frames synthesized from past decoded frames only or a combination of past and future decoded frames. In, the approach(es) described in this disclosure the synthesized frames may be used for prediction include Dominant Motion Compensated (DMC) frames, Super Resolution (SR) frames, and/or PI (Projected Interpolation) frames. Motion Compensation in, the approach(es) described in this disclosure can thus be applied not only on actual decoded frames, morphed versions of decoded frames, or frames synthesized from decoded frames.

Standards based video coding approaches typically tend to use motion filtering for motion compensation at sub pixel accuracy however the sub pixel precision is constant and the filters are constant.

Conversely, the approach(es) described in this disclosure may allow for selection of motion compensation precision and filters for better content adaptive coding.

As will be described in greater detail below, the approach(es) described in this disclosure differ from standards based approaches as they may naturally incorporates significant content based adaptivity in video coding process to achieve higher compression. The approach(es) described in this disclosure address the problems of designing a new video coding scheme that maximizes compression efficiency while remaining practical for implementation on devices. Specifically, the approach(es) described in this disclosure introduce adaptive precision and adaptive filtering motion compensation, an advanced technique for interframe prediction that improves motion prediction, reducing prediction error and thus improving the overall video coding efficiency.

For example, the approach(es) described in this disclosure is directed generally to the generation of improved motion compensated prediction. In some implementations, generation of improved motion compensated prediction may be accomplished by using adaptive motion compensation precision (between ¼, and ⅛ pel) without excessive overhead of precision selection as well as use of adaptive rather than fixed filters for motion compensation.

As used herein, the term "coder" may refer to an encoder and/or a decoder. Similarly, as used herein, the term "coding" may refer to performing video encoding via an encoder and/or performing video decoding via a decoder. For example, a video encoder and video decoder may both be examples of coders capable of coding video data. In addition, as used herein, the term "codec" may refer to any process, program or set of operations, such as, for example, any combination of software, firmware, and/or hardware that may implement an encoder and/or a decoder. Further, as used herein, the phrase "video data" may refer to any type of data associated with video coding such as, for example, video frames, image data, encoded bit stream data, or the like.

FIG. 1 is an illustrative diagram of an example next generation video encoder 100, arranged in accordance with at least some implementations of the present disclosure. As shown, encoder 100 may receive input video 101. Input video 101 may include any suitable input video for encoding such as, for example, input frames of a video sequence. As shown, input video 101 may be received via a content pre-analyzer module 102. Content pre-analyzer module 102 may be configured to perform analysis of the content of video frames of input video 101 to determine various types of parameters for improving video coding efficiency and speed performance. For example, content pre-analyzer module 102 may determine horizontal and vertical gradient information (e.g., Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation, or the like. The parameters generated by content pre-analyzer module 102 may be used by encoder 100 (e.g., via encode controller 103) and/or quantized and communicated to a decoder. As shown, video frames and/or other data may be transmitted from content pre-analyzer module 102 to adaptive picture organizer module 104, which may determine the picture type (e.g., I-, P-, or F/B-picture) of each video frame and reorder the video frames as needed. In some examples, adaptive picture organizer module 104 may include a frame portion generator configured to generate frame portions. In some examples, content pre-analyzer module 102 and adaptive picture organizer module 104 may together be considered a pre-analyzer subsystem of encoder 100.

As shown, video frames and/or other data may be transmitted from adaptive picture organizer module 104 to prediction partitions generator module 105. In some examples, prediction partitions generator module 105 may divide a frame or picture into tiles or super-fragments or the like. In some examples, an additional module (e.g., between modules 104 and 105) may be provided for dividing a frame or picture into tiles or super-fragments. Prediction partitions generator module 105 may divide each tile or super-fragment into potential prediction partitionings or partitions. In some examples, the potential prediction partitionings may be determined using a partitioning technique such as, for example, a k-d tree partitioning technique, a bi-tree partitioning technique, or the like, which may be determined based on the picture type (e.g., I-, P-, or F/B-picture) of individual video frames, a characteristic of the frame portion being partitioned, or the like. In some examples, the determined potential prediction partitionings may be partitions for prediction (e.g., inter- or intra-prediction) and may be described as prediction partitions or prediction blocks or the like.

In some examples, a selected prediction partitioning (e.g., prediction partitions) may be determined from the potential prediction partitionings. For example, the selected prediction partitioning may be based on determining, for each potential prediction partitioning, predictions using characteristics and motion based multi-reference predictions or intra-predictions, and determining prediction parameters. For each potential prediction partitioning, a potential prediction error may be determined by differencing original pixels with prediction pixels and the selected prediction partitioning may be the potential prediction partitioning with the minimum prediction error. In other examples, the selected prediction partitioning may be determined based on a rate distortion optimization including a weighted scoring based on number of bits for coding the partitioning and a prediction error associated with the prediction partitioning.

As shown, the original pixels of the selected prediction partitioning (e.g., prediction partitions of a current frame) may be differenced with predicted partitions (e.g., a prediction of the prediction partition of the current frame based on a reference frame or frames and other predictive data such as inter- or intra-prediction data) at differencer 106. The determination of the predicted partitions will be described further below and may include a decode loop as shown in FIG. 1. Any residuals or residual data (e.g., partition prediction error data) from the differencing may be transmitted to coding partitions generator module 107. In some examples, such as for intra-prediction of prediction partitions in any picture type (I-, F/B- or P-pictures), coding partitions generator module 107 may be bypassed via switches 107a and 107b. In such examples, only a single level of partitioning may be performed. Such partitioning may be described as prediction partitioning (as discussed) or coding partitioning or both. In various examples, such partitioning may be performed via prediction partitions generator module 105 (as discussed) or, as is discussed further herein, such partitioning may be performed via a k-d tree intra-prediction/coding partitioner module or a bi-tree intra-prediction/coding partitioner module implemented via coding partitions generator module 107.

In some examples, the partition prediction error data, if any, may not be significant enough to warrant encoding. In other examples, where it may be desirable to encode the partition prediction error data and the partition prediction error data is associated with inter-prediction or the like, coding partitions generator module 107 may determine coding partitions of the prediction partitions. In some examples, coding partitions generator module 107 may not be needed as the partition may be encoded without coding partitioning (e.g., as shown via the bypass path available via switches 107a and 107b). With or without coding partitioning, the partition prediction error data (which may subsequently be described as coding partitions in either event)

may be transmitted to adaptive transform module 108 in the event the residuals or residual data require encoding. In some examples, prediction partitions generator module 105 and coding partitions generator module 107 may together be considered a partitioner subsystem of encoder 100. In various examples, coding partitions generator module 107 may operate on partition prediction error data, original pixel data, residual data, or wavelet data.

Coding partitions generator module 107 may generate potential coding partitionings (e.g., coding partitions) of, for example, partition prediction error data using bi-tree and/or k-d tree partitioning techniques or the like. In some examples, the potential coding partitions may be transformed using adaptive or fixed transforms with various block sizes via adaptive transform module 108 and a selected coding partitioning and selected transforms (e.g., adaptive or fixed) may be determined based on a rate distortion optimization or other basis. In some examples, the selected coding partitioning and/or the selected transform(s) may be determined based on a predetermined selection method based on coding partitions size or the like.

For example, adaptive transform module 108 may include a first portion or component for performing a parametric transform to allow locally optimal transform coding of small to medium size blocks and a second portion or component for performing globally stable, low overhead transform coding using a fixed transform, such as a discrete cosine transform (DCT) or a picture based transform from a variety of transforms, including parametric transforms, or any other configuration as is discussed further herein. In some examples, for locally optimal transform coding a Parametric Haar Transform (PHT) may be performed, as is discussed further herein. In some examples, transforms may be performed on 2D blocks of rectangular sizes between about 4×4 pixels and 64×64 pixels, with actual sizes depending on a number of factors such as whether the transformed data is luma or chroma, or inter or intra, or if the determined transform used is PHT or DCT or the like.

As shown, the resultant transform coefficients may be transmitted to adaptive quantize module 109. Adaptive quantize module 109 may quantize the resultant transform coefficients. Further, any data associated with a parametric transform, as needed, may be transmitted to either adaptive quantize module 109 (if quantization is desired) or adaptive entropy encoder module 110. Also as shown in FIG. 1, the quantized coefficients may be scanned and transmitted to adaptive entropy encoder module 110. Adaptive entropy encoder module 110 may entropy encode the quantized coefficients and include them in output bitstream 111. In some examples, adaptive transform module 108 and adaptive quantize module 109 may together be considered a transform encoder subsystem of encoder 100.

As also shown in FIG. 1, encoder 100 includes a local decode loop. The local decode loop may begin at adaptive inverse quantize module 112. Adaptive inverse quantize module 112 may be configured to perform the opposite operation(s) of adaptive quantize module 109 such that an inverse scan may be performed and quantized coefficients may be de-scaled to determine transform coefficients. Such an adaptive quantize operation may be lossy, for example. As shown, the transform coefficients may be transmitted to an adaptive inverse transform module 113. Adaptive inverse transform module 113 may perform the inverse transform as that performed by adaptive transform module 108, for example, to generate residuals or residual values or partition prediction error data (or original data or wavelet data, as discussed) associated with coding partitions. In some examples, adaptive inverse quantize module 112 and adaptive inverse transform module 113 may together be considered a transform decoder subsystem of encoder 100.

As shown, the partition prediction error data (or the like) may be transmitted to optional coding partitions assembler 114. Coding partitions assembler 114 may assemble coding partitions into decoded prediction partitions as needed (as shown, in some examples, coding partitions assembler 114 may be skipped via switches 114a and 114b such that decoded prediction partitions may have been generated at adaptive inverse transform module 113) to generate prediction partitions of prediction error data or decoded residual prediction partitions or the like.

As shown, the decoded residual prediction partitions may be added to predicted partitions (e.g., prediction pixel data) at adder 115 to generate reconstructed prediction partitions. The reconstructed prediction partitions may be transmitted to prediction partitions assembler 116. Prediction partitions assembler 116 may assemble the reconstructed prediction partitions to generate reconstructed tiles or super-fragments. In some examples, coding partitions assembler module 114 and prediction partitions assembler module 116 may together be considered an un-partitioner subsystem of encoder 100.

The reconstructed tiles or super-fragments may be transmitted to blockiness analyzer and deblock filtering module 117. Blockiness analyzer and deblock filtering module 117 may deblock and dither the reconstructed tiles or super-fragments (or prediction partitions of tiles or super-fragments). The generated deblock and dither filter parameters may be used for the current filter operation and/or coded in output bitstream 111 for use by a decoder, for example. The output of blockiness analyzer and deblock filtering module 117 may be transmitted to a quality analyzer and quality restoration filtering module 118. Quality analyzer and quality restoration filtering module 118 may determine QR filtering parameters (e.g., for a QR decomposition) and use the determined parameters for filtering. The QR filtering parameters may also be coded in output bitstream 111 for use by a decoder. As shown, the output of quality analyzer and quality restoration filtering module 118 may be transmitted to decoded picture buffer 119. In some examples, the output of quality analyzer and quality restoration filtering module 118 may be a final reconstructed frame that may be used for prediction for coding other frames (e.g., the final reconstructed frame may be a reference frame or the like). In some examples, blockiness analyzer and deblock filtering module 117 and quality analyzer and quality restoration filtering module 118 may together be considered a filtering subsystem of encoder 100.

In encoder 100, prediction operations may include inter- and/or intra-prediction. As shown in FIG. 1, inter-prediction may be performed by one or more modules including morphing analyzer and morphed picture generation module 120, synthesizing analyzer and generation module 121, and characteristics and motion filtering predictor module 123. Morphing analyzer and morphed picture generation module 120 may analyze a current picture to determine parameters for changes in gain, changes in dominant motion, changes in registration, and changes in blur with respect to a reference frame or frames with which it may be coded. The determined morphing parameters may be quantized/de-quantized and used (e.g., by morphing analyzer and morphed picture generation module 120) to generate morphed reference frames that that may be used by motion estimator module 122 for computing motion vectors for efficient motion (and characteristics) compensated prediction of a current frame.

Synthesizing analyzer and generation module 121 may generate super resolution (SR) pictures and projected interpolation (PI) pictures or the like for motion for determining motion vectors for efficient motion compensated prediction in these frames.

Motion estimator module 122 may generate motion vector data based on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion compensated filtering predictor module 123 may apply motion compensation as part of the local decode loop as discussed.

Intra-prediction may be performed by intra-directional prediction analyzer and prediction generation module 124. Intra-directional prediction analyzer and prediction generation module 124 may be configured to perform spatial directional prediction and may use decoded neighboring partitions. In some examples, both the determination of direction and generation of prediction may be performed by intra-directional prediction analyzer and prediction generation module 124. In some examples, intra-directional prediction analyzer and prediction generation module 124 may be considered an intra-prediction module.

As shown in FIG. 1, prediction modes and reference types analyzer module 125 may allow for selection of prediction modes from among, "skip", "auto", "inter", "split", "multi", and "intra", for each prediction partition of a tile (or super-fragment), all of which may apply to P- and F/B-pictures. In addition to prediction modes, it also allows for selection of reference types that can be different depending on "inter" or "multi" mode, as well as for P- and F/B-pictures. The prediction signal at the output of prediction modes and reference types analyzer module 125 may be filtered by prediction analyzer and prediction fusion filtering module 126. Prediction analyzer and prediction fusion filtering module 126 may determine parameters (e.g., filtering coefficients, frequency, overhead) to use for filtering and may perform the filtering. In some examples, filtering the prediction signal may fuse different types of signals representing different modes (e.g., intra, inter, multi, split, skip, and auto). In some examples, intra-prediction signals may be different than all other types of inter-prediction signal(s) such that proper filtering may greatly enhance coding efficiency. In some examples, the filtering parameters may be encoded in output bitstream 111 for use by a decoder. The filtered prediction signal may provide the second input (e.g., prediction partition(s)) to differencer 106, as discussed above, that may determine the prediction difference signal (e.g., partition prediction error) for coding discussed earlier. Further, the same filtered prediction signal may provide the second input to adder 115, also as discussed above. As discussed, output bitstream 111 may provide an efficiently encoded bitstream for use by a decoder for the presentment of video.

FIG. 1 illustrates example control signals associated with operation of video encoder 100, where the following abbreviations may represent the associated information:

scnchg Scene change information
  spcpx Spatial complexity information
  tpcpx Temporal complexity information
  pdist Temporal prediction distance information
  pap Pre Analysis parameters (placeholder for all other pre analysis parameters except scnchg, spcpx, tpcpx, pdist)
  ptyp Picture types information
  pgst Picture group structure information
  pptn cand. Prediction partitioning candidates
  cptn cand. Coding Partitioning Candidates
  prp Preprocessing
  xmtyp Transform type information
  xmdir Transform direction information
  xmmod Transform mode
  ethp One eighth (1/8th) pel motion prediction
  pptn Prediction Partitioning
  cptn Coding Partitioning
  mot&cod cost Motion and Coding Cost
  qs quantizer information set (includes Quantizer parameter (Qp), Quantizer matrix (QM) choice)
  mv Motion vectors
  mop Morphing Paramters
  syp Synthesizing Parameters
  ddi Deblock and dither information
  qri Quality Restoration filtering index/information
  api Adaptive Precision filtering index/information
  fii Fusion Filtering index/information
  mod Mode information
  reftyp Reference type information
  idir Intra Prediction Direction The various signals and data items that may need to be sent to the decoder, ie, pgst, ptyp, prp, pptn, cptn, modes, reftype, ethp, xmtyp, xmdir, xmmod, idir, mv, qs, mop, syp, ddi, qri, apt, fii, quant coefficients and others may then be entropy encoded by adaptive entropy encoder 110 that may include different entropy coders collectively referred to as an entropy encoder subsystem. While these control signals are illustrated as being associated with specific example functional modules of encoder 100 in FIG. 1, other implementations may include a different distribution of control signals among the functional modules of encoder 300. The present disclosure is not limited in this regard and, in various examples, implementation of the control signals herein may include the undertaking of only a subset of the specific example control signals shown, additional control signals, and/or in a different arrangement than illustrated.

Figure 2:
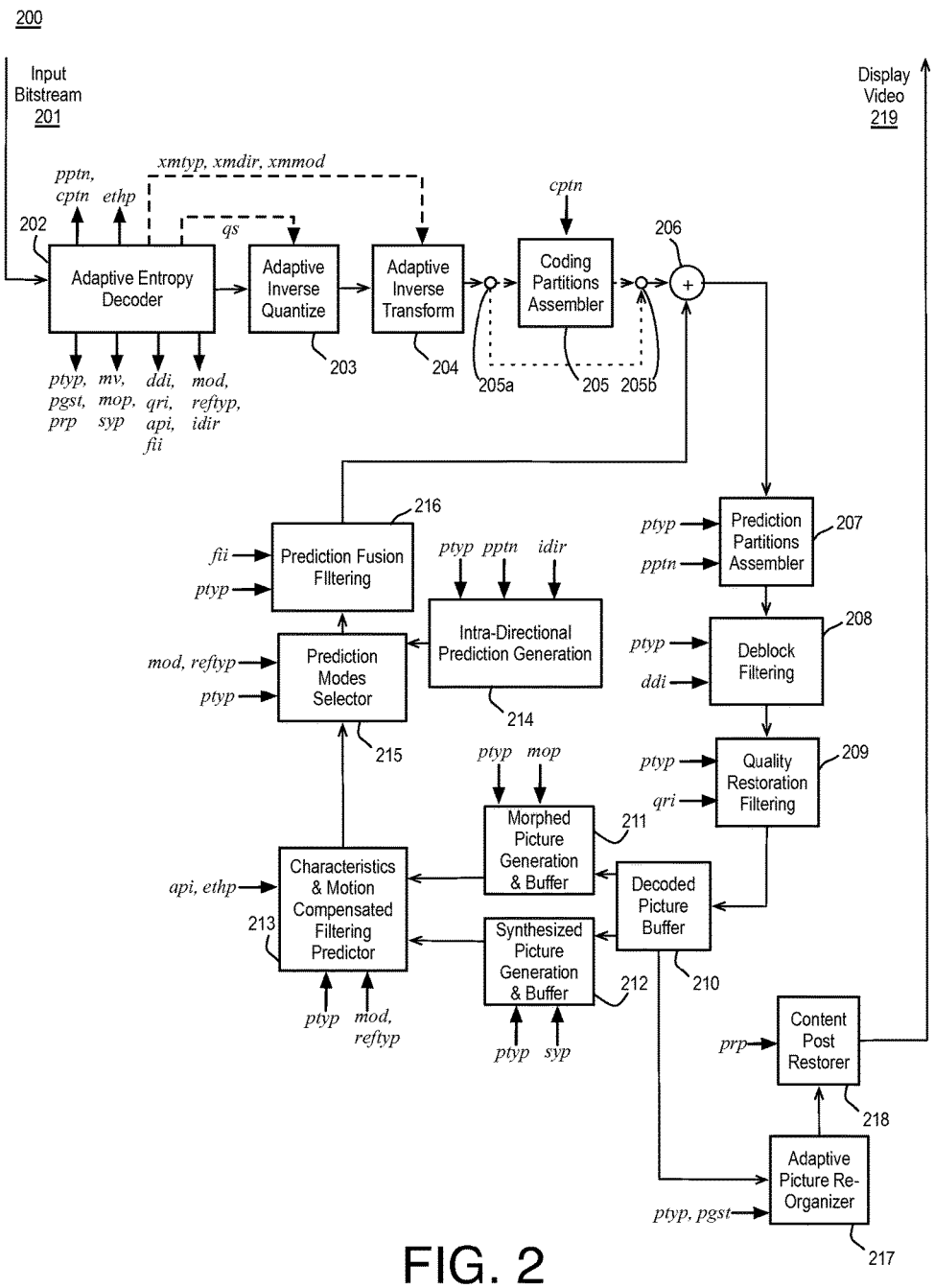
FIG. 2 is an illustrative diagram of an example next generation video decoder.

FIG. 2 is an illustrative diagram of an example next generation video decoder 200, arranged in accordance with at least some implementations of the present disclosure. As shown, decoder 200 may receive an input bitstream 201. In some examples, input bitstream 201 may be encoded via encoder 100 and/or via the encoding techniques discussed herein. As shown, input bitstream 201 may be received by an adaptive entropy decoder module 202. Adaptive entropy decoder module 202 may decode the various types of encoded data (e.g., overhead, motion vectors, transform coefficients, etc.). In some examples, adaptive entropy decoder 202 may use a variable length decoding technique. In some examples, adaptive entropy decoder 202 may perform the inverse operation(s) of adaptive entropy encoder module 110 discussed above.

The decoded data may be transmitted to adaptive inverse quantize module 203. Adaptive inverse quantize module 203 may be configured to inverse scan and de-scale quantized coefficients to determine transform coefficients. Such an adaptive quantize operation may be lossy, for example. In some examples, adaptive inverse quantize module 203 may be configured to perform the opposite operation of adaptive quantize module 109 (e.g., substantially the same operations as adaptive inverse quantize module 112). As shown, the transform coefficients (and, in some examples, transform data for use in a parametric transform) may be transmitted to an adaptive inverse transform module 204. Adaptive inverse transform module 204 may perform an inverse transform on the transform coefficients to generate residuals or residual values or partition prediction error data (or original data or wavelet data) associated with coding partitions. In some examples, adaptive inverse transform module 204 may be configured to perform the opposite operation of adaptive transform module 108 (e.g., substantially the same operations as adaptive inverse transform module 113). In some examples, adaptive inverse transform module 204 may perform an inverse transform based on other previously decoded data, such as, for example, decoded neighboring partitions. In some examples, adaptive inverse quantize module 203 and adaptive inverse transform module 204 may together be considered a transform decoder subsystem of decoder 200.

As shown, the residuals or residual values or partition prediction error data may be transmitted to coding partitions assembler 205. Coding partitions assembler 205 may assemble coding partitions into decoded prediction partitions as needed (as shown, in some examples, coding partitions assembler 205 may be skipped via switches 205a and 205b such that decoded prediction partitions may have been generated at adaptive inverse transform module 204). The decoded prediction partitions of prediction error data (e.g., prediction partition residuals) may be added to predicted partitions (e.g., prediction pixel data) at adder 206 to generate reconstructed prediction partitions. The reconstructed prediction partitions may be transmitted to prediction partitions assembler 207. Prediction partitions assembler 207 may assemble the reconstructed prediction partitions to generate reconstructed tiles or super-fragments. In some examples, coding partitions assembler module 205 and prediction partitions assembler module 207 may together be considered an un-partitioner subsystem of decoder 200.

The reconstructed tiles or super-fragments may be transmitted to deblock filtering module 208. Deblock filtering module 208 may deblock and dither the reconstructed tiles or super-fragments (or prediction partitions of tiles or super-fragments). The generated deblock and dither filter parameters may be determined from input bitstream 201, for example. The output of deblock filtering module 208 may be transmitted to a quality restoration filtering module 209. Quality restoration filtering module 209 may apply quality filtering based on QR parameters, which may be determined from input bitstream 201, for example. As shown in FIG. 2, the output of quality restoration filtering module 209 may be transmitted to decoded picture buffer 210. In some examples, the output of quality restoration filtering module 209 may be a final reconstructed frame that may be used for prediction for coding other frames (e.g., the final reconstructed frame may be a reference frame or the like). In some examples, deblock filtering module 208 and quality restoration filtering module 209 may together be considered a filtering subsystem of decoder 200.

As discussed, compensation due to prediction operations may include inter- and/or intra-prediction compensation. As shown, inter-prediction compensation may be performed by one or more modules including morphing generation module 211, synthesizing generation module 212, and characteristics and motion compensated filtering predictor module 213. Morphing generation module 211 may use de-quantized morphing parameters (e.g., determined from input bitstream 201) to generate morphed reference frames. Synthesizing generation module 212 may generate super resolution (SR) pictures and projected interpolation (PI) pictures or the like based on parameters determined from input bitstream 201. If inter-prediction is applied, characteristics and motion compensated filtering predictor module 213 may apply motion compensation based on the received frames and motion vector data or the like in input bitstream 201.

Intra-prediction compensation may be performed by intra-directional prediction generation module 214. Intra-directional prediction generation module 214 may be configured to perform spatial directional prediction and may use decoded neighboring partitions according to intra-prediction data in input bitstream 201.

As shown in FIG. 2, prediction modes selector module 215 may determine a prediction mode selection from among, "skip", "auto", "inter", "multi", and "intra", for each prediction partition of a tile, all of which may apply to P- and FB-pictures, based on mode selection data in input bitstream 201. In addition to prediction modes, it also allows for selection of reference types that can be different depending on "inter" or "multi" mode, as well as for P- and F/B-pictures. The prediction signal at the output of prediction modes selector module 215 may be filtered by prediction fusion filtering module 216. Prediction fusion filtering module 216 may perform filtering based on parameters (e.g., filtering coefficients, frequency, overhead) determined via input bitstream 201. In some examples, filtering the prediction signal may fuse different types of signals representing different modes (e.g., intra, inter, multi, skip, and auto). In some examples, intra-prediction signals may be different than all other types of inter-prediction signal(s) such that proper filtering may greatly enhance coding efficiency. The filtered prediction signal may provide the second input (e.g., prediction partition(s)) to differencer 206, as discussed above.

As discussed, the output of quality restoration filtering module 209 may be a final reconstructed frame. Final reconstructed frames may be transmitted to an adaptive picture re-organizer 217, which may re-order or re-organize frames as needed based on ordering parameters in input bitstream 201. Re-ordered frames may be transmitted to content post-restorer module 218. Content post-restorer module 218 may be an optional module configured to perform further improvement of perceptual quality of the decoded video. The improvement processing may be performed in response to quality improvement parameters in input bitstream 201 or it may be performed as standalone operation. In some examples, content post-restorer module 218 may apply parameters to improve quality such as, for example, an estimation of film grain noise or residual blockiness reduction (e.g., even after the deblocking operations discussed with respect to deblock filtering module 208). As shown, decoder 200 may provide display video 219, which may be configured for display via a display device (not shown).

FIG. 2 illustrates example control signals associated with operation of video decoder 200, where the indicated abbreviations may represent similar information as discussed with respect to FIG. 1 above. While these control signals are illustrated as being associated with specific example functional modules of decoder 200 in FIG. 2, other implementations may include a different distribution of control signals among the functional modules of encoder 100. The present disclosure is not limited in this regard and, in various examples, implementation of the control signals herein may include the undertaking of only a subset of the specific example control signals shown, additional control signals, and/or in a different arrangement than illustrated.

While FIGS. 1 through 2 illustrate particular encoding and decoding modules, various other coding modules or components not depicted may also be utilized in accordance with the present disclosure. Further, the present disclosure is not limited to the particular components illustrated in FIGS. 1 and 2 and/or to the manner in which the various components are arranged. Various components of the systems described herein may be implemented in software, firmware, and/or hardware and/or any combination thereof. For example, various components of encoder 100 and/or decoder 200 may be provided, at least in part, by hardware of a computing System-on-a-Chip (SoC) such as may be found in a computing system such as, for example, a mobile phone.

Further, it may be recognized that encoder 100 may be associated with and/or provided by a content provider system including, for example, a video content server system, and that output bitstream 111 may be transmitted or conveyed to decoders such as, for example, decoder 200 by various communications components and/or systems such as transceivers, antennae, network systems, and the like not depicted in FIGS. 1 and 2. It may also be recognized that decoder 200 may be associated with a client system such as a computing device (e.g., a desktop computer, laptop computer, tablet computer, convertible laptop, mobile phone, or the like) that is remote to encoder 100 and that receives input bitstream 201 via various communications components and/or systems such as transceivers, antennae, network systems, and the like not depicted in FIGS. 1 and 2. Therefore, in various implementations, encoder 100 and decoder subsystem 200 may be implemented either together or independent of one another.

Figure 3A:
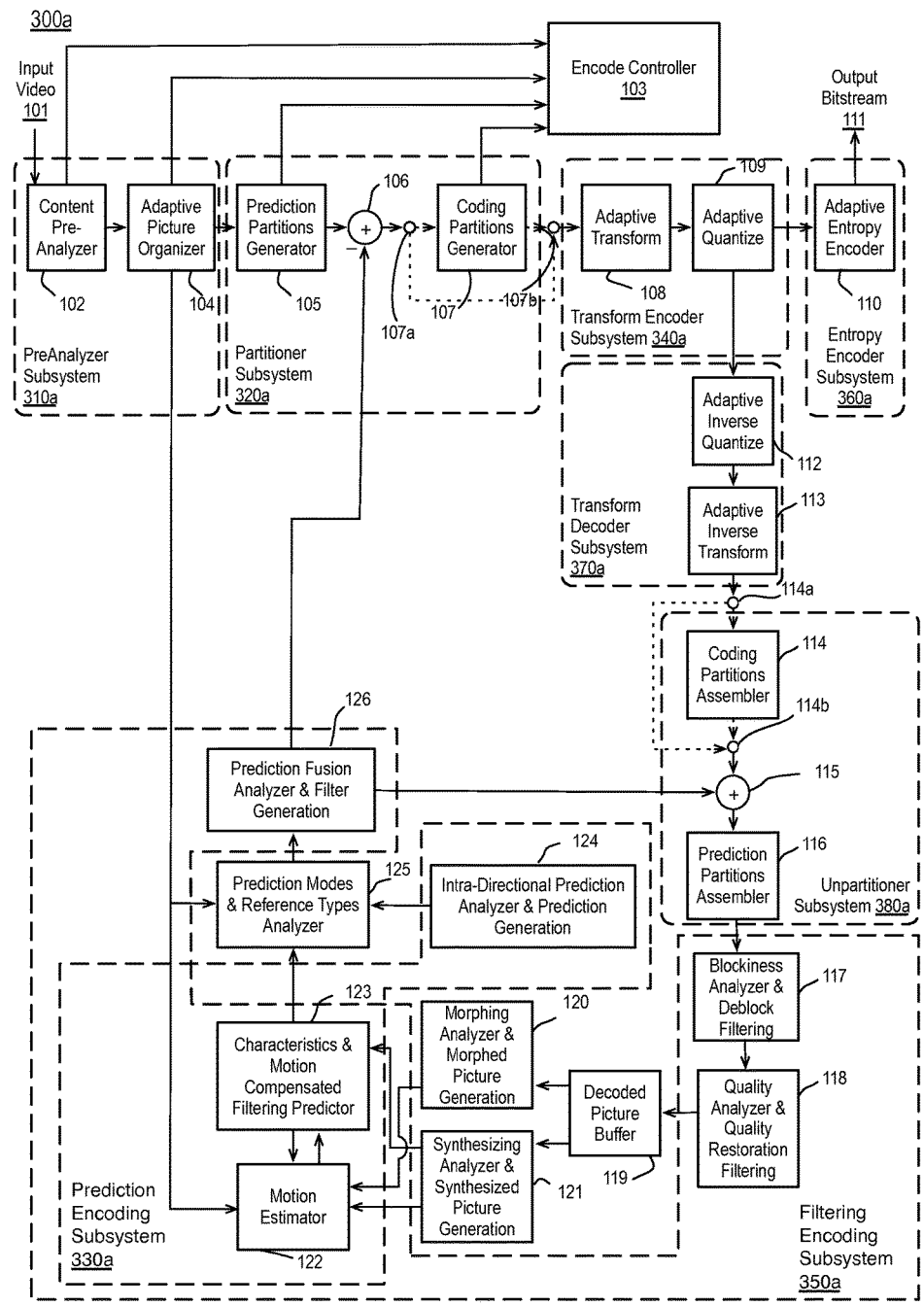
FIG. 3(a) is an illustrative diagram of an example next generation video encoder and subsystems.

FIG. 3(a) is an illustrative diagram of an example next generation video encoder 300a, arranged in accordance with at least some implementations of the present disclosure. FIG. 3(a) presents a similar encoder to that shown in FIG. 1, and similar elements will not be repeated for the sake of brevity. As shown in FIG. 3(a), encoder 300a may include preanalyzer subsystem 310a, partitioner subsystem 320a, prediction encoding subsystem 330a, transform encoder subsystem 340a, filtering encoding subsystem 350a, entropy encoder system 360a, transform decoder subsystem 370a, and/or unpartitioner subsystem 380a. Preanalyzer subsystem 310a may include content pre-analyzer module 102 and/or adaptive picture organizer module 104. Partitioner subsystem 320a may include prediction partitions generator module 105, and/or coding partitions generator 107. Prediction encoding subsystem 330a may include motion estimator module 122, characteristics and motion compensated filtering predictor module 123, and/or intra-directional prediction analyzer and prediction generation module 124. Transform encoder subsystem 340a may include adaptive transform module 108 and/or adaptive quantize module 109. Filtering encoding subsystem 350a may include blockiness analyzer and deblock filtering module 117, quality analyzer and quality restoration filtering module 118, motion estimator module 122, characteristics and motion compensated filtering predictor module 123, and/or prediction analyzer and prediction fusion filtering module 126. Entropy coding subsystem 360a may include adaptive entropy encoder module 110. Transform decoder subsystem 370a may include adaptive inverse quantize module 112 and/or adaptive inverse transform module 113. Unpartitioner subsystem 380a may include coding partitions assembler 114 and/or prediction partitions assembler 116.

Partitioner subsystem 320a of encoder 300a may include two partitioning subsystems: prediction partitions generator module 105 that may perform analysis and partitioning for prediction, and coding partitions generator module 107 that may perform analysis and partitioning for coding. Another partitioning method may include adaptive picture organizer 104 which may segment pictures into regions or slices may also be optionally considered as being part of this partitioner.

Prediction encoder subsystem 330a of encoder 300a may include motion estimator 122 and characteristics and motion compensated filtering predictor 123 that may perform analysis and prediction of "inter" signal, and intra-directional prediction analyzer and prediction generation module 124 that may perform analysis and prediction of "intra" signal. Motion estimator 122 and characteristics and motion compensated filtering predictor 123 may allow for increasing predictability by first compensating for other sources of differences (such as gain, global motion, registration), followed by actual motion compensation. They may also allow for use of data modeling to create synthesized frames (super resolution, and projection) that may allow better predictions, followed by use of actual motion compensation in such frames.

Transform encoder subsystem 340a of encoder 300a may perform analysis to select the type and size of transform and may include two major types of components. The first type of component may allow for using parametric transform to allow locally optimal transform coding of small to medium size blocks; such coding however may require some overhead. The second type of component may allow globally stable, low overhead coding using a generic/fixed transform such as the DCT, or a picture based transform from a choice of small number of transforms including parametric transforms. For locally adaptive transform coding, PHT (Parametric Haar Transform) may be used. Transforms may be performed on 2D blocks of rectangular sizes between 4×4 and 64×64, with actual sizes that may depend on a number of factors such as if the transformed data is luma or chroma, inter or intra, and if the transform used is PHT or DCT. The resulting transform coefficients may be quantized, scanned and entropy coded.

Entropy encoder subsystem 360a of encoder 300a may include a number of efficient but low complexity components each with the goal of efficiently coding a specific type of data (various types of overhead, motion vectors, or transform coefficients). Components of this subsystem may belong to a generic class of low complexity variable length coding techniques, however, for efficient coding, each component may be custom optimized for highest efficiency. For instance, a custom solution may be designed for coding of "Coded/Not Coded" data, another for "Modes and Ref Types" data, yet another for "Motion Vector" data, and yet another one for "Prediction and Coding Partitions" data. Finally, because a very large portion of data to be entropy coded is "transform coefficient" data, multiple approaches for efficient handling of specific block sizes, as well as an algorithm that may adapt between multiple tables may be used.

Filtering encoder subsystem 350a of encoder 300a may perform analysis of parameters as well as multiple filtering of the reconstructed pictures based on these parameters, and may include several subsystems. For example, a first subsystem, blockiness analyzer and deblock filtering module 117 may deblock and dither to reduce or mask any potential block coding artifacts. A second example subsystem, quality analyzer and quality restoration filtering module 118, may perform general quality restoration to reduce the artifacts due to quantization operation in any video coding. A third example subsystem, which may include motion estimator 122 and characteristics and motion compensated filtering predictor module 123, may improve results from motion compensation by using a filter that adapts to the motion characteristics (motion speed/degree of blurriness) of the content. A fourth example subsystem, prediction fusion analyzer and filter generation module 126, may allow adaptive filtering of the prediction signal (which may reduce spurious artifacts in prediction, often from intra prediction) thereby reducing the prediction error which needs to be coded.

Encode controller module 103 of encoder 300a may be responsible for overall video quality under the constraints of given resources and desired encoding speed. For instance, in full RDO (Rate Distortion Optimization) based coding without using any shortcuts, the encoding speed for software encoding may be simply a consequence of computing resources (speed of processor, number of processors, hyper-threading, DDR3 memory etc.) availability. In such case, encode controller module 103 may be input every single combination of prediction partitions and coding partitions and by actual encoding, and the bitrate may be calculated along with reconstructed error for each case and, based on lagrangian optimization equations, the best set of prediction and coding partitions may be sent for each tile of each frame being coded. The full RDO based mode may result in best compression efficiency and may also be the slowest encoding mode. By using content analysis parameters from content preanalyzer module 102 and using them to make RDO simplification (not test all possible cases) or only pass a certain percentage of the blocks through full RDO, quality versus speed tradeoffs may be made allowing speedier encoding. Up to now we have described a variable bitrate (VBR) based encoder operation. Encode controller module 103 may also include a rate controller that can be invoked in case of constant bitrate (CBR) controlled coding.

Lastly, preanalyzer subsystem 310a of encoder 300a may perform analysis of content to compute various types of parameters useful for improving video coding efficiency and speed performance. For instance, it may compute horizontal and vertical gradient information (Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation etc. The parameters generated by preanalyzer subsystem 310a may either be consumed by the encoder or be quantized and communicated to decoder 200.

While subsystems 310a through 380a are illustrated as being associated with specific example functional modules of encoder 300a in FIG. 3(a), other implementations of encoder 300a herein may include a different distribution of the functional modules of encoder 300a among subsystems 310a through 380a. The present disclosure is not limited in this regard and, in various examples, implementation of the example subsystems 310a through 380a herein may include the undertaking of only a subset of the specific example functional modules of encoder 300a shown, additional functional modules, and/or in a different arrangement than illustrated.

Figure 3B:
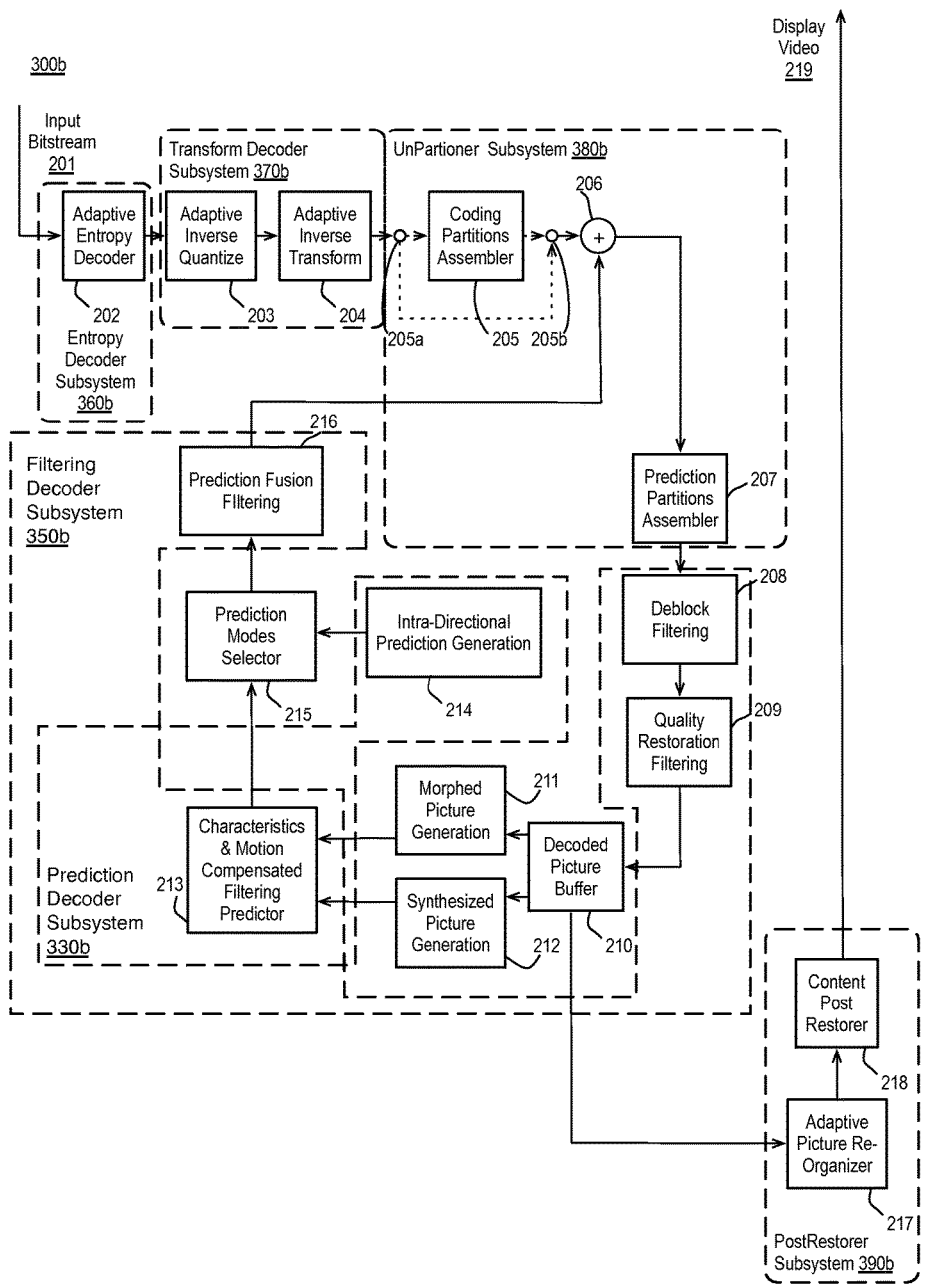
FIG. 3(b) is an illustrative diagram of an example next generation video decoder and subsystems.

FIG. 3(b) is an illustrative diagram of an example next generation video decoder 300b, arranged in accordance with at least some implementations of the present disclosure. FIG. 3(b) presents a similar decoder to that shown in FIG. 2, and similar elements will not be repeated for the sake of brevity. As shown in FIG. 3(b), decoder 300b may include prediction decoder subsystem 330b, filtering decoder subsystem 350b, entropy decoder subsystem 360b, transform decoder subsystem 370b, unpartitioner_2 subsystem 380b, unpartitioner_1 subsystem 351b, filtering decoder subsystem 350b, and/or postrestorer subsystem 390b. Prediction decoder subsystem 330b may include characteristics and motion compensated filtering predictor module 213 and/or intra-directional prediction generation module 214. Filtering decoder subsystem 350b may include deblock filtering module 208, quality restoration filtering module 209, characteristics and motion compensated filtering predictor module 213, and/or prediction fusion filtering module 216. Entropy decoder subsystem 360b may include adaptive entropy decoder module 202. Transform decoder subsystem 370b may include adaptive inverse quantize module 203 and/or adaptive inverse transform module 204. Unpartitioner_2 subsystem 380b may include coding partitions assembler 205. Unpartitioner_1 subsystem 351b may include prediction partitions assembler 207. Postrestorer subsystem 790 may include content post restorer module 218 and/or adaptive picture re-organizer 217.

Entropy decoding subsystem 360b of decoder 300b may perform the inverse operation of the entropy encoder subsystem 360a of encoder 300a, i.e., it may decode various data (types of overhead, motion vectors, transform coefficients) encoded by entropy encoder subsystem 360a using a class of techniques loosely referred to as variable length decoding. Specifically, various types of data to be decoded may include "Coded/Not Coded" data, "Modes and Ref Types" data, "Motion Vector" data, "Prediction and Coding Partitions" data, and "Transform Coefficient" data.

Transform decoder subsystem 370b of decoder 300b may perform inverse operation to that of transform encoder subsystem 340a of encoder 300a. Transform decoder subsystem 370b may include two types of components. The first type of example component may support use of the parametric inverse PHT transform of small to medium block sizes, while the other type of example component may support inverse DCT transform for all block sizes. The PHT transform used for a block may depend on analysis of decoded data of the neighboring blocks. Output bitstream 111 and/or input bitstream 201 may carry information about partition/block sizes for PHT transform as well as in which direction of the 2D block to be inverse transformed the PHT may be used (the other direction uses DCT). For blocks coded purely by DCT, the partition/block sizes information may be also retrieved from output bitstream 111 and/or input bitstream 201 and used to apply inverse DCT of appropriate size.

Unpartitioner subsystem 380b of decoder 300b may perform inverse operation to that of partitioner subsystem 320a of encoder 300a and may include two unpartitioning subsystems, coding partitions assembler module 205 that may perform unpartitioning of coded data and prediction partitions assembler module 207 that may perform unpartitioning for prediction. Further if optional adaptive picture organizer module 104 is used at encoder 300a for region segmentation or slices, adaptive picture re-organizer module 217 may be needed at the decoder.

Prediction decoder subsystem 330b of decoder 300b may include characteristics and motion compensated filtering predictor module 213 that may perform prediction of "inter" signal and intra-directional prediction generation module 214 that may perform prediction of "intra" signal. Characteristics and motion compensated filtering predictor module 213 may allow for increasing predictability by first compensating for other sources of differences (such as gain, global motion, registration) or creation of synthesized frames (super resolution, and projection), followed by actual motion compensation.

Filtering decoder subsystem 350b of decoder 300b may perform multiple filtering of the reconstructed pictures based on parameters sent by encoder 300a and may include several subsystems. The first example subsystem, deblock filtering module 208, may deblock and dither to reduce or mask any potential block coding artifacts. The second example subsystem, quality restoration filtering module 209, may perform general quality restoration to reduce the artifacts due to quantization operation in any video coding. The third example subsystem, characteristics and motion compensated filtering predictor module 213, may improve results from motion compensation by using a filter that may adapt to the motion characteristics (motion speed/degree of blurriness) of the content. The fourth example subsystem, prediction fusion filtering module 216, may allow adaptive filtering of the prediction signal (which may reduce spurious artifacts in prediction, often from intra prediction) thereby reducing the prediction error which may need to be coded.

Postrestorer subsystem 390b of decoder 300b is an optional block that may perform further improvement of perceptual quality of decoded video. This processing can be done either in response to quality improvement parameters sent by encoder 100, or it can be standalone decision made at the postrestorer subsystem 390b. In terms of specific parameters computed at encoder 100 that can be used to improve quality at postrestorer subsystem 390b may be estimation of film grain noise and residual blockiness at encoder 100 (even after deblocking). As regards the film grain noise, if parameters can be computed and sent via output bitstream 111 and/or input bitstream 201 to decoder 200, then these parameters may be used to synthesize the film grain noise. Likewise, for any residual blocking artifacts at encoder 100, if they can be measured and parameters sent via output bitstream 111 and/or bitstream 201, postrestorer subsystem 390b may decode these parameters and may use them to optionally perform additional deblocking prior to display. In addition, encoder 100 also may have access to scene change, spatial complexity, temporal complexity, motion range, and prediction distance information that may help in quality restoration in postrestorer subsystem 390b.

While subsystems 330b through 390b are illustrated as being associated with specific example functional modules of decoder 300b in FIG. 3(b), other implementations of decoder 300b herein may include a different distribution of the functional modules of decoder 300b among subsystems 330b through 390b. The present disclosure is not limited in this regard and, in various examples, implementation of the example subsystems 330b through 390b herein may include the undertaking of only a subset of the specific example functional modules of decoder 300b shown, additional functional modules, and/or in a different arrangement than illustrated.

Figure 4:
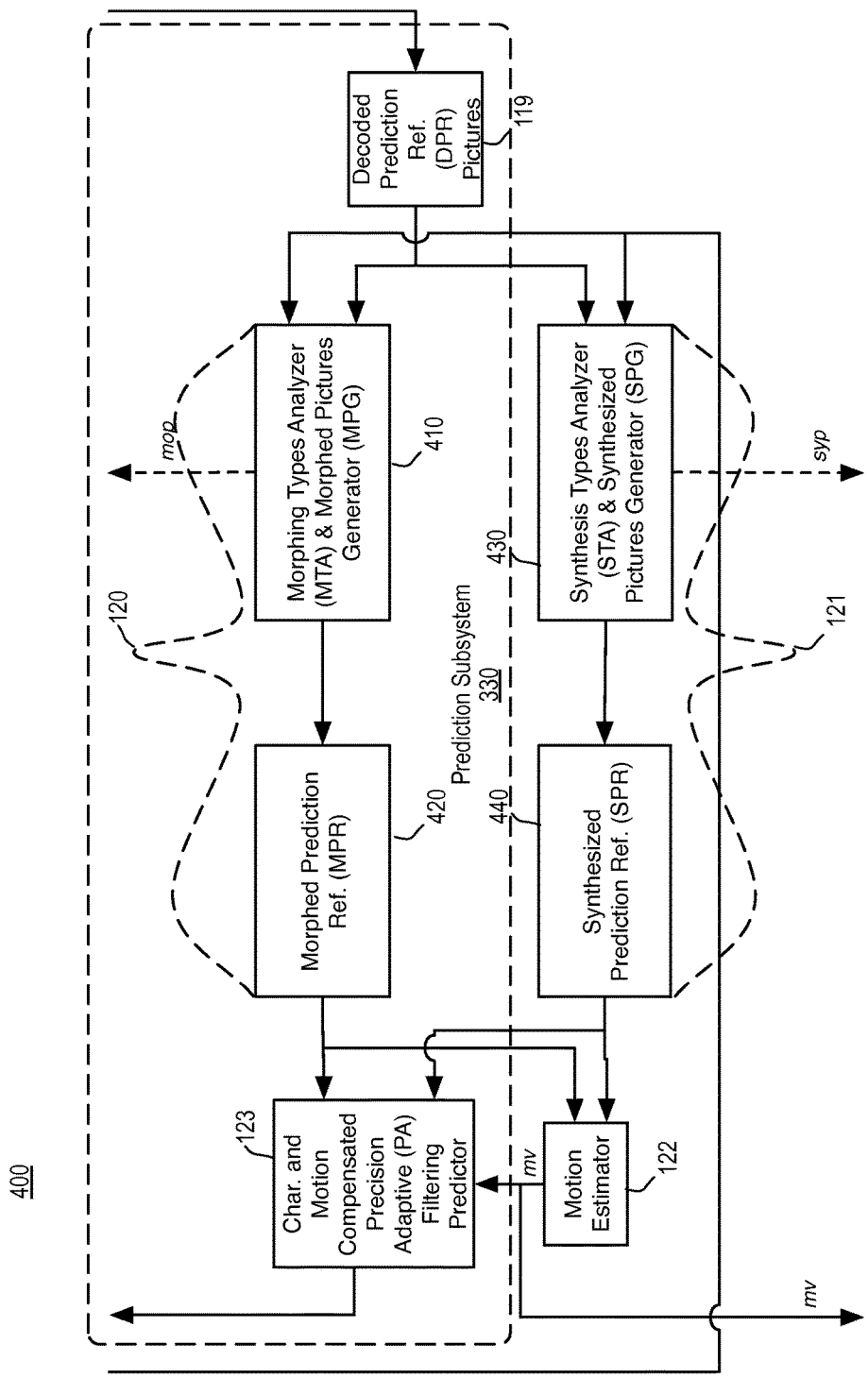
FIG. 4 is an illustrative diagram of an example encoder filter subsystem.

FIG. 4 is an illustrative diagram of an example encoder prediction subsystem 330 for performing characteristics and motion compensated prediction, arranged in accordance with at least some implementations of the present disclosure. As illustrated, encoder prediction subsystem 330 of encoder 400 may include decoded picture buffer 119, morphing analyzer and generation module 120, synthesizing analyzer and generation module 121, motion estimator module 122, and/or characteristics and motion compensated precision adaptive filtering predictor module 123.

As shown, the output of quality analyzer and quality restoration filtering may be transmitted to decoded picture buffer 119. In some examples, the output of quality analyzer and quality restoration filtering may be a final reconstructed frame that may be used for prediction for coding other frames (e.g., the final reconstructed frame may be a reference frame or the like). In encoder 400, prediction operations may include inter- and/or intra-prediction. As shown in FIG. 4, inter-prediction may be performed by one or more modules including morphing analyzer and generation module 120, synthesizing analyzer and generation module 121, and/or characteristics and motion compensated precision adaptive filtering predictor module 123.

Morphing analyzer and generation module 120 may include a morphing types analyzer (MTA) and a morphed pictures generator (MPG) 410 as well as a morphed prediction reference (MPR) buffer 420. Morphing types analyzer (MTA) and a morphed pictures generator (MPG) 410 may analyze a current picture to determine parameters for changes in gain, changes in dominant motion, changes in registration, and changes in blur with respect to a reference frame or frames with which it is to be coded. The determined morphing parameters may be quantized/de-quantized and used (e.g., by morphing analyzer and generation module 120) to generate morphed reference frames. Such generated morphed reference frames may be stored in morphed prediction reference (MPR) buffer 420 and may be used by motion estimator module 122 for computing motion vectors for efficient motion (and characteristics) compensated prediction of a current frame.

Synthesizing analyzer and generation module 121 may include a synthesis types analyzer (STA) and synthesized pictures generator 430 as well as a synthesized prediction reference (MPR) buffer 540. Synthesis types analyzer (STA) and synthesized pictures generator 430 may generate super resolution (SR) pictures and projected interpolation (PI) pictures or the like for determining motion vectors for efficient motion compensated prediction in these frames. Such generated synthesized reference frames may be stored in synthesized prediction reference (MPR) buffer 440 and may be used by motion estimator module 122 for computing motion vectors for efficient motion (and characteristics) compensated prediction of a current frame.

Motion estimator module 122 may generate motion vector data based at least in part on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion filtering predictor module 123 may apply motion compensation as part of the local decode loop as discussed.

Figure 5:
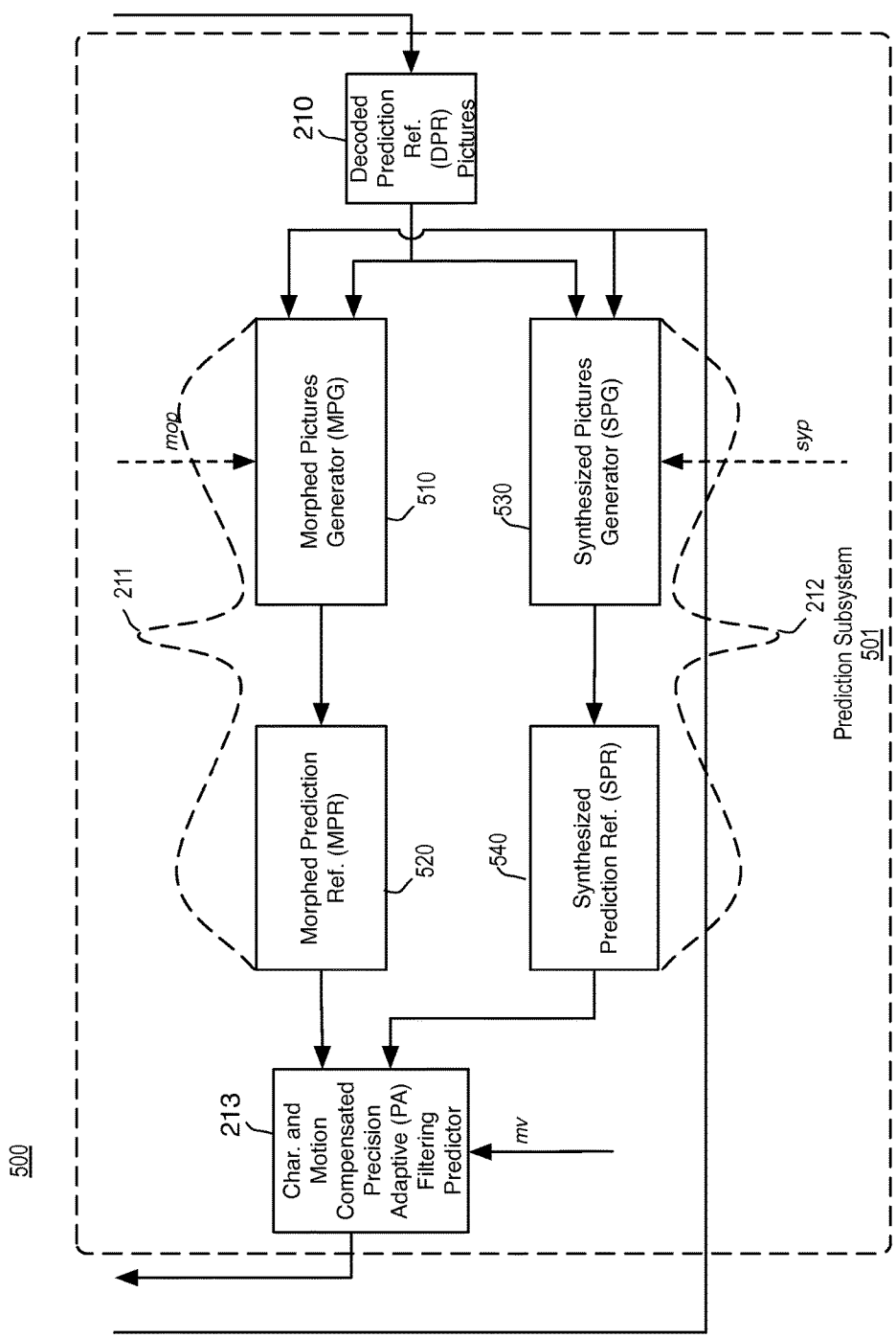
FIG. 5 is an illustrative diagram of an example encoder filter subsystem.

FIG. 5 is an illustrative diagram of an example decoder prediction subsystem 501 for performing characteristics and motion compensated prediction, arranged in accordance with at least some implementations of the present disclosure. As illustrated, decoder prediction subsystem 501 of decoder 500 may include decoded picture buffer 210, morphing analyzer and generation module 211, synthesizing analyzer and generation module 212, and/or characteristics and motion compensated precision adaptive filtering predictor module 213.

As shown, the output of quality restoration filtering module may be transmitted to decoded picture buffer 210. In some examples, the output of quality restoration filtering module may be a final reconstructed frame that may be used for prediction for coding other frames (e.g., the final reconstructed frame may be a reference frame or the like). As discussed, compensation due to prediction operations may include inter- and/or intra-prediction compensation. As shown, inter-prediction compensation may be performed by one or more modules including morphing analyzer and generation module 211, synthesizing analyzer and generation module 212, and/or characteristics and motion compensated precision adaptive filtering predictor module 213.

Morphing analyzer and generation module 211 may include a morphed pictures generator (MPG) 510 as well as a morphed prediction reference (MPR) buffer 520. Morphed pictures generator (MPG) 510 may use de-quantized morphing parameters (e.g., determined from input bitstream) to generate morphed reference frames. Such generated morphed reference frames may be stored in morphed prediction reference (MPR) buffer 520 and may be used by characteristics and motion compensated precision adaptive filtering predictor module 213.

Synthesizing analyzer and generation module 212 may include a synthesized pictures generator 530 as well as a synthesized prediction reference (SPR) buffer 540. Synthesized pictures generator 530 may be configured to generate one or more types of synthesized prediction reference pictures such as super resolution (SR) pictures and projected interpolation (PI) pictures or the like based at least in part on parameters determined from input bitstream 201. Such generated synthesized reference frames may be stored in synthesized prediction reference (SPR) buffer 540 and may be used by motion compensated filtering predictor module 213.

If inter-prediction is applied, characteristics and motion compensated filtering predictor module 213 may apply motion compensation based at least in part on morphed reference frame(s) and/or super resolution (SR) pictures and projected interpolation (PI) pictures along with the current frame.

Figure 6:
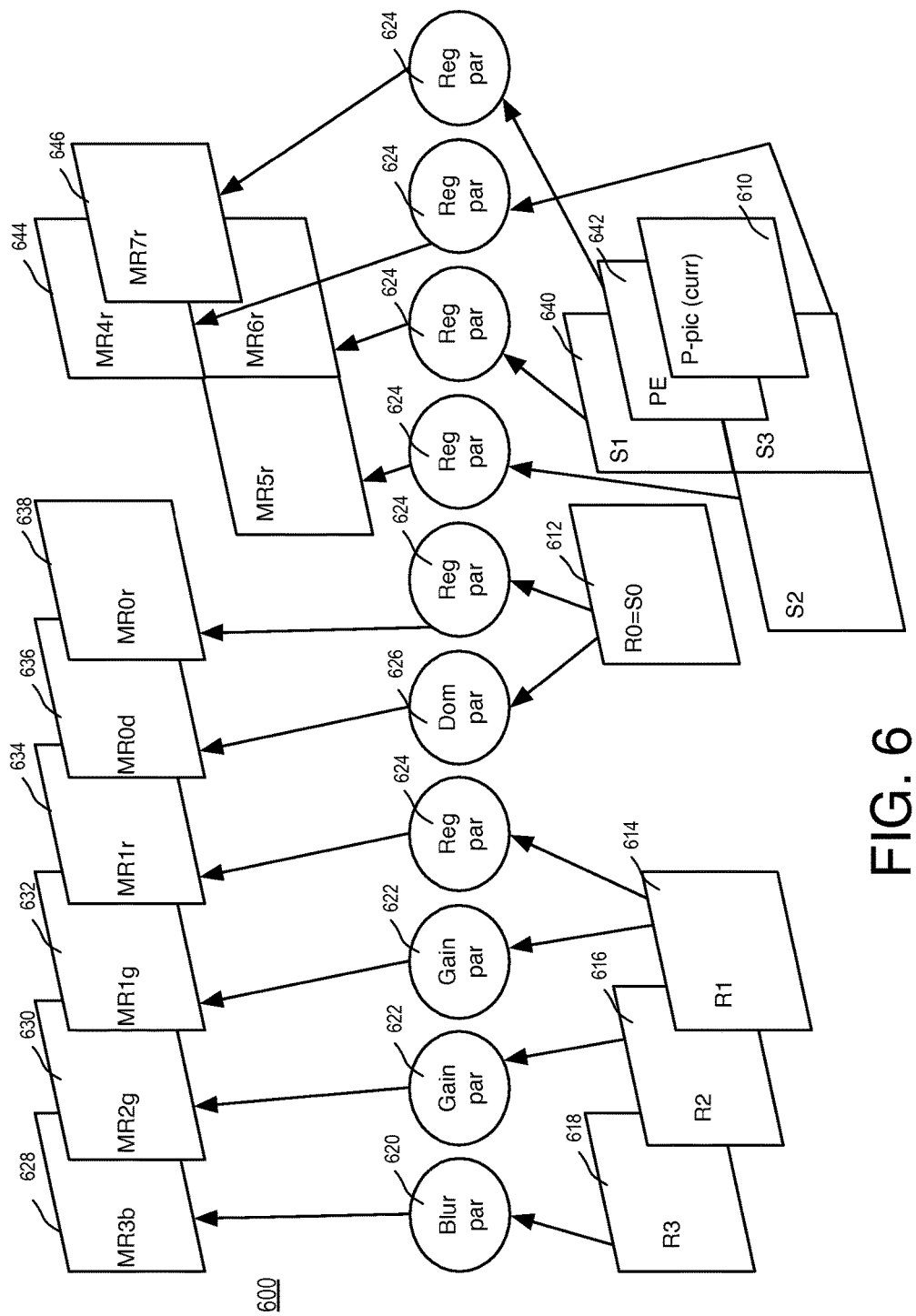
FIG. 6 is an illustrative diagram of modified prediction reference pictures.

FIG. 6 is an illustrative diagram of modified prediction reference pictures 600, arranged in accordance with at least some implementations of the present disclosure. As shown, the output of quality analyzer and quality restoration filtering may be a final reconstructed frame that may be used for prediction for coding other frames (e.g., the final reconstructed frame may be a reference frame or the like).

The proposed implementation of the NGV coder (e.g., encoder 100 and/or decoder 200) may implement P-picture coding using a combination of Morphed Prediction References 628 through 638 (MR0 through 3) and/or Synthesized Prediction References 612 and 640 through 646 (S0 through S3, MR4 through 7). NGV coding involves use of 3 picture types referred to as I-pictures, P-pictures, and F/B-pictures. In the illustrated example, the current picture to be coded (a P-picture) is shown at time t=4. During coding, the proposed implementation of the NGV coder (e.g., encoder 100 and/or decoder 200) may and use one or more of 4 previously decoded references R0 612, R1 614, R2 616, and R3 618. Unlike other solutions that may simply use these references directly for prediction, the proposed implementation of the NGV coder (e.g., encoder 100 and/or decoder 200) may generate modified (morphed or synthesized) references from such previously decoded references and then use motion compensated coding based at least in part on such generated modified (morphed or synthesized) references.

As will be described in greater detail below, in some examples, the proposed implementation of the NGV coder (e.g., encoder 100 and/or decoder 200) may incorporate a number of components and the combined predictions generated by these components in an efficient video coding algorithm. For example, proposed implementation of the NGV coder may include one or more of the following features: 1. Gain Compensation (e.g., explicit compensation for changes in gain/brightness in a scene); 2. Blur Compensation: e.g., explicit compensation for changes in blur/sharpness in a scene; 3. Dominant/Global Motion Compensation (e.g., explicit compensation for dominant motion in a scene); 4. Registration Compensation (e.g., explicit compensation for registration mismatches in a scene); 5. Super Resolution (e.g., explicit model for changes in resolution precision in a scene); 6. Projection (e.g., explicit model for changes in motion trajectory in a scene); the like, and/or combinations thereof.

In the illustrated example, if inter-prediction is applied, a characteristics and motion filtering predictor module may apply motion compensation to a current picture 610 (e.g., labeled in the figure as P-pic (curr)) as part of the local decode loop. In some instances, such motion compensation may be based at least in part on future frames (not shown) and/or previous frame R0 612 (e.g., labeled in the figure as R0), previous frame R1 614 (e.g., labeled in the figure as R1), previous frame R2 616 (e.g., labeled in the figure as R2), and/or previous frame R3 618 (e.g., labeled in the figure as R3).

For example, in some implementations, prediction operations may include inter- and/or intra-prediction. Inter-prediction may be performed by one or more modules including a morphing analyzer and generation module and/or a synthesizing analyzer and generation module. Such a morphing analyzer and generation module may analyze a current picture to determine parameters for changes in blur 620 (e.g., labeled in the figure as Blur par), changes in gain 622 (e.g., labeled in the figure as Gain par), changes in registration 624 (e.g., labeled in the figure as Reg par), and changes in dominant motion 626 (e.g., labeled in the figure as Dom par), or the like with respect to a reference frame or frames with which it is to be coded.

The determined morphing parameters 620, 622, 624, and/or 626 may be used to generate morphed reference frames. Such generated morphed reference frames may be stored and may be used for computing motion vectors for efficient motion (and characteristics) compensated prediction of a current frame. In the illustrated example, determined morphing parameters 620, 622, 624, and/or 626 may be used to generate morphed reference frames, such as blur compensated morphed reference frame 628 (e.g., labeled in the figure as MR3b), gain compensated morphed reference frame 630 (e.g., labeled in the figure as MR2g), gain compensated morphed reference frame 632 (e.g., labeled in the figure as MR1g), registration compensated morphed reference frame 634 (e.g., labeled in the figure as MR1r), dominant motion compensated morphed reference frame 636 (e.g., labeled in the figure as MR0d), and/or registration compensated morphed reference frame 638 (e.g., labeled in the figure as MR0r), the like or combinations thereof, for example.

Similarly, a synthesizing analyzer and generation module may generate super resolution (SR) pictures 640 (e.g., labeled in the figure as S0 (which is equal to previous frame R0 612), S1, S2, S3) and projected interpolation (PI) pictures 642 (e.g., labeled in the figure as PE) or the like for determining motion vectors for efficient motion compensated prediction in these frames. Such generated synthesized reference frames may be stored and may be used for computing motion vectors for efficient motion (and characteristics) compensated prediction of a current frame.

Additionally or alternatively, the determined morphing parameters 620, 622, 624, and/or 626 may be used to morph the generate synthesis reference frames super resolution (SR) pictures 640 and/or projected interpolation (PI) pictures 642. For example, a synthesizing analyzer and generation module may generate morphed registration compensated super resolution (SR) pictures 644 (e.g., labeled in the figure as MR4r, MR5r, and MR6r) and/or morphed registration compensated projected interpolation (PI) pictures 646 (e.g., labeled in the figure as MR7r) or the like from the determined registration morphing parameter 624. Such generated morphed and synthesized reference frames may be stored and may be used for computing motion vectors for efficient motion (and characteristics) compensated prediction of a current frame.

In some implementations, changes in a set of characteristics (such as gain, blur, dominant motion, registration, resolution precision, motion trajectory, the like, or combinations thereof, for example) may be explicitly computed. Such a set of characteristics may be computed in addition to local motion. In some cases previous and next pictures/slices may be utilized as appropriate; however, in other cases such a set of characteristics may do a better job of prediction from previous picture/slices. Further, since there can be error in any estimation procedure, (e.g., from multiple past or multiple past and future pictures/slices) a modified reference frame associated with the set of characteristics (such as gain, blur, dominant motion, registration, resolution precision, motion trajectory, the like, or combinations thereof, for example) may be selected that yields the best estimate. Thus, the proposed approach that utilizes modified reference frames associated with the set of characteristics (such as gain, blur, dominant motion, registration, resolution precision, motion trajectory, the like, or combinations thereof, for example) may explicitly compensate for differences in these characteristics. The proposed implementation may address the problem of how to improve the prediction signal, which in turn allows achieving high compression efficiency in video coding.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

The proposed implementation improves video compression efficiency by improving interframe prediction, which in turn reduces interframe prediction difference (error signal) that needs to be coded. The less the amount of interframe prediction difference to be coded, the less the amount of bits required for coding, which effectively improves the compression efficiency as it now takes less bits to store or transmit the coded prediction difference signal. Instead of being limited to motion predictions only, the proposed NCV codec may be highly adaptive to changing characteristics (such as gain, blur, dominant motion, registration, resolution precision, motion trajectory, the like, or combinations thereof, for example) of the content by employing, in addition or in the alternative to motion compensation, approaches to explicitly compensate for changes in the characteristics of the content. Thus by explicitly addressing the root cause of the problem the NGV codec may address a key source of limitation of standards based codecs, thereby achieving higher compression efficiency.

This change in interframe prediction output may be achieved due to ability of the proposed NCV codec to compensate for a wide range of reasons for changes in the video content. Typical video scenes vary from frame to frame due to many local and global changes (referred to herein as characteristics). Besides local motion, there are many other characteristics that are not sufficiently addressed by current solutions that may be addressed by the proposed implementation.

The proposed implementation may explicitly compute changes in a set of characteristics (such as gain, blur, dominant motion, registration, resolution precision, motion trajectory, the like, or combinations thereof, for example) in addition to local motion, and thus may do a better job of prediction from previous picture/slices than only using local motion prediction from previous and next pictures/slices. Further, since there can be error in any estimation procedure, from multiple past or multiple past and future pictures/slices the NGV coder may choose the frame that yields the best by explicitly compensating for differences in various characteristics.

In particular, the proposed implementation of the NGV coder may include features: i. explicit compensation for changes in gain/brightness in a scene; ii. explicit compensation for changes in blur/sharpness in a scene; iii. explicit compensation for dominant motion in a scene; iv. explicit compensation for registration mismatches in a scene; v. explicit model for changes in resolution precision in a scene; and/or vi. explicit model for changes in motion trajectory in a scene.

Tables 1 and 2, shown below, illustrate one example of codebook entries. A full codebook of entries may provide a full or substantially full listing of all possible entries and coding thereof. In some examples, the codebook may take into account constraints as described above. In some examples, data associated with a codebook entry for prediction modes and/or reference types may be encoded in a bitstream for use at a decoder as discussed herein.

TABLE 1

Example Prediction References in P-pictures

| No. | Ref Types for P-picture for Inter-Prediction mode |
|---|---|
| 0. | MR0r (=past SR0) |
| 1. | MR1r |
| 2. | MR2r |
| 3. | MR2g |
| 4. | MR4r (past SR1) |
| 5. | MR5r (past SR2) |
| 6. | MR6r (past SR3) |
| 7. | MR0d |
| 8. | MR1g |
| 9. | MR3b |

TABLE 2

Example Prediction References in F-pictures

| No. | Ref Types for F-picture for Inter-Prediction mode |
|---|---|
| 0. | MR0r |
| 1. | MR7r (=Proj Interpol) |
| 2. | MR3r (=future SR0) |
| 3. | MR1r |
| 4. | MR4r (=Future SR1) |
| 5. | MR5r (=Future SR2) |
| 6. | MR6r (=Future SR3) |
| 7. | MR0d |
| 8. | MR3d |
| 9. | MR0g/MR3g |
| 10. | MR3b |

In operation, the proposed implementation of the NGV coder (e.g., encoder 100 and/or decoder 200) may operate so that prediction mode and/or reference type data may be defined using symbol-run coding or a codebook or the like. The prediction mode and/or reference type data may be transform encoded using content adaptive or discrete transform in various examples to generate transform coefficients. Also as discussed, data associated with partitions (e.g., the transform coefficients or quantized transform coefficients), overhead data (e.g., indicators as discussed herein for transform type, adaptive transform direction, and/or a transform mode), and/or data defining the partitions and so on may be encoded (e.g., via an entropy encoder) into a bitstream. The bitstream may be communicated to a decoder, which may use the encoded bitstream to decode video frames for display. On a local basis (such as block-by-block within a macroblock or a tile, or on a partition-by-partition within a tile or a prediction unit, or fragments within a superfragment or region) the best mode may be selected for instance based at least in part on Rate Distortion Optimization (RDO) or based at least in part on pre-analysis of video, and the identifier for the mode and needed references may be encoded within the bitstream for use by the decoder.

In operation, the proposed implementation of the NGV coder (e.g., encoder 100 and/or decoder 200) may use one or more of the above components besides the usual local motion compensation with respect to decoded past and/or future, picture/slices. As such the implementation does not mandate a specific solution for instance for Gain compensation, or for any other characteristics compensated reference frame generation.

Figure 7:
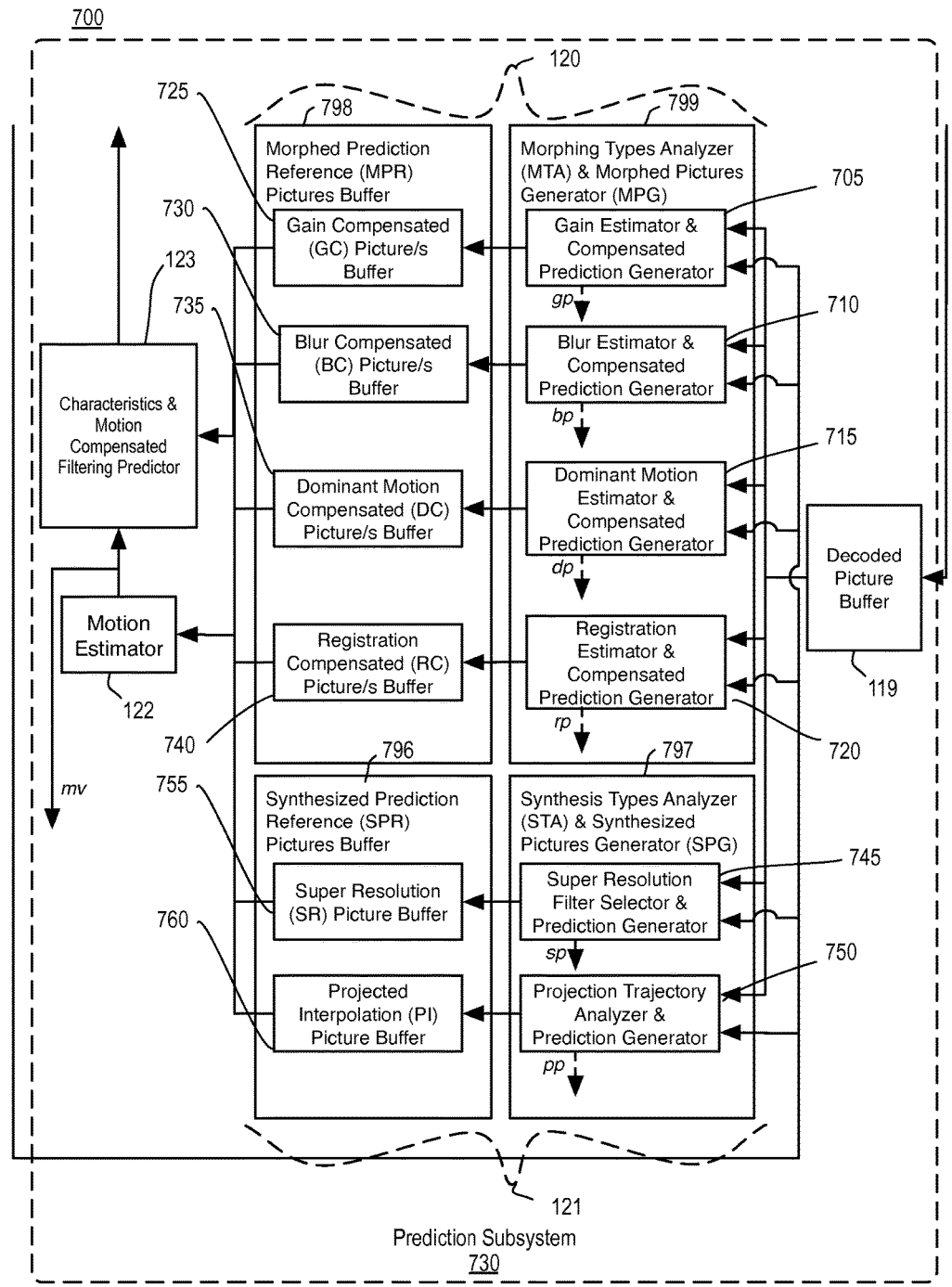
FIG. 7 is an illustrative diagram of an example encoder subsystem.

FIG. 7 is an illustrative diagram of another example encoder prediction subsystem 730 for performing characteristics and motion compensated prediction, arranged in accordance with at least some implementations of the present disclosure. As illustrated, encoder prediction subsystem 730 of encoder 700 may include decoded picture buffer 119, morphing analyzer and morphed picture generation module 120, synthesizing analyzer and generation module 121, motion estimator module 122, and/or characteristics and motion compensated filtering predictor module 123.

As shown, the output of quality analyzer and quality restoration filtering may be transmitted to decoded picture buffer 119. In some examples, the output of quality analyzer and quality restoration filtering may be a final reconstructed frame that may be used for prediction for coding other frames (e.g., the final reconstructed frame may be a reference frame or the like). In encoder 700, prediction operations may include inter- and/or intra-prediction. As shown in FIG. 7, inter-prediction may be performed by one or more modules including morphing analyzer and morphed picture generation module 120, synthesizing analyzer and generation module 121, and/or characteristics and motion compensated filtering predictor module 123.

Morphing analyzer and morphed picture generation module 120 may include a morphing types analyzer (MTA) and a morphed pictures generator (MPG) 799 as well as a morphed prediction reference (MPR) pictures buffer 798. Morphing types analyzer (MTA) and morphed pictures generator (MPG) 799 may be configured to analyze and/or generate one or more types of modified prediction reference pictures.

For example, morphing types analyzer (MTA) and a morphed pictures generator (MPG) 799 may include Gain Estimator and Compensated Prediction Generator 705, Blur Estimator and Compensated Prediction Generator 710, Dominant Motion Estimator and Compensated Prediction Generator 715, Registration Estimator and Compensated Prediction Generator 720, the like and/or combinations thereof. Gain Estimator and Compensated Prediction Generator 705 may be configured to analyze and/or generate morphed prediction reference pictures that are adapted to address changes in gain. Blur Estimator and Compensated Prediction Generator 710 may be configured to analyze and/or generate morphed prediction reference pictures that are adapted to address changes in blur. Dominant Motion Estimator and Compensated Prediction Generator 715 may be configured to analyze and/or generate morphed prediction reference pictures that are adapted to address changes in dominant motion. Registration Estimator and Compensated Prediction Generator 720 may be configured to analyze and/or generate morphed prediction reference pictures that are adapted to address changes in registration.

Morphing types analyzer (MTA) and morphed pictures generator (MPG) 799 may store such generated morphed reference frames in morphed prediction reference (MPR) pictures buffer 798. For example, morphed prediction reference (MPR) pictures buffer 798 may include Gain Compensated (GC) Picture/s Buffer 725, Blur Compensated (BC) Picture/s Buffer 730, Dominant Motion Compensated (DC) Picture/s Buffer 735, Registration Compensated (RC) Picture/s Buffer 740, the like and/or combinations thereof. Gain Compensated (GC) Picture/s Buffer 725 may be configured to store morphed reference frames that are adapted to address changes in gain. Blur Compensated (BC) Picture/s Buffer 730 may be configured to store morphed reference frames that are adapted to address changes in blur. Dominant Motion Compensated (DC) Picture/s Buffer 735 may be configured to store morphed reference frames that are adapted to address changes in dominant motion. Registration Compensated (RC) Picture/s Buffer 740 may be configured to store morphed reference frames that are adapted to address changes in registration.

Synthesizing analyzer and generation module 121 may include a synthesis types analyzer (STA) and synthesized pictures generator (SPG) 797 as well as a synthesized prediction reference (SPR) pictures buffer 796. Synthesis types analyzer (STA) and synthesized pictures generator (SPG) 797 may be configured to analyze and/or generate one or more types of synthesized prediction reference pictures. For example, synthesis types analyzer (STA) and synthesized pictures generator (SPG) 797 may include Super Resolution Filter Selector & Prediction Generator 745, Projection Trajectory Analyzer & Prediction Generator 750, the like and/or combinations thereof. Super Resolution Filter Selector & Prediction Generator 745 may be configured to analyze and/or generate a super resolution (SR) type of synthesized prediction reference pictures. Projection Trajectory Analyzer & Prediction Generator 750 may be configured to analyze and/or generate a projected interpolation (PI) type of synthesized prediction reference pictures.

Synthesis types analyzer (STA) and synthesized pictures generator (SPG) 797 may generate super resolution (SR) pictures and projected interpolation (PI) pictures or the like for efficient motion compensated prediction in these frames. Such generated synthesized reference frames may be stored in synthesized prediction reference (SPR) pictures buffer 796 and may be used by motion estimator module 122 for computing motion vectors for efficient motion (and characteristics) compensated prediction of a current frame.

For example, synthesized prediction reference (SPR) pictures buffer 796 may include Super Resolution (SR) Picture Buffer 755, Projected Interpolation (PI) Picture Buffer 760, the like and/or combinations thereof. Super Resolution (SR)

Picture Buffer 755 may be configured to store synthesized reference frames that are generated for super resolution (SR) pictures. Projected Interpolation (PI) Picture Buffer 760 may be configured to store synthesized reference frames that are generated for projected interpolation (PI) pictures.

Motion estimator module 122 may generate motion vector data based on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion compensated filtering predictor module 123 may apply motion compensation as part of the local decode loop as discussed.

Figure 8:
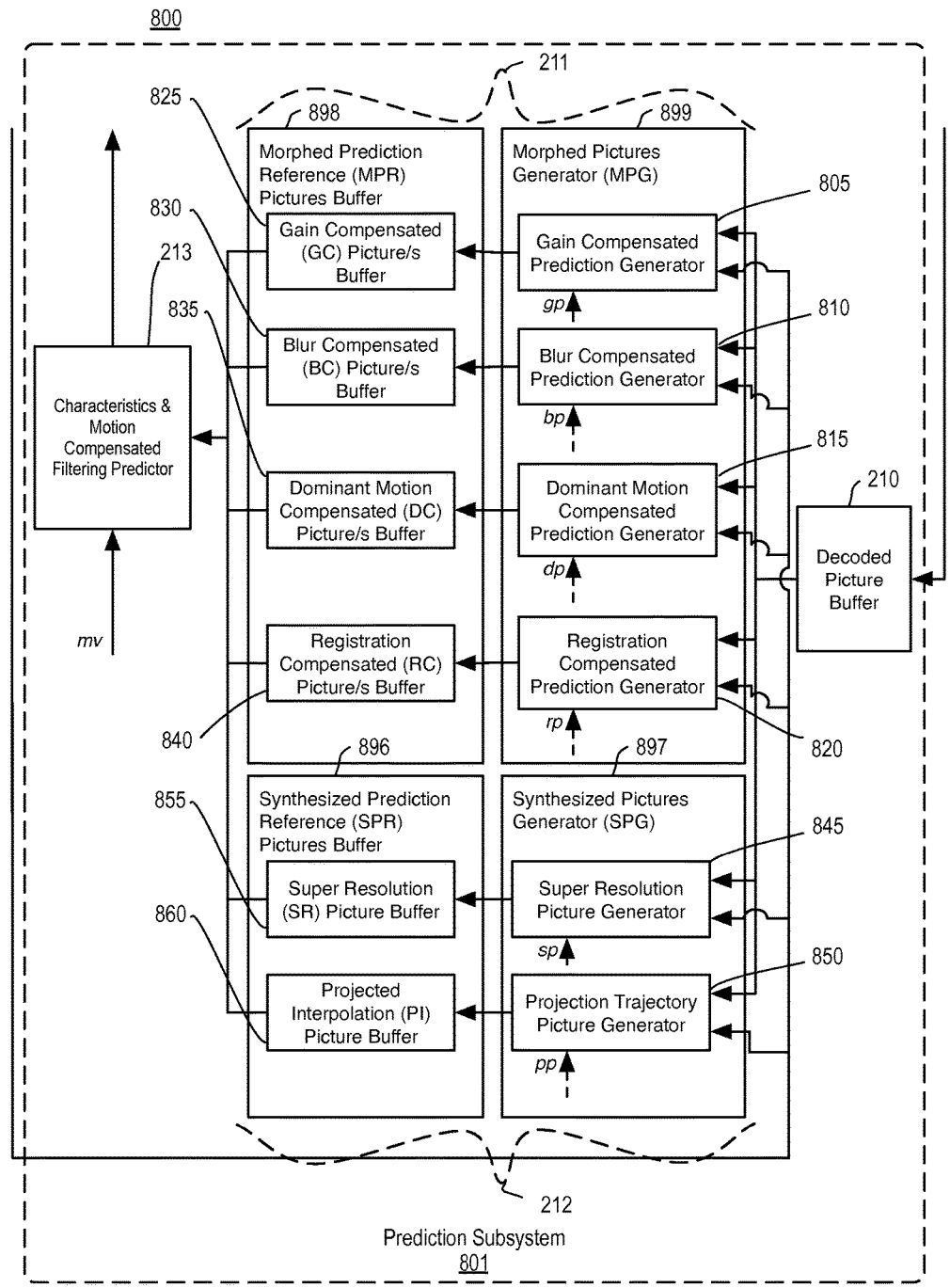
FIG. 8 is an illustrative diagram of an example decoder subsystem.

FIG. 8 is an illustrative diagram of another example decoder prediction subsystem 801 for performing characteristics and motion compensated prediction, arranged in accordance with at least some implementations of the present disclosure. As illustrated, decoder prediction subsystem 801 may include decoded picture buffer 210, morphed picture generation module 211, synthesized picture generation module 212, and/or characteristics and motion compensated filtering predictor module 213.

As shown, the output of quality restoration filtering module may be transmitted to decoded picture buffer 210. In some examples, the output of quality restoration filtering module may be a final reconstructed frame that may be used for prediction for coding other frames (e.g., the final reconstructed frame may be a reference frame or the like). As discussed, compensation due to prediction operations may include inter- and/or intra-prediction compensation. As shown, inter-prediction compensation may be performed by one or more modules including morphed picture generation module 211, synthesized picture generation module 212, and/or characteristics and motion compensated filtering predictor module 213.

Morphed picture generation module 211 may include a morphed pictures generator (MPG) 899 as well as a morphed prediction reference (MPR) pictures buffer 898. Morphed pictures generator (MPG) 899 may use de-quantized morphing parameters (e.g., determined from input bitstream) to generate morphed reference frames. For example, morphed pictures generator (MPG) 899 may include Gain Compensated Prediction Generator 805, Blur Compensated Prediction Generator 810, Dominant Motion Compensated Prediction Generator 815, Registration Compensated Prediction Generator 820, the like and/or combinations thereof. Gain Compensated Prediction Generator 805 may be configured to generate morphed prediction reference pictures that are adapted to address changes in gain. Blur Compensated Prediction Generator 810 may be configured to generate morphed prediction reference pictures that are adapted to address changes in blur. Dominant Motion Compensated Prediction Generator 815 may be configured to generate morphed prediction reference pictures that are adapted to address changes in dominant motion. Registration Compensated Prediction Generator 820 may be configured to generate morphed prediction reference pictures that are adapted to address changes in registration.

Morphed pictures generator (MPG) 899 may store such generated morphed reference frames in morphed prediction reference (MPR) pictures buffer 898. For example, morphed prediction reference (MPR) pictures buffer 898 may include Gain Compensated (GC) Picture/s Buffer 825, Blur Compensated (BC) Picture/s Buffer 830, Dominant Motion Compensated (DC) Picture/s Buffer 835, Registration Compensated (RC) Picture/s Buffer 840, the like and/or combinations thereof. Gain Compensated (GC) Picture/s Buffer 825 may be configured to store morphed reference frames that are adapted to address changes in gain. Blur Compensated (BC) Picture/s Buffer 830 may be configured to store morphed reference frames that are adapted to address changes in blur. Dominant Motion Compensated (DC) Picture/s Buffer 835 may be configured to store morphed reference frames that are adapted to address changes in dominant motion. Registration Compensated (RC) Picture/s Buffer 840 may be configured to store morphed reference frames that are adapted to address changes in registration.

Synthesized picture generation module 212 may include a synthesized pictures generator (SPG) 897 as well as a synthesized prediction reference (SPR) pictures buffer 896. Synthesized pictures generator (SPG) 897 may be configured to generate one or more types of synthesized prediction reference pictures such as super resolution (SR) pictures and projected interpolation (PI) pictures or the like based on parameters determined from input bitstream 201. Such generated synthesized reference frames may be stored in synthesized prediction reference (SPR) pictures buffer 896 and may be used by characteristics and motion compensated filtering predictor module 213. For example, synthesized pictures generator (SPG) 897 may include Super Resolution Picture Generator 845, Projection Trajectory Picture Generator 850, the like and/or combinations thereof. Super Resolution Picture Generator 845 may be configured to generate a super resolution (SR) type of synthesized prediction reference pictures. Projection Trajectory Picture Generator 850 may be configured to generate a projected interpolation (PI) type of synthesized prediction reference pictures.

Synthesized pictures generator (SPG) 897 may generate super resolution (SR) pictures and projected interpolation (PI) pictures or the like for efficient motion compensated prediction in these frames. Such generated synthesized reference frames may be stored in synthesized prediction reference (SPR) pictures buffer 896 and may be used by characteristics and motion compensated filtering predictor module 213 for efficient motion (and characteristics) compensated prediction of a current frame.

For example, synthesized prediction reference (SPR) pictures buffer 896 may include Super Resolution (SR) Picture Buffer 855, Projected Interpolation (PI) Picture Buffer 860, the like and/or combinations thereof. Super Resolution (SR) Picture Buffer 855 may be configured to store synthesized reference frames that are generated for super resolution (SR) pictures. Projected Interpolation (PI) Picture Buffer 860 may be configured to store synthesized reference frames that are generated for projected interpolation (PI) pictures.

If inter-prediction is applied, characteristics and motion compensated filtering predictor module 213 may apply motion compensation based on morphed reference frame(s) and/or super resolution (SR) pictures and projected interpolation (PI) pictures along with the current frame.

Figure 9:
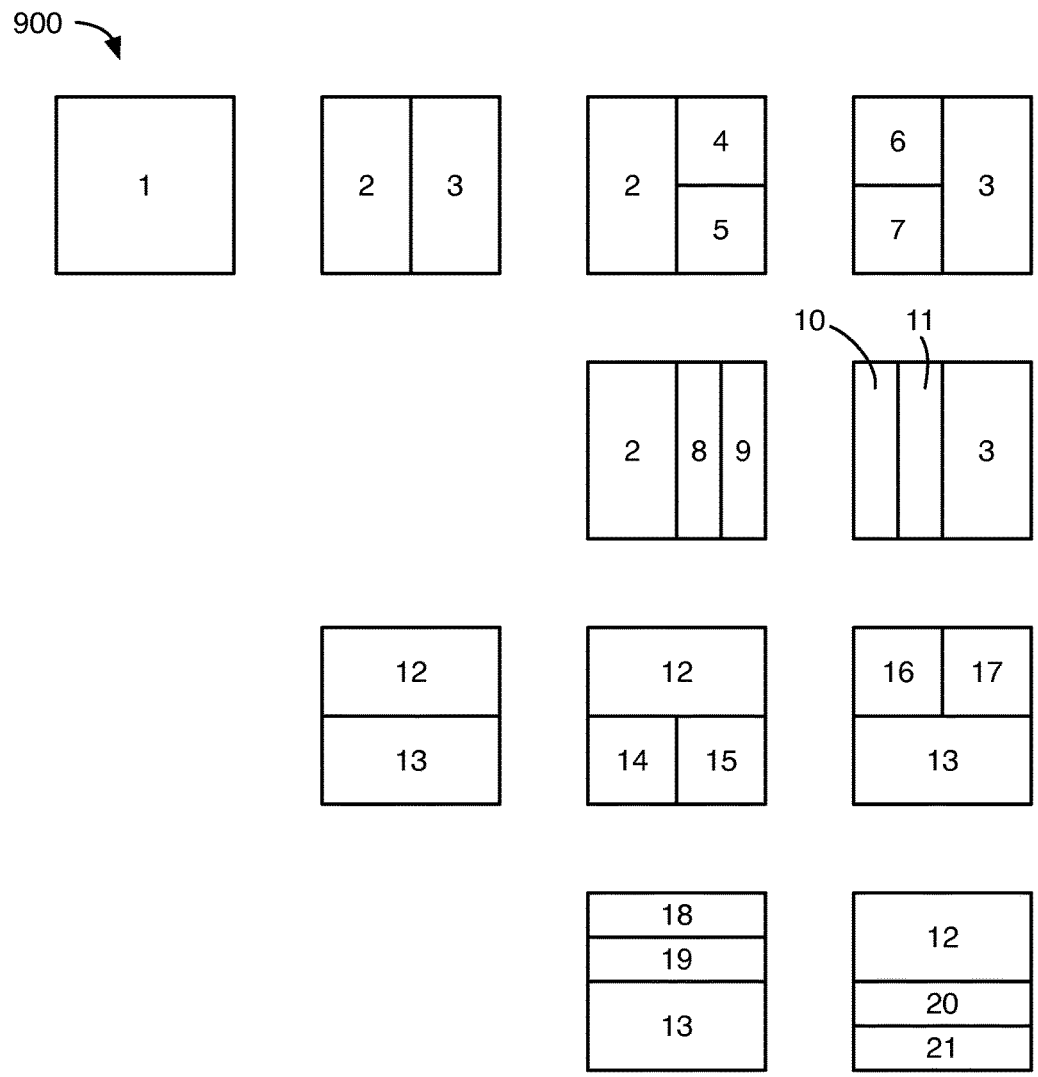
FIG. 9 illustrates example partitioning using a bi-tree partitioning technique.

FIG. 9 illustrates example partitioning of a frame portion 900 using a bi-tree partitioning technique, arranged in accordance with at least some implementations of the present disclosure. As shown, in some examples, frame portion 900 may include a square shape. As discussed, in various examples, frame portion 900 may include any suitable shape. Further, frame portion 900 may include a tile or a super-fragment or the like as discussed herein. Further, in some examples, frame portion 900 may itself be a partition such that the illustrated partitions may be considered sub-partitions. Such examples may occur when partitions are further partitioned for coding (e.g., transform coding) via sub-partitions generator module 107 as will be further discussed herein below.

As shown in FIG. 9, bi-tree partitioning may include a progression of partitioning. Beginning with frame portion 900, a partition 1 may be defined as frame portion 900 itself. Partition 1 may be vertically partitioned into two partitions 2, 3. Each of partitions 2, 3, may be further partitioned, this time vertically into partitions 4, 5 (e.g., partitions of partition 3) and partitions 6, 7 (e.g., partitions of partition 2). The second row (from the top) of FIG. 9 illustrates further vertical partitioning of partition 3 into partitions 8, 9 and further vertical partitioning of partition 2 into partitions 10, 11. The third row (from the top) of FIG. 9 illustrates horizontal partitioning (e.g., instead of the vertical partitioning of the first row (from the top)) to generate partitions 12, 13 from partition 1. The third row (from the top) of FIG. 9 also illustrates further vertical partitioning of partitions 12, 13 to generate partitions 14, 15 (e.g., partitions of partition 13) and partitions 16, 17 (e.g., from partitions of partition 12). The fourth or bottom row illustrates further horizontal partitioning of partition 12 to generate partitions 18, 19 and of partition 13 to generate partitions 20, 21. As illustrated, bi-tree partitioning may be used recursively, one dimension at a time (e.g., horizontally and vertically) to subdivide or partition each partition into two equal partitions until the smallest partition size may be reached. Bi-tree partitioning may partition a frame portion into a wide number of combinations and may provide for a smooth progression of partitions.

Figure 10:
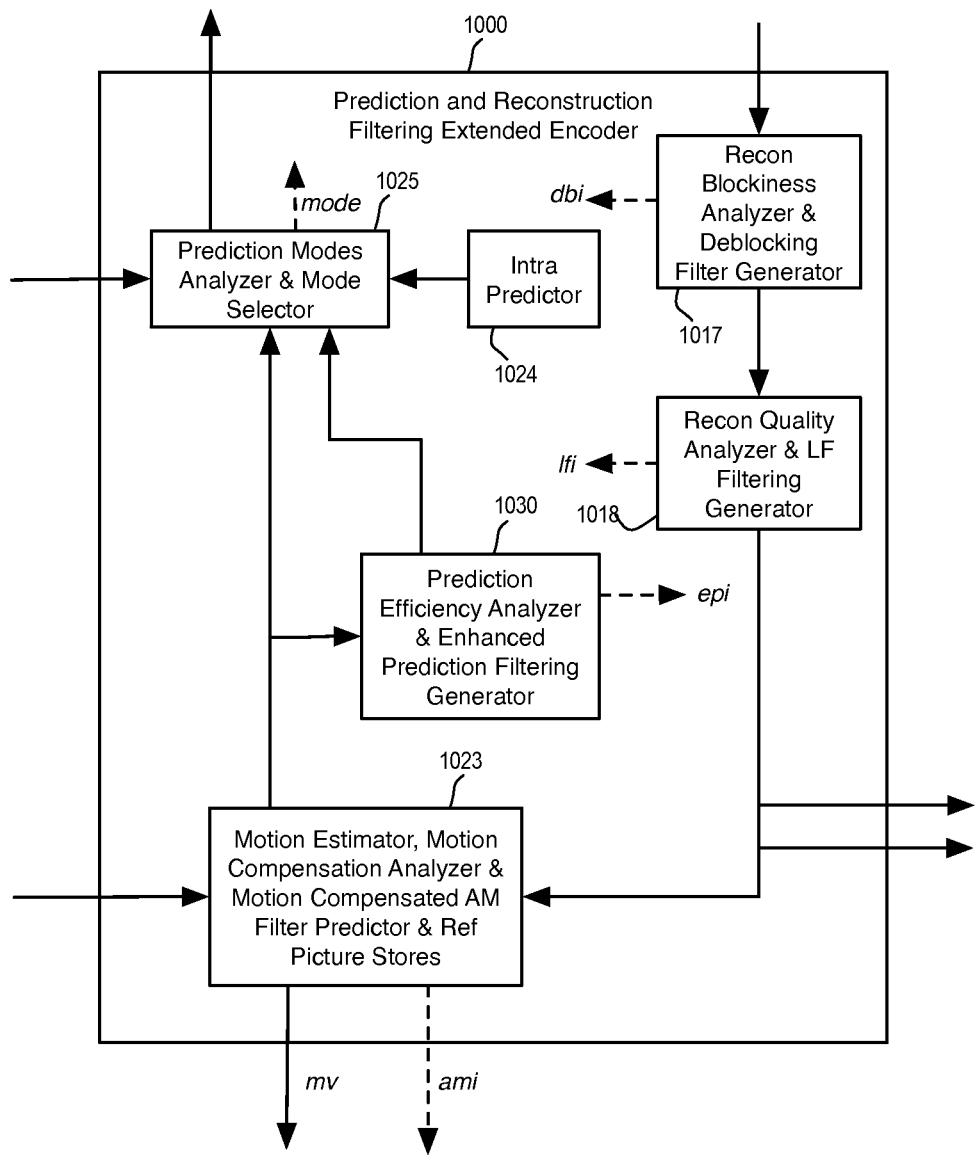
FIG. 10 is an illustrative diagram of an example encoder filter subsystem.

FIG. 10 is an illustrative diagram of an example encoder filtering subsystem 1000, arranged in accordance with at least some implementations of the present disclosure. As illustrated, filtering subsystem 1000 may include recon blockiness analyzer & deblocking filter generator 1017, recon quality analyzer & LF filtering generator 1018, motion estimator, motion compensation analyzer & motion compensated AM filter predictor & ref picture stores 1023, intra predictor 1024, prediction modes analyzer & mode selector 1025, and/or prediction efficiency analyzer & enhanced prediction filtering generator 1030.

In the illustrated implementation, recon blockiness analyzer & deblocking filter generator 1017 may be capable of analysis of blocking produced during coding, determining dbi parameters to control how deblocking is applied.

In the illustrated implementation, recon quality analyzer & LF filtering generator 1018 may be capable of analyzing and performing loop filtering, determining lfi parameters (e.g., filter coefficients, filter index, filter block map, or the like).

In the illustrated implementation, motion estimator, motion compensation analyzer & motion compensated AM filter predictor & ref picture stores 1023 may be capable of improving motion compensated prediction, determining ami parameters.

In the illustrated implementation, intra predictor 1024 may be capable of performing intra prediction.

In the illustrated implementation, prediction modes analyzer & mode selector 1025 may be capable of selecting between various motion prediction modes and intra prediction modes available on a block basis, and selecting prediction references.

In the illustrated implementation, prediction efficiency analyzer & enhanced prediction filtering generator 1030 may be capable of optionally filtering the prediction signal so that both the filtered version as well as not filtered version can be provided to prediction modes analyzer & mode selector 1025, determining epi parameters.

Figure 11:
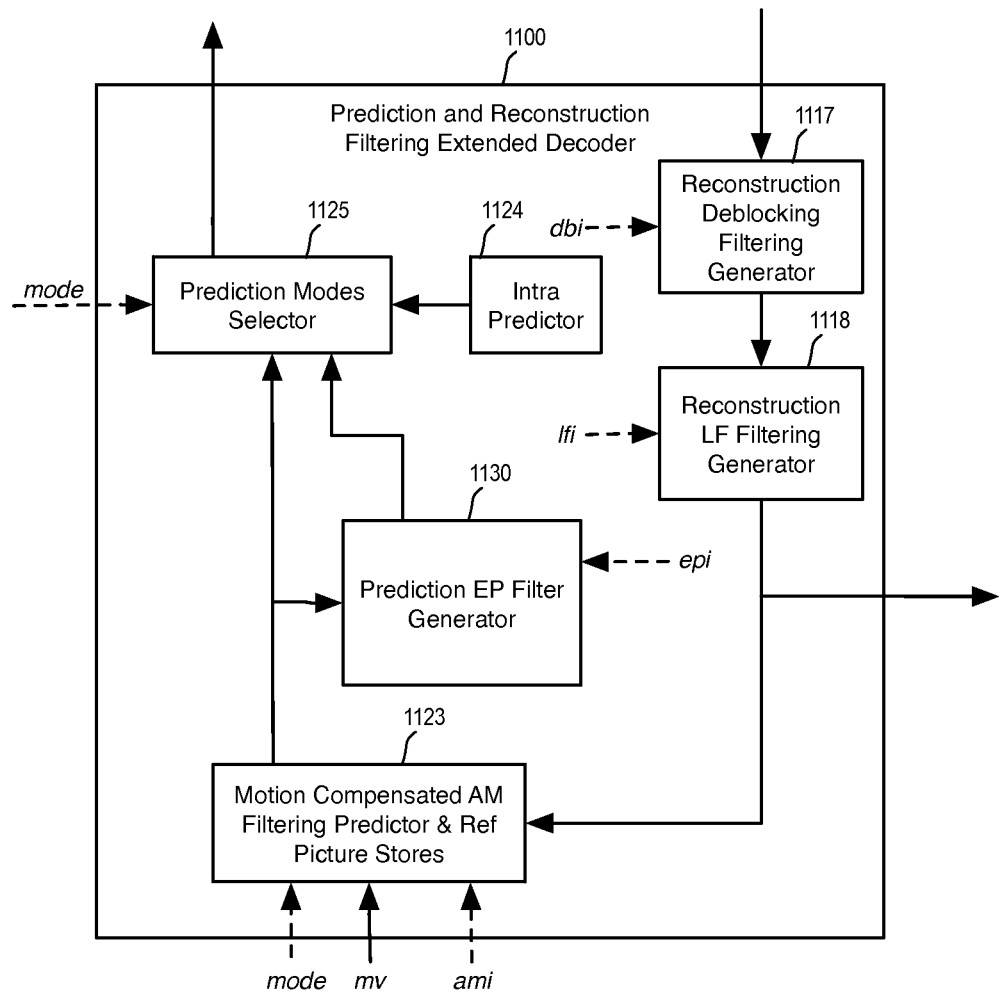
FIG. 11 is an illustrative diagram of an example decoder filter subsystem.

FIG. 11 is an illustrative diagram of an example decoder subsystem 1100, arranged in accordance with at least some implementations of the present disclosure. As shown, decoder subsystem 1100 may include reconstruction deblocking filtering generator 1117, reconstruction LF filtering generator 1118, motion compensated AM filtering predictor & ref picture stores 1123, intra predictor 1124, prediction modes selector 1125, and/or prediction EP filter generator 1130.

In the illustrated implementation, reconstruction deblocking filter generator 1117 may be capable of deblocking. The operation of reconstruction deblocking filter generator 1117 may be controlled by dbi parameters received from, for example, encoder 100 of FIG. 1.

In the illustrated implementation, reconstruction LF filtering generator 1118 may be capable of performing loop filtering. The operation of reconstruction LF filtering generator 1118 may be controlled by lfi parameters received from, for example, encoder 100 of FIG. 1.

In the illustrated implementation, motion compensated AM filtering predictor & ref picture stores 1123 may be capable of AM filtering. The operation of motion compensated AM filtering predictor & ref picture stores 1123 may be controlled by ami parameters received from, for example, encoder 100 of FIG. 1.

In the illustrated implementation, intra predictor 1124 may be capable of performing intra prediction.

In the illustrated implementation, prediction modes selector 1125 may be capable of determining a prediction mode selection from among, "skip", "auto", "inter", "multi", and "intra", for each prediction partition of a tile, all of which may apply to P- and F/B-pictures, based on mode selection data in, for example, input bitstream 201. In addition to prediction modes, prediction modes selector 1125 also allows for selection of reference types that can be different depending on "inter" or "multi" mode, as well as for P- and F/B-pictures.

Figure 12:
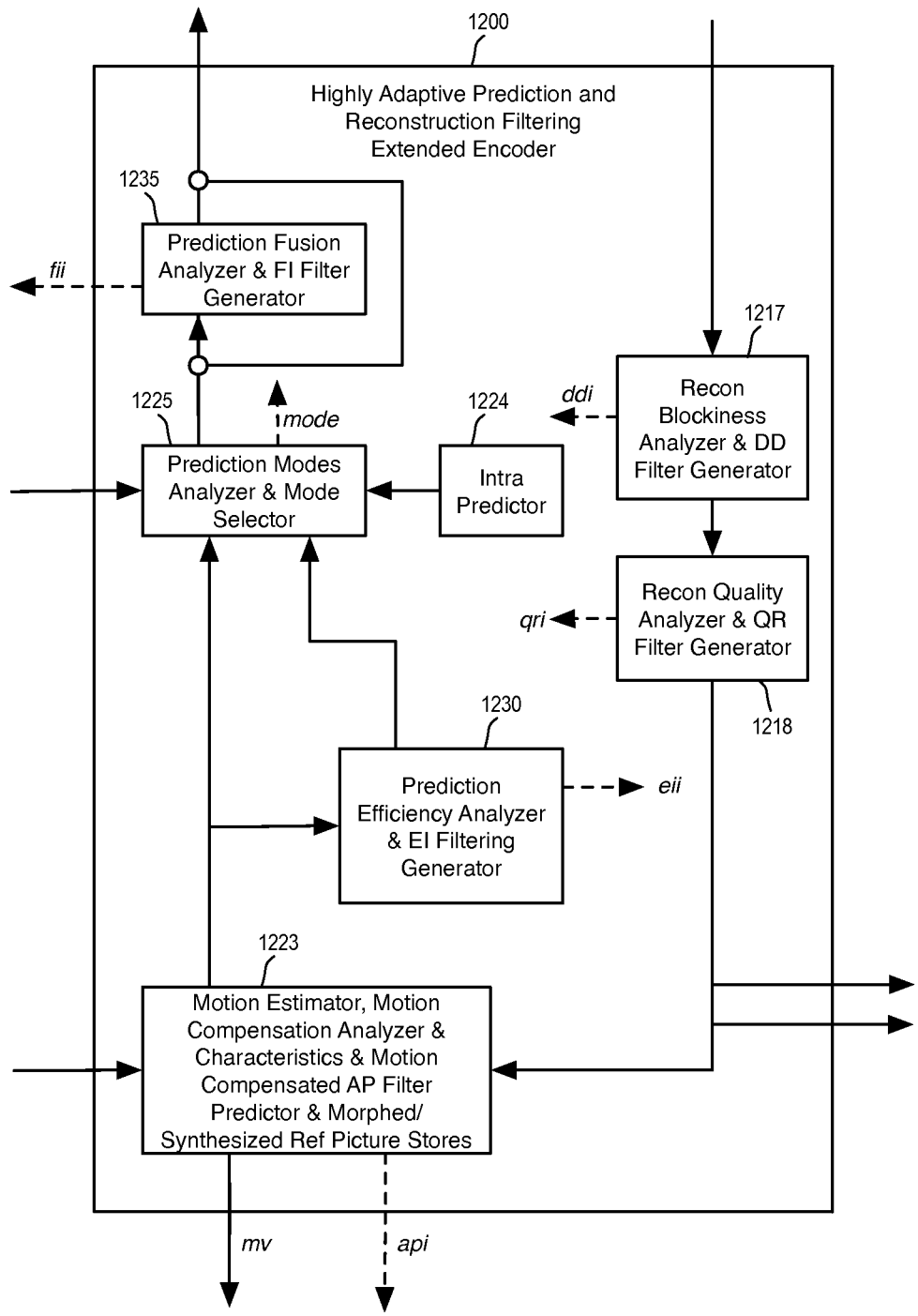
FIG. 12 is an illustrative diagram of an example encoder filter subsystem.

FIG. 12 is an illustrative diagram of an example encoder subsystem 1200, arranged in accordance with at least some implementations of the present disclosure. As shown, encoder subsystem 1200 may include recon blockiness analyzer & DD filter generator 1217, recon quality analyzer & QR filter generator 1218, motion estimator, motion compensation analyzer & characteristics & motion compensated AP filter predictor & morphed/synthesized ref picture stores 1223, intra predictor 1224, prediction modes analyzer & mode selector 1225, prediction efficiency analyzer & EI filtering generator 1230, and/or prediction fusion analyzer & FI filter generator 1235.

In the illustrated implementation, recon blockiness analyzer & DD filter generator 1217 may be capable of analysis of blocking produced during coding, determining ddi parameters to control how deblocking may be applied. Recon blockiness analyzer & DD filter generator 1617 may operate on 4 pixels at a time to remove blockiness from encoded video that may use a variety of block sizes for motion compensation and transform coding. Recon blockiness analyzer & DD filter generator 1217 may also use a dithering operation that may further reduces the appearance of blockiness without reducing statistical (PSNR) metrics.

In the illustrated implementation, recon quality analyzer & QR filter generator 1218 may be capable of performing quality restoration filtering, outputting qri parameters that may be sent to the decoder via the bitstream. Recon quality analyzer & QR filter generator 1218 may use a Wiener filter that may be nonsymmetric, point symmetric or hybrid (party symmetric partly nonsymmetric) of 9×9 square or shapes that are a subset of 9×9 or 11×9 coefficients. Recon quality analyzer & QR filter generator 1218 may minimize filtering overhead by use of a codebook search, so either the computed coefficients (after prediction) may be encoded and sent to the decoder or an index to a history filter or codebook filter may be sent to the decoder. Recon quality analyzer & QR filter generator 1218 may correct filter coefficients from a codebook by sending a correction term, and the codebook may be updated while encoding progresses. Both luma and chroma signals may be filtered and may use different shapes and filter sizes.

In the illustrated implementation, motion estimator, motion compensation analyzer & characteristics & motion compensated AP filter predictor & morphed/synthesized ref picture stores 1223 may be capable of performing adaptive precision filtering and outputting api parameters that may be sent to the decoder via the bitstream. Motion estimator, motion compensation analyzer & characteristics & motion compensated AP filter predictor & morphed/synthesized ref picture stores 1223 may use a Wiener filter that may use explicitly computed filters for each of 16, ¼ pel location. Motion estimator, motion compensation analyzer & characteristics & motion compensated AP filter predictor & morphed/synthesized ref picture stores 1223 may generate filtering combinations using a series of available filters in the codebook by using a mix and match approach, allowing for different types of content, such as slow motion to high motion (blurry content) with corresponding filters. Motion estimator, motion compensation analyzer & characteristics & motion compensated AP filter predictor & morphed/synthesized ref picture stores 1223 may create new filter combinations from mixing and matching specific ¼ pel locations from multiple filters.

In the illustrated implementation, intra predictor 1224 may be capable of performing intra prediction.

In the illustrated implementation, prediction modes analyzer & mode selector 1225 may be capable of may be capable of selecting between various motion prediction modes and intra prediction modes available on a block basis, and selecting prediction references.

In the illustrated implementation, prediction efficiency analyzer & EI filtering generator 1230 may be capable of outputting filtered prediction signals and eii filter parameters that may be sent to the decoder via bitstream.

In the illustrated implementation, prediction fusion analyzer & FI filter generator 1235 may be capable of receiving output from prediction modes analyzer & mode selector 1225 and performing an analysis of predicted picture (region, or 1 or more slices) to determine how filtering may improve the prediction signal and thereby reduce prediction errors in the actual signal that is coded. The filtering information, including whether one filter or multiple filters (on one or more block types) may be used, along with actual filter coefficients, index to history or codebook based prediction, and associated coefficient prediction differences, may be sent as fii information. Prediction fusion analyzer & FI filter generator 1235 may use a Wiener filter that may be nonsymmetric, point symmetric or hybrid (party symmetric partly nonsymmetric) of 9×9 square or shapes that are a subset of 9×9 or 11×9 coefficients. Prediction fusion analyzer & FI filter generator 1235 may minimize filtering overhead by use of a codebook search, so either the computed coefficients (after prediction) may be encoded and sent to the decoder or an index to a history filter or codebook filter may be sent to the decoder. Prediction fusion analyzer & FI filter generator 1235 may correct filter coefficients from a codebook by sending a correction term, and the codebook may be updated while encoding progresses. Both luma and chroma signals may be filtered and may use different shapes and filter sizes.

Figure 13:
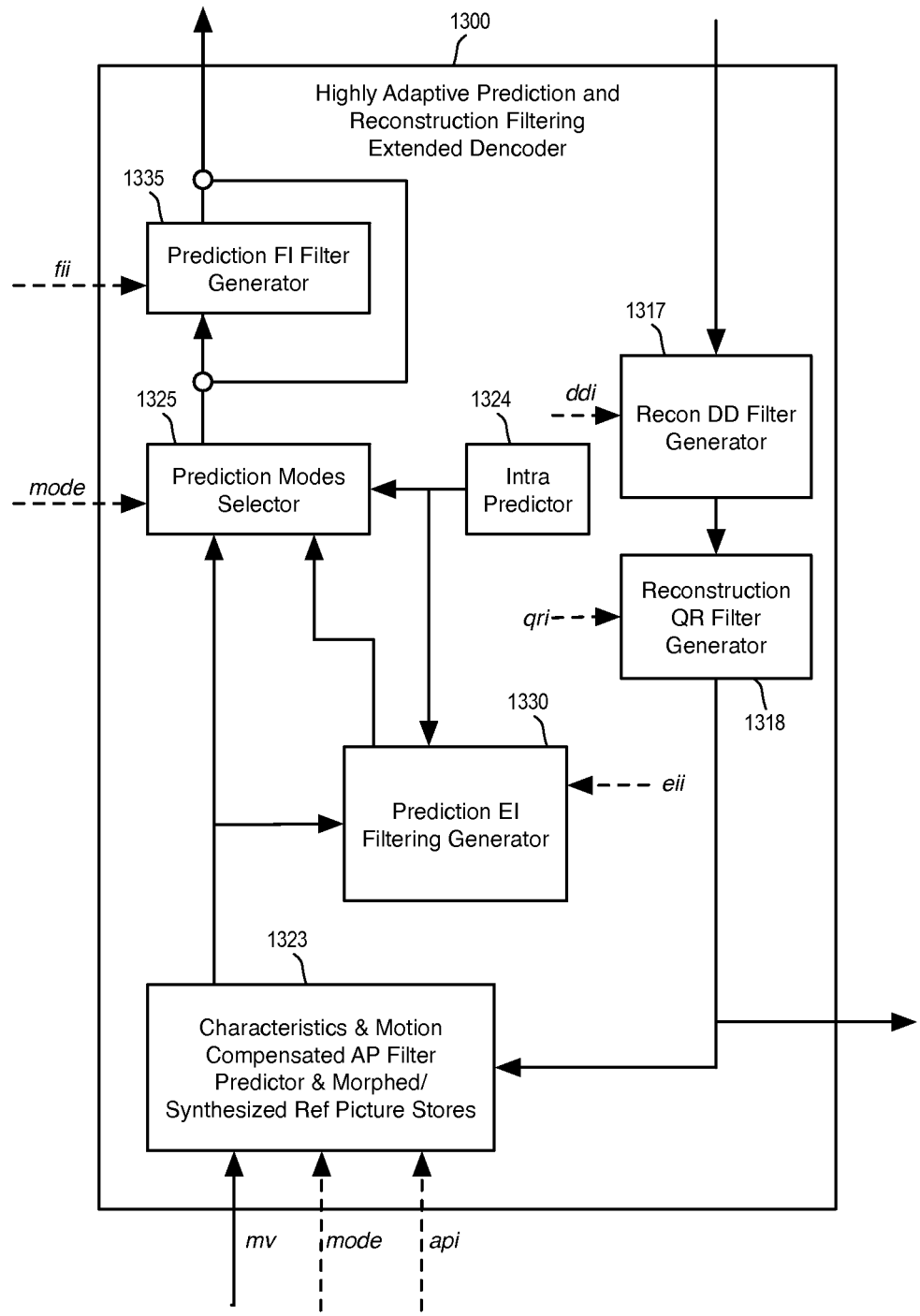
FIG. 13 is an illustrative diagram of an example decoder filter subsystem.

FIG. 13 is an illustrative diagram of an example decoder subsystem 1300, arranged in accordance with at least some implementations of the present disclosure. As shown, decoder subsystem 1300 may include reconstruction DD filter generator 1317, reconstruction QR filter generator 1318, characteristics & motion compensated AP filter predictor & morphed/synthesized ref picture stores 1323, intra predictor 1324, prediction modes selector 1325, prediction EI filtering generator 1330, and/or prediction FI filter generator 1335.

In the illustrated implementation, reconstruction DD filter generator 1317 may be capable of deblocking and de-dithering the reconstructed signal, guided by the ddi parameters that are decoded at the decoder from the bitstream.

In the illustrated implementation, reconstruction QR filter generator 1318 may be capable of performing QR filtering, guided by qri filtering parameters decoded from the bitstream.

In the illustrated implementation, characteristics & motion compensated AP filter predictor & morphed/synthesized ref picture stores 1323 may be capable of performing adaptive precision filtering, guided by api filtering parameters decoded from the bitstream.

In the illustrated implementation, intra predictor 1324 may be capable of performing intra prediction.

In the illustrated implementation, prediction modes selector 1325 may be capable of selecting between various motion prediction modes and intra prediction modes available on a block basis, and selecting prediction references.

In the illustrated implementation, prediction EI filtering generator 1330 may be capable of generating filtered prediction for selection by prediction modes analyzer & mode selector 1325 based on the prediction mode information sent in the bitstream by the encoder. Prediction efficiency analyzer & EI filtering generator 1330 may perform filtering which may be locally block adaptive and responsive to the mode information carried via the bitstream to the decoder.

In the illustrated implementation, prediction FI filter generator 1335 may be capable of performing fusion improvement filtering by receiving output from prediction modes selector 1325 and, under guidance from the fii information, performing actual filtering.

Figure 14:
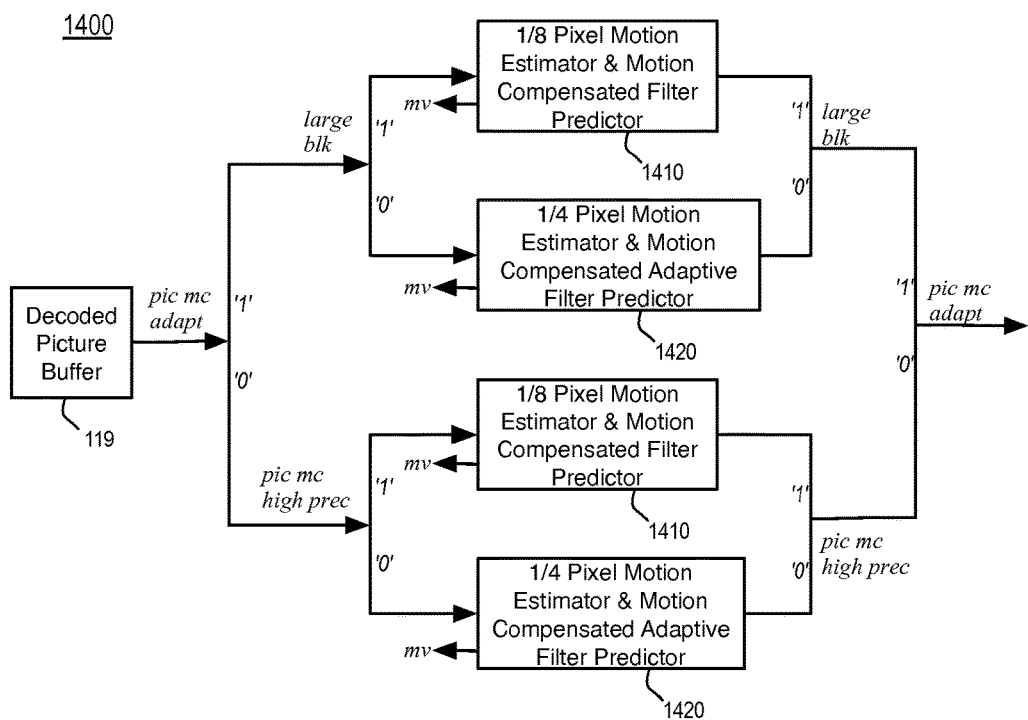
FIG. 14 is an illustrative diagram of an example encoder filter subsystem.

FIG. 14 is an illustrative diagram of an example encoder filter subsystem 1400, arranged in accordance with at least some implementations of the present disclosure. As shown, encoder filter subsystem 1400 may include decoded picture buffer module 119, ⅛ pixel motion estimator and motion compensated filter predictor module 1410, and/or ¼ pixel motion estimator and motion compensated adaptive filter predictor module 1420.

FIG. 14 illustrates an example Content Adaptive, ¼ vs ⅛ pel Precision and Filtering Selection in Motion Compensated Encoding, as per some implementations of the present disclosure.

Figure 17:
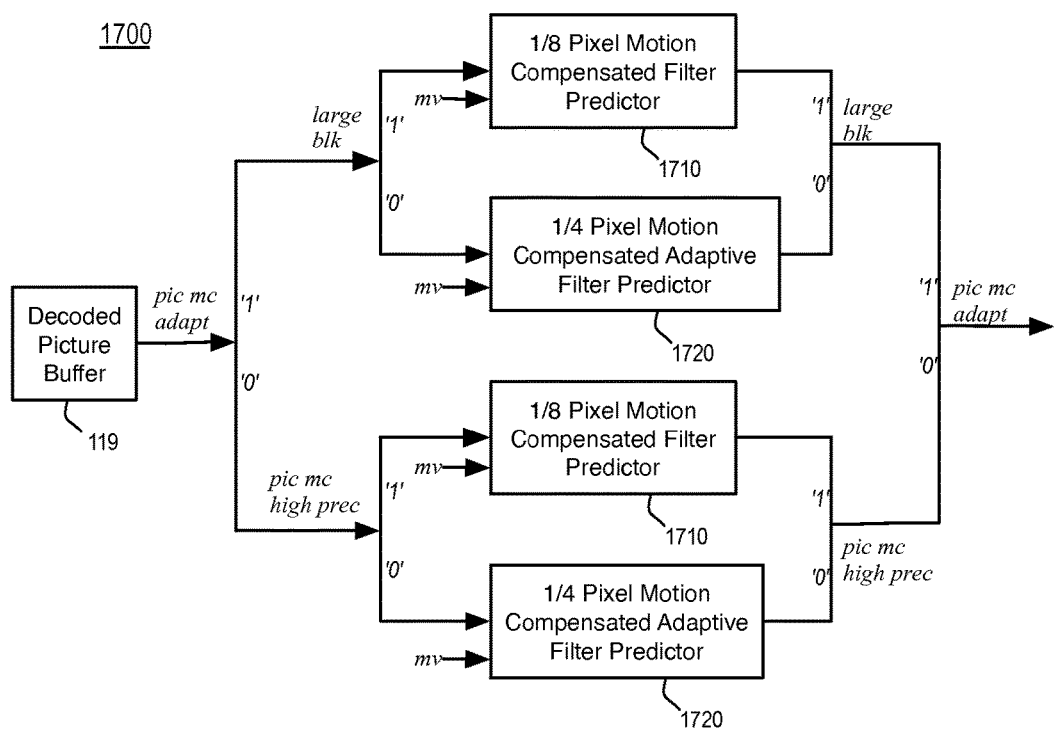
FIG. 17 is an illustrative diagram of an example decoder filter subsystem.

For example, FIG. 14 and FIG. 17 show a logical view of a first embodiment of the Content Adaptive, ¼ vs ⅛ pel Precision and Filtering Selection in Motion Compensated Encoding and Decoding as per some implementations of the present disclosure. For example, on a picture basis 3 modes can be selected, the first two may be fixed (either ¼$^{th}$ pixel accuracy or ⅛$^{th}$ pixel accuracy motion compensation) modes for all blocks of picture, and the third mode may be an adaptive mode that allows the selection on a block basis of $\frac{1}{4}^{th}$ pixel or $\frac{1}{8}^{th}$ pixel accuracy for motion compensation. To reduce the signaling overhead, the block adaptive mode may use the concept of block size (large blocks=0/1) with large blocks using $\frac{1}{8}^{th}$ pixel accuracy and small blocks using $\frac{1}{4}^{th}$ pixel accuracy.

In the illustrated implementation, decoded picture buffer module 119 may be capable of generating a decoded reference picture or portion thereof.

In the illustrated implementation, $\frac{1}{8}$ pixel motion estimator and motion compensated filter predictor module 1410 may be capable of determining predicted pixel data of a predicted partition associated with a prediction partition by filtering a portion of a decoded reference picture on a $\frac{1}{8}$ pixel precision basis.

In the illustrated implementation, $\frac{1}{4}$ pixel motion estimator and motion compensated adaptive filter predictor module 1420 may be capable of determining predicted pixel data of a predicted partition associated with a prediction partition by filtering a portion of a decoded reference picture on a $\frac{1}{4}$ pixel precision basis.

Referring back to FIG. 9, in some implementation, a frame to be coded may be divided into processing units called tiles. As disclosed herein, video coding may supports two tile sizes, 32×32, and 64×64, with 64×64 size used for all standard definition and higher size video for coding of all picture types (I-, P-, or F-) and for coding of I- and F-pictures of all sizes, while 32×32 size is used for P-pictures of lower resolution sequences, for example.

Generally video codecs use motion filtering for motion compensation at sub pixel accuracy; however, the sub pixel precision is constant/fixed and the filters are constant/fixed. Conversely, techniques for video coding as disclosed herein may allow selection of motion compensation precision and filters for better content adaptive coding. For example, techniques for video coding as disclosed herein may supports motion compensated (MC) block sizes from 64×64 to 4×4, and may allow transmission of Motion In some examples, vectors at all block sizes may be supported. For complex motion with low detail content the block sizes can be small.

Techniques for video coding as disclosed herein may allow for adaptive motion filters. These motion filters can achieve arbitrary high precision and may compensate video as good as constant high precision MC. Adaptive filtering with precision choice may allow video coding as disclosed herein to work in low precision bit cost while adapting the filters to high precision if needed. For instance, a large number of small blocks and high precision can incur very high bit cost with no advantage in MC residual reduction. Therefore, precision selection may be important for motion complexity adaptive coding. In some examples, selection may be made of a ¼th pixel precision for the entire picture, or a ⅛th pixel precision for the entire picture, or a ⅛th pixel precision for a pre-decided set of large block sizes in the picture and ¼th pixel precision for the remaining smaller block sizes in the picture. The pre-decided set of large and small block sizes may be different for different picture types.

In some examples, precision choices may be made between 3 modes: Mode0: Block Size based Selection; Mode1: $\frac{1}{4}^{th}$ Pel precision; and/or Mode2: $\frac{1}{8}^{th}$ Pel precision Table 11 below illustrates example criteria for selecting such modes based on P picture block size.

TABLE 11

P Picture Block Size based Precision Choice

| | H | | | | |
|---|---|---|---|---|---|
| W | 64 | 32 | 16 | 8 | 4 |
| 64 | 8 | 8 | 8 | 8 | 4 |
| 32 | 8 | 8 | 8 | 8 | 4 |
| 16 | 8 | 8 | 8 | 8 | 4 |
| 8 | 8 | 8 | 8 | 8 | 4 |
| 4 | 4 | 4 | 4 | 4 | 4 |

TABLE 12

F Picture Block Size based Precision Choice

| | H | | | | |
|---|---|---|---|---|---|
| W | 64 | 32 | 16 | 8 | 4 |
| 64 | 8 | 8 | 8 | 8 | 4 |
| 32 | 8 | 8 | 8 | 8 | 4 |
| 16 | 8 | 8 | 8 | 8 | 4 |
| 8 | 8 | 8 | 8 | 4 | 4 |
| 4 | 4 | 4 | 4 | 4 | 4 |

Filter Selection

In some examples, a "Filt" code may be transmitted/received to select the $\frac{1}{4}^{th}$ sub pixel location filters from a codebook of filters (Q). These filters may be non-separable filters of different shapes with different taps appropriate for each $\frac{1}{4}^{th}$ sub pixel location. $\frac{1}{4}^{th}$ sub pixel filters may always be used when the sub pixel location is a $\frac{1}{4}^{th}$ sub pixel location and does not depend on precision selection, for example. There may be fixed $\frac{1}{8}^{th}$ pixel Filters for all the one dimensional $\frac{1}{8}^{th}$ phases required. Horizontal phase filtering may be performed first, followed by vertical phase filtering to generate any of the $\frac{1}{8}^{th}$ sub pixel locations which are not $\frac{1}{4}^{th}$ sub pixel locations. Table 13, illustrates $\frac{1}{4}$ pel and $\frac{1}{8}$ pel filtering used for each of $\frac{1}{8}$th pel locations.

TABLE 13

¼ pel and ⅛ pel filtering used for each of ⅛$^{th}$ pel locations

| h/v phase | 0 | 1 | 2 | 3 | 4 | 5 | 6 | 7 |
|---|---|---|---|---|---|---|---|---|
| 0 | — | F01 | Q02[filt] | F03 | Q04[filt] | F05 | Q06[filt] | F07 |
| 1 | F10 | F11 | F12 | F13 | F14 | F15 | F16 | F17 |
| 2 | Q20[Filt] | F21 | Q22[Filt] | F23 | Q24[Filt] | F25 | Q26[Filt] | F27 |
| 3 | F30 | F31 | F32 | F33 | F34 | F35 | F36 | F37 |
| 4 | Q40[Filt] | F41 | Q42[Filt] | F43 | Q44[Filt] | F45 | Q46[Filt] | F47 |
| 5 | F50 | F51 | F52 | F53 | F54 | F55 | F56 | F57 |
| 6 | Q60[Filt] | F61 | Q62 [Filt] | F63 | Q64[Filt] | F65 | Q66[Filt] | F67 |
| 7 | F70 | F71 | F72 | F73 | F74 | F75 | F76 | F77 |

Figure 15:
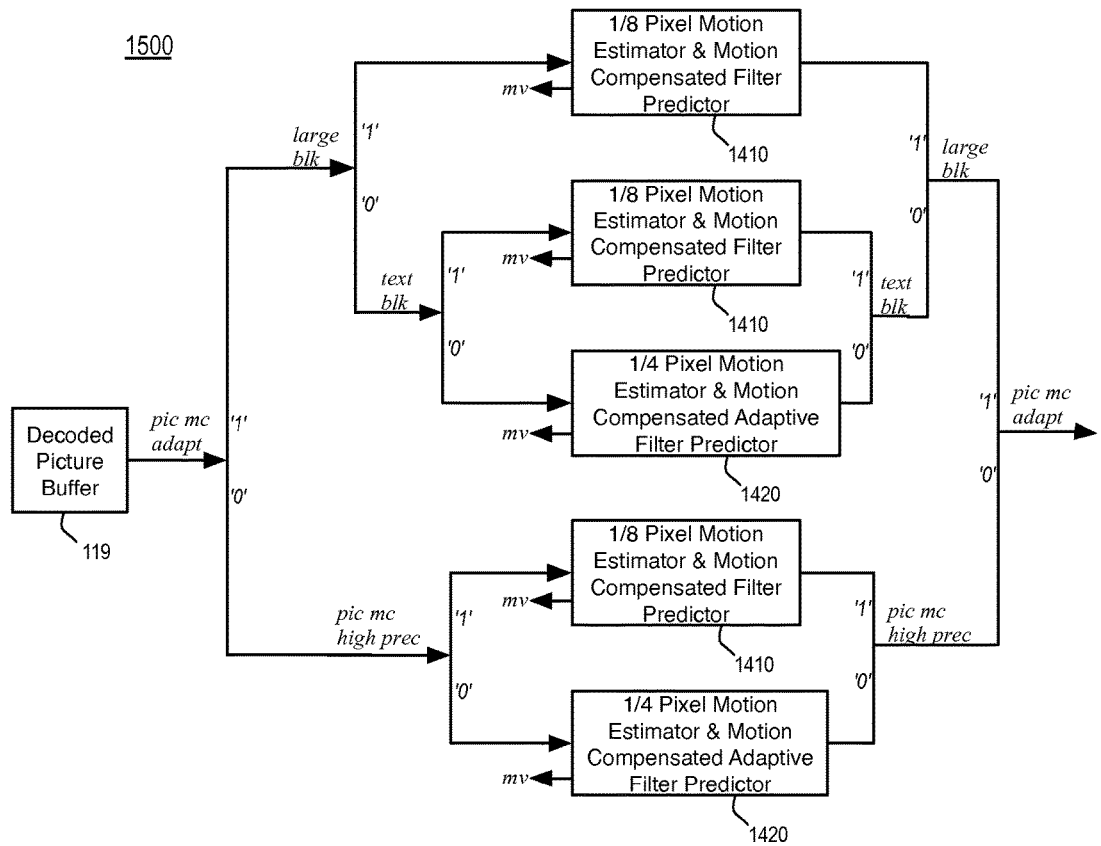
FIG. 15 is an illustrative diagram of an example encoder filter subsystem.

FIG. 15 is an illustrative diagram of an example encoder filter subsystem 1500, arranged in accordance with at least some implementations of the present disclosure. As shown, encoder filter subsystem 1500 may include decoded picture buffer module 119, ⅛ pixel motion estimator and motion compensated filter predictor module 1410, and/or ¼ pixel motion estimator and motion compensated adaptive filter predictor module 1420. As in FIG. 14 above, in the illustrated implementation of FIG. 15, decoded picture buffer module 119, ⅛ pixel motion estimator and motion compensated filter predictor module 1410, and/or ¼ pixel motion estimator and motion compensated adaptive filter predictor module 1420 may have capabilities as discussed above but are not delineated here for the sake of brevity.

FIG. 15 illustrates another embodiment of Content Adaptive, ¼ vs ⅛ pel Precision and Filtering Selection in Motion Compensated Encoding as per some implementations of the present disclosure.

Figure 18:
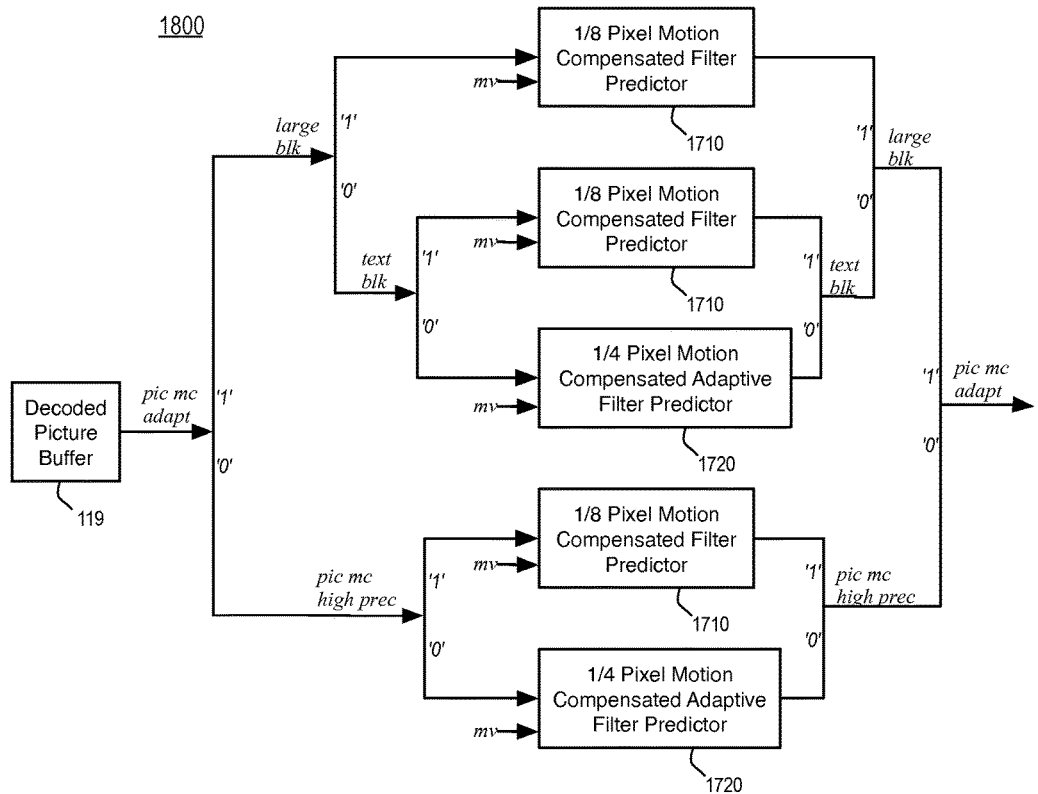
FIG. 18 is an illustrative diagram of an example decoder filter subsystem.

For example, FIG. 15 and FIG. 18 show a logical view of a second embodiment of the Content Adaptive, ¼ vs ⅛ pel Precision and Filtering Selection in Motion Compensated Encoding and Decoding as per some implementations of the present disclosure. In this embodiment on a picture basis 3 modes can be selected, the first two are fixed (either $¼^{th}$ pixel accuracy or $⅛^{th}$ pixel accuracy motion compensation) modes for all blocks of picture, and the third mode is adaptive mode that allows the selection on a block basis of $¼^{th}$ pixel or $⅛^{th}$ pixel accuracy for motion compensation. To keep the signaling overhead low, the block adaptive mode in addition to large block (large blk=0/1) uses the concept of textured blocks (text. blk=0/1) for the case when large block is set to 0. By sending small amount of overhead, one can make explicit choice between ¼ or ⅛ pel accuracy thus balancing the overhead with saving in bit costs of sending motion vectors.

Figure 16:
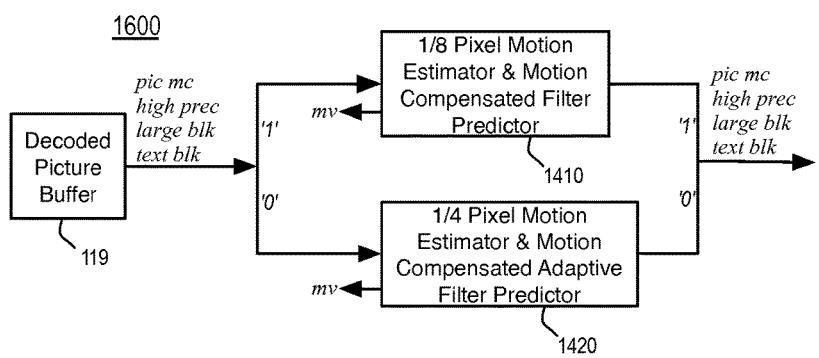
FIG. 16 is an illustrative diagram of an example encoder filter subsystem.

FIG. 16 is an illustrative diagram of an example encoder filter subsystem 1600, arranged in accordance with at least some implementations of the present disclosure. As shown, encoder filter subsystem 1600 may include decoded picture buffer module 119, ⅛ pixel motion estimator and motion compensated filter predictor module 1410, and/or ¼ pixel motion estimator and motion compensated adaptive filter predictor module 1420. As in FIG. 14 above, in the illustrated implementation of FIG. 16, decoded picture buffer module 119, ⅛ pixel motion estimator and motion compensated filter predictor module 1410, and/or ¼ pixel motion estimator and motion compensated adaptive filter predictor module 1420 may have capabilities as discussed above but are not delineated here for the sake of brevity.

Figure 19:
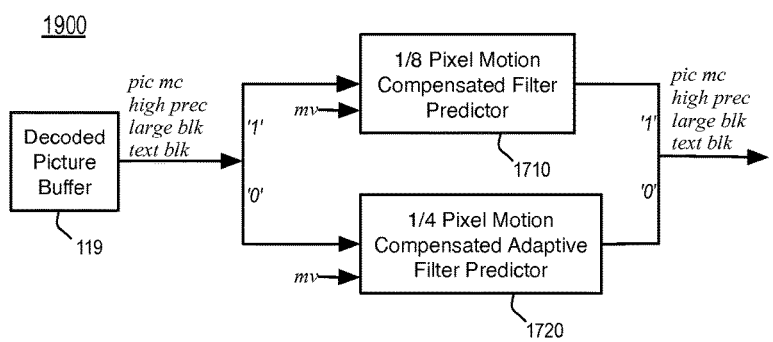
FIG. 19 is an illustrative diagram of an example decoder filter subsystem.

FIG. 16 illustrates an implementation view of embodiments of FIG. 14 and FIG. 15, per some implementations of the present disclosure. For example, FIG. 16 and FIG. 19 show an implementation centric view that can be used to accommodate either of the embodiments shown by pairs FIGS. 14 and 17, and FIGS. 15 and 18.

FIG. 17 is an illustrative diagram of an example decoder filter subsystem 1700, arranged in accordance with at least some implementations of the present disclosure. As shown, decoder filter subsystem 1700 may include decoded picture buffer module 119, ⅛ pixel motion compensated filter predictor module 1710, and/or ¼ pixel motion compensated adaptive filter predictor module 1720.

FIG. 17 illustrates an example of Content Adaptive, ¼ vs ⅛ pel Precision and Filtering Selection in Motion Compensated Decoding, per some implementations of the present disclosure. For example, FIG. 17 shows a logical view of a first embodiment of the Content Adaptive, ¼ vs ⅛ pel Precision and Filtering Selection in Motion Compensated Decoding as per ome implementations of the present disclosure.

For example, FIG. 17 shows a logical view of a first embodiment of the Content Adaptive, ¼ vs ⅛ pel Precision and Filtering Selection in Motion Compensated Encoding and Decoding as per some implementations of the present disclosure. For example, on a picture basis 3 modes can be selected, the first two may be fixed (either $¼^{th}$ pixel accuracy or $⅛^{th}$ pixel accuracy motion compensation) modes for all blocks of picture, and the third mode may be an adaptive mode that allows the selection on a block basis of $¼^{th}$ pixel or $⅛^{th}$ pixel accuracy for motion compensation. To reduce the signaling overhead, the block adaptive mode may use the concept of block size (large blocks=0/1) with large blocks using $⅛^{th}$ pixel accuracy and small blocks using $¼^{th}$ pixel accuracy.

FIG. 18 is an illustrative diagram of an example decoder filter subsystem 1800, arranged in accordance with at least some implementations of the present disclosure. As shown, decoder filter subsystem 1800 may include decoded picture buffer module 119, ⅛ pixel motion compensated filter predictor module 1710, and/or ¼ pixel motion compensated adaptive filter predictor module 1720. As in FIG. 17 above, in the illustrated implementation of FIG. 18, decoded picture buffer module 119, ⅛ pixel motion compensated filter predictor module 1710, and/or ¼ pixel motion compensated adaptive filter predictor module 1720 may have capabilities as discussed above but are not delineated here for the sake of brevity.

FIG. 18 illustrates another embodiment of Content Adaptive, ¼ vs ⅛ pel Precision and Filtering Selection in Motion Compensated Decoding, per some implementations of the present disclosure. For example, FIG. 18 shows a logical view of a second embodiment of the Content Adaptive, ¼ vs ⅛ pel Precision and Filtering Selection in Motion Compensated Decoding as per some implementations of the present disclosure.

For example, FIG. 18 shows a logical view of a second embodiment of the Content Adaptive, ¼ vs ⅛ pel Precision and Filtering Selection in Motion Compensated Encoding and Decoding as per some implementations of the present disclosure. In this embodiment on a picture basis 3 modes can be selected, the first two are fixed (either $¼^{th}$ pixel accuracy or $⅛^{th}$ pixel accuracy motion compensation) modes for all blocks of picture, and the third mode is adaptive mode that allows the selection on a block basis of $¼^{th}$ pixel or $⅛^{th}$ pixel accuracy for motion compensation. To keep the signaling overhead low, the block adaptive mode in addition to large block (large blk=0/1) uses the concept of textured blocks (text. blk=0/1) for the case when large block is set to 0. By sending small amount of overhead, one can make explicit choice between ¼ or ⅛ pel accuracy thus balancing the overhead with saving in bit costs of sending motion vectors.

FIG. 19 is an illustrative diagram of an example decoder filter subsystem 1900, arranged in accordance with at least some implementations of the present disclosure. As shown, decoder filter subsystem 1900 may include decoded picture buffer module 119, ⅛ pixel motion compensated filter predictor module 1710, and/or ¼ pixel motion compensated adaptive filter predictor module 1720. As in FIG. 17 above, in the illustrated implementation of FIG. 19, decoded picture buffer module 119, ⅛ pixel motion compensated filter predictor module 1710, and/or ¼ pixel motion compensated adaptive filter predictor module 1720 may have capabilities as discussed above but are not delineated here for the sake of brevity.

FIG. 19 illustrates an implementation view of embodiments of FIG. 17 and FIG. 18. For example, FIG. 19 shows an implementation centric view that can be used to accommodate either of the two embodiments of FIG. 17 and/or FIG. 18.

Figure 20:
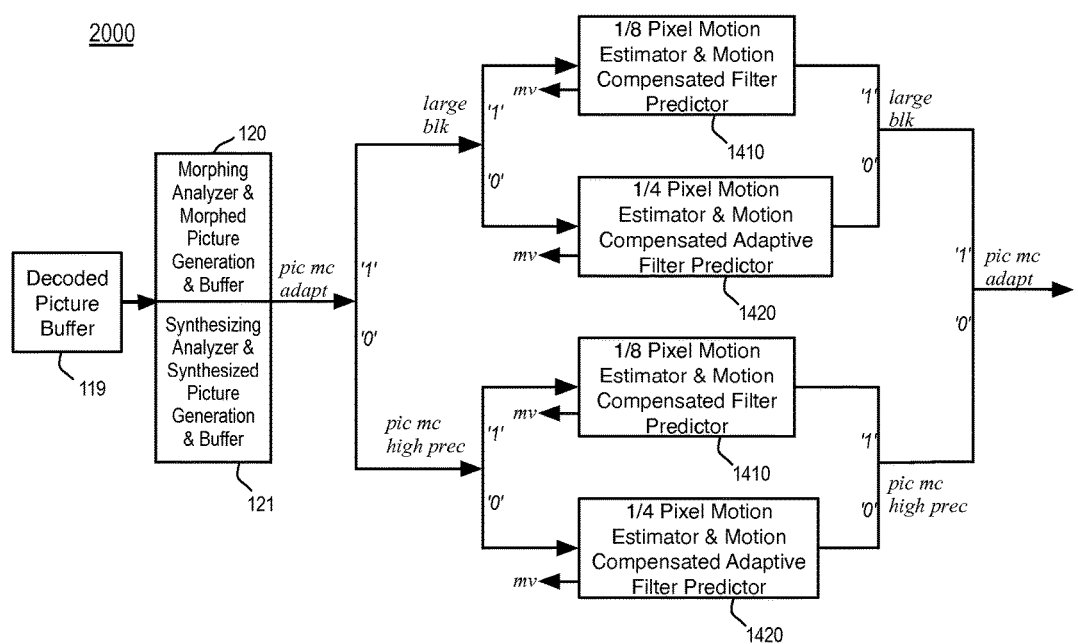
FIG. 20 is an illustrative diagram of an example encoder filter subsystem.

FIG. 20 is an illustrative diagram of an example encoder filter subsystem 2000, arranged in accordance with at least some implementations of the present disclosure. As shown, encoder filter subsystem 2000 may include decoded picture buffer module 119, morphing analyzer and morphed picture generation and buffer module 120, synthesizing analyzer and synthesized picture generation and buffer module 121, ⅛ pixel motion estimator and motion compensated filter predictor module 1410, and/or ¼ pixel motion estimator and motion compensated adaptive filter predictor module 1420.

As in FIG. 14 above, in the illustrated implementation of FIG. 20, decoded picture buffer module 119, ⅛ pixel motion estimator and motion compensated filter predictor module 1410, and/or ¼ pixel motion estimator and motion compensated adaptive filter predictor module 1420 may have capabilities as discussed above but are not delineated here for the sake of brevity.

This mode is similar to the mode described above in, for example, FIG. 14, except that instead of motion compensation being applied on reference pictures, it is applied on modified reference pictures such as those generated by application of morphing or synthesis parameters. Thus in FIG. 20, motion estimation and compensation is performed on morphed or synthesized pictures.

Figure 21:
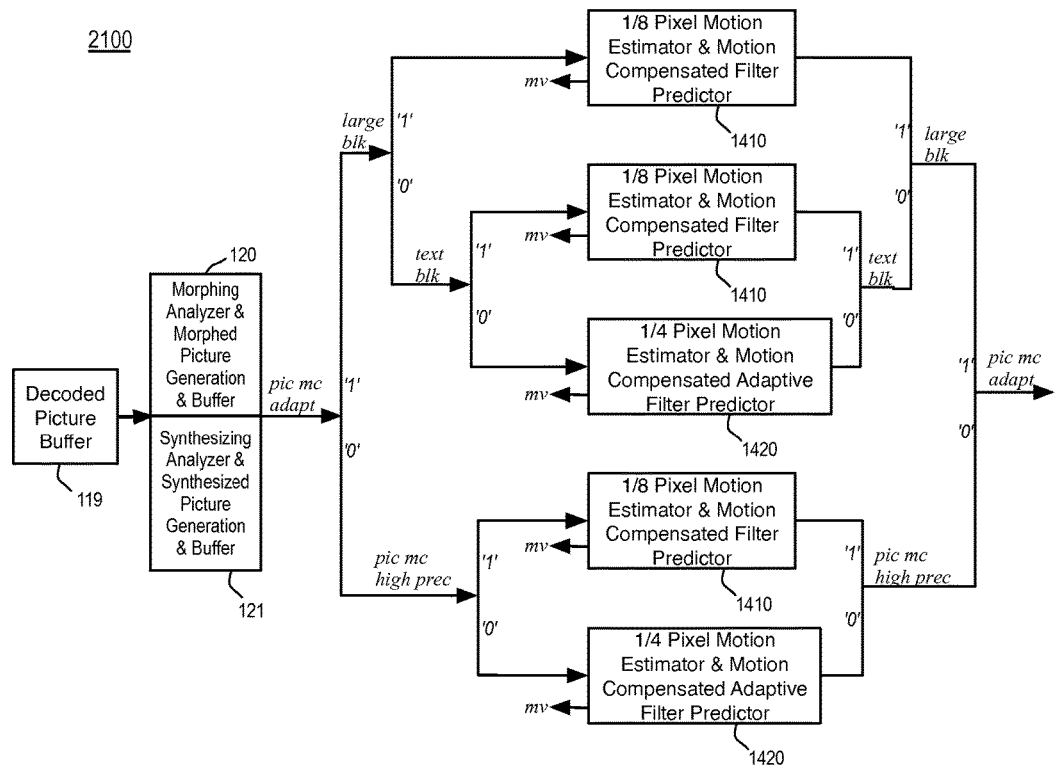
FIG. 21 is an illustrative diagram of an example encoder filter subsystem.

FIG. 21 is an illustrative diagram of an example encoder filter subsystem 2100, arranged in accordance with at least some implementations of the present disclosure. As shown, encoder filter subsystem 2100 may include decoded picture buffer module 119, morphing analyzer and morphed picture generation and buffer module 120, synthesizing analyzer and synthesized picture generation and buffer module 121, ⅛ pixel motion estimator and motion compensated filter predictor module 1410, and/or ¼ pixel motion estimator and motion compensated adaptive filter predictor module 1420. As in FIGS. 14 and 20 above, in the illustrated implementation of FIG. 21, decoded picture buffer module 119, morphing analyzer and morphed picture generation and buffer module 120, synthesizing analyzer and synthesized picture generation and buffer module 121, ⅛ pixel motion estimator and motion compensated filter predictor module 1410, and/or ¼ pixel motion estimator and motion compensated adaptive filter predictor module 1420 may have capabilities as discussed above but are not delineated here for the sake of brevity.

FIG. 21 illustrates another embodiment of Content Adaptive, ¼ vs ⅛ pel Precision and Filtering Selection in Characteristics and Motion Compensated Encoding, as per some implementations of the present disclosure. For example, FIG. 21 shows a logical view of yet an embodiment of the Content Adaptive, ¼ vs ⅛ pel Precision and Filtering Selection in Characteristics and Motion Compensated Encoding as per some implementations of the present disclosure. This mode may be similar to the mode described earlier with FIGS. 15 and 18, except that instead of motion compensation being applied on reference pictures, it may be applied on modified reference pictures such as those generated by application of morphing or synthesis parameters. Thus, as in FIG. 15, like motion estimation and compensation may be performed on morphed or synthesized pictures.

Figure 22:
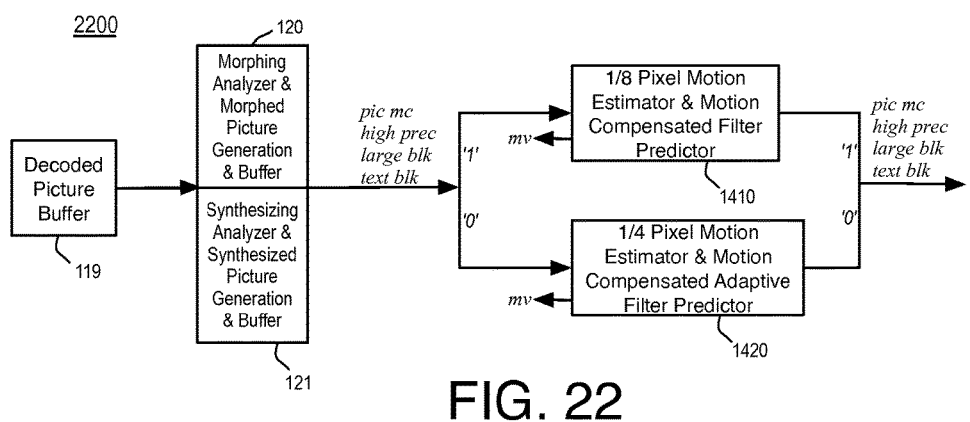
FIG. 22 is an illustrative diagram of an example encoder filter subsystem.

FIG. 22 is an illustrative diagram of an example encoder filter subsystem 2200, arranged in accordance with at least some implementations of the present disclosure. As shown, encoder filter subsystem 2200 may include decoded picture buffer module 119, morphing analyzer and morphed picture generation and buffer module 120, synthesizing analyzer and synthesized picture generation and buffer module 121, ⅛ pixel motion estimator and motion compensated filter predictor module 1410, and/or ¼ pixel motion estimator and motion compensated adaptive filter predictor module 1420. As in FIGS. 14 and 20 above, in the illustrated implementation of FIG. 22, decoded picture buffer module 119, morphing analyzer and morphed picture generation and buffer module 120, synthesizing analyzer and synthesized picture generation and buffer module 121, ⅛ pixel motion estimator and motion compensated filter predictor module 1410, and/or ¼ pixel motion estimator and motion compensated adaptive filter predictor module 1420 may have capabilities as discussed above but are not delineated here for the sake of brevity.

Figure 23:
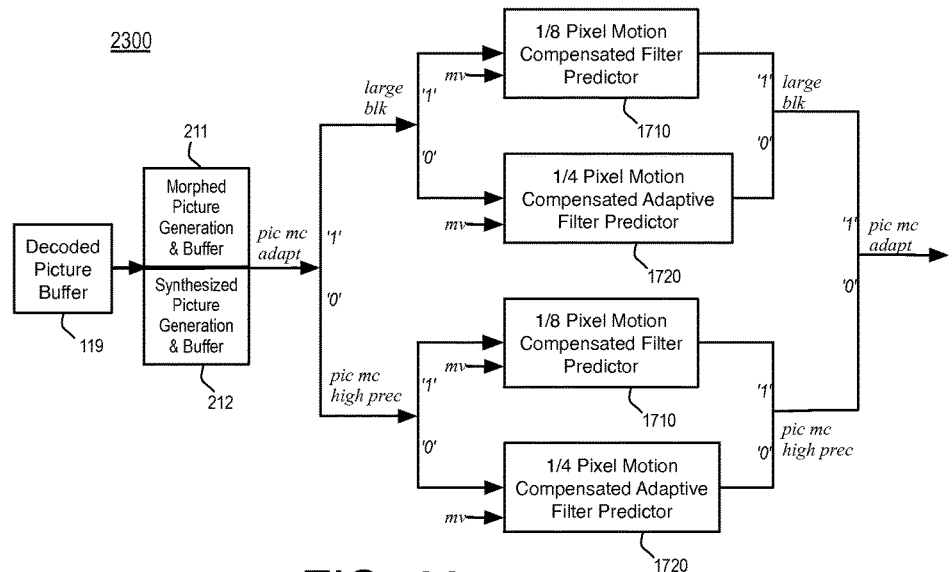
FIG. 23 is an illustrative diagram of an example decoder filter subsystem.

FIG. 23 is an illustrative diagram of an example decoder filter subsystem 2300, arranged in accordance with at least some implementations of the present disclosure. As shown, encoder filter subsystem 2300 may include decoded picture buffer module 119, morphed picture generation and buffer module 211, synthesized picture generation and buffer module 212, ⅛ pixel motion compensated filter predictor module 1710, and/or ¼ pixel motion compensated adaptive filter predictor module 1720. As in FIG. 17 above, in the illustrated implementation of FIG. 23, decoded picture buffer module 119, ⅛ pixel motion compensated filter predictor module 1710, and/or ¼ pixel motion compensated adaptive filter predictor module 1720 may have capabilities as discussed above but are not delineated here for the sake of brevity.

FIG. 23 illustrates an example implementation of a Content Adaptive, ¼ vs ⅛ pel Precision and Filtering Selection in Characteristics and Motion Compensated Decoding, as per some implementations of the present disclosure. FIG. 23 shows a logical view of a first embodiment of the Content Adaptive, ¼ vs ⅛ pel Precision and Filtering Selection in Characteristics and Motion Compensated Encoding as per some implementations of the present disclosure.

Figure 24:
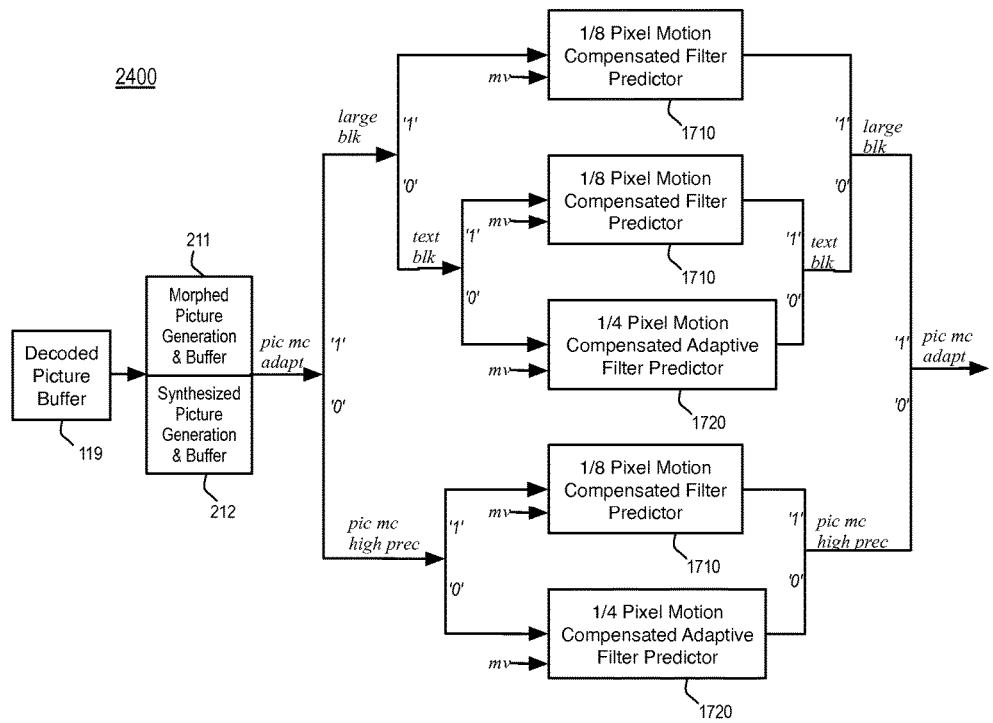
FIG. 24 is an illustrative diagram of an example decoder filter subsystem.

FIG. 24 is an illustrative diagram of an example decoder filter subsystem 2400, arranged in accordance with at least some implementations of the present disclosure. As shown, encoder filter subsystem 2400 may include decoded picture buffer module 119, morphed picture generation and buffer module 211, synthesized picture generation and buffer module 212, ⅛ pixel motion compensated filter predictor module 1710, and/or ¼ pixel motion compensated adaptive filter predictor module 1720. As in FIGS. 17 and 23 above, in the illustrated implementation of FIG. 24, decoded picture buffer module 119, morphed picture generation and buffer module 211, synthesized picture generation and buffer module 212, ⅛ pixel motion compensated filter predictor module 1710, and/or ¼ pixel motion compensated adaptive filter predictor module 1720 may have capabilities as discussed above but are not delineated here for the sake of brevity.

FIG. 24 illustrates another embodiment of Content Adaptive, ¼ vs ⅛ pel Precision and Filtering Selection in Characteristics and Motion Compensated Decoding, as per some implementations of the present disclosure. FIG. 24 shows a logical view of a second embodiment of the Content Adaptive, ¼ vs ⅛ pel Precision and Filtering Selection in Characteristics and Motion Compensated Encoding as per some implementations of the present disclosure.

Figure 25:
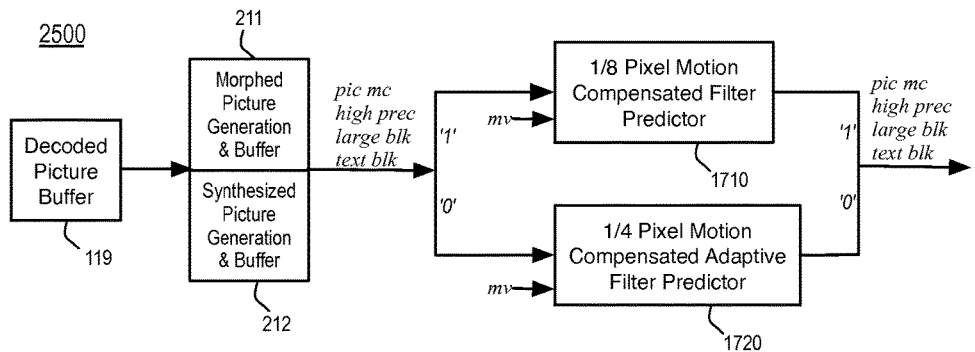
FIG. 25 is an illustrative diagram of an example decoder filter subsystem.

FIG. 25 is an illustrative diagram of an example decoder filter subsystem 2500, arranged in accordance with at least some implementations of the present disclosure. As shown, encoder filter subsystem 2500 may include decoded picture buffer module 119, morphed picture generation and buffer module 211, synthesized picture generation and buffer module 212, ⅛ pixel motion compensated filter predictor module 1710, and/or ¼ pixel motion compensated adaptive filter predictor module 1720. As in FIGS. 17 and 23 above, in the illustrated implementation of FIG. 25, decoded picture buffer module 119, morphed picture generation and buffer module 211, synthesized picture generation and buffer module 212, ⅛ pixel motion compensated filter predictor module 1710, and/or ¼ pixel motion compensated adaptive filter predictor module 1720 may have capabilities as discussed above but are not delineated here for the sake of brevity.

FIG. 25 illustrates an implementation view of embodiments of FIG. 23 and FIG. 24. FIG. 25 shows an implementation centric view that can be used to accommodate either of the two embodiments of FIG. 23 and/or FIG. 24.

Figure 26:
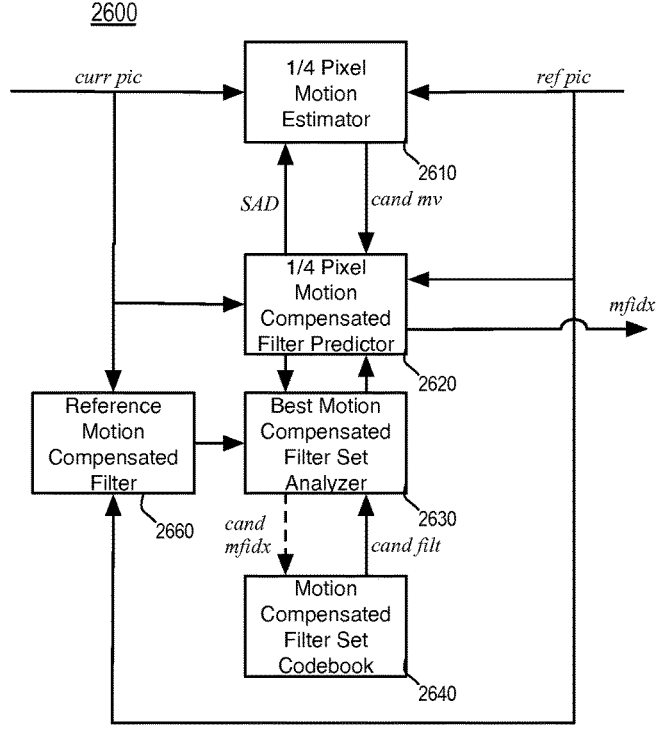
FIG. 26 is an illustrative diagram of an example encoder filter subsystem.

FIG. 26 is an illustrative diagram of an example encoder filter subsystem 2600, arranged in accordance with at least some implementations of the present disclosure. As shown, encoder filter subsystem 2600 may include ¼ pixel motion estimator module 2610, ¼ pixel motion compensated filter predictor module 2620, best motion compensated filter set analyzer module 2630, motion compensated filter set codebook module 2640, and/or reference motion compensated filter module 2660.

As illustrated, FIG. 26 details one implementation of a ¼ pel motion estimation (ME) and motion compensation (MC) Adaptive Filtering Predictor of this disclosure. In the implementations illustrated in FIGS. 14-16 and 20-22, while there has been shown a processing unit labeled ¼p ME & MC Adapt Filt Pred, a few words are in order how it differs for instance from a unit that might be nonadaptive.

This can best be shown by help of FIG. 26 that shows a Motion Estimator that estimates motion vectors to ¼ pel accuracy, a Motion Compensated predictor that uses the ¼ pel estimates to generate motion compensated prediction signal, a best motion compensated prediction analyzer with respect to result produced by a fixed reference technique, and a codebook of filters that can be indexed to obtain a candidate filter set. The reason we refer to a filter set instead of a single filter is because ¼ pel filtering requires choice of a set of 16 filters for each of ¼ pel locations. The codebook 2640 may be organized such that selection of an index provides a filter set of 16 filters for each of ¼ pel locations. While all the details of the codebook 2640 are not described herein, it may suffice here to know that the codebook may contains 256 filter sets, for example.

Figure 27:
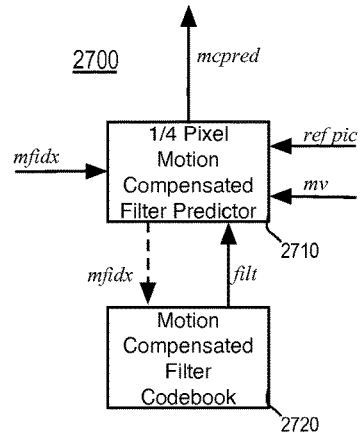
FIG. 27 is an illustrative diagram of an example decoder filter subsystem.

FIG. 27 is an illustrative diagram of an example decoder filter subsystem 2700, arranged in accordance with at least some implementations of the present disclosure. As shown, decoder filter subsystem 2700 may include ¼ pixel motion compensated filter predictor module 2710 and/or motion compensated filter codebook module 2720.

As illustrated, FIG. 27 details one implementation of a ¼ pel MC Adaptive Filtering Predictor of this disclosure. In the implementations illustrated in FIGS. 17-19 and 23-25 a processing unit labeled ¼p MC Adapt Filt Pred, was illustrated so a few words are in order regarding how it differs from a similar but nonadaptive unit.

This can best be shown by help of FIG. 27. FIG. 27 shows mfidx data being sent via bitstream being used at the decoder to access a codebook to retrieve coefficients for motion filtering. Such signaling would likely not be present in conventional systems as discussed above.

Referring to the various described processes and systems of FIGS. 14-27, these processes and systems might be generalized to work on a picture, region or slice basis. In other words, a choice of ¼ vs ⅛ filtering precision adaptation as well as adaptive selection of filter may be made more frequently that on a picture basis, such as on a region by region or slice by slice basis (this however requires transmitting the selection information more frequently via the bitstream) to the decoder to achieve even higher compression efficiency.

Also, the various described processes can be generalized to work with multiple codebooks for additional adaptivity. For instance, one might use a first codebook to represent low to medium sharpness (blurrier) content, and a second codebook to represent medium sharpness to highly sharp content. Then by content analysis and pre-selection to select the right codebook, a better match to wide range of content (region by region, frame by frame, or scene by scene basis) can be achieved. The chosen codebook would need to be signaled to the decoder.

Motion Vectors & Prediction

Motion vectors may be transmitted in precision selected for the picture or the block size. All input motion vectors (e.g., causal motion vectors) for the mv prediction algorithm may be converted to $⅛^{th}$ pixel accuracy. A Predicted Motion Vector (PMV) is predicted at $⅛^{th}$ pixel accuracy. If the block motion vector precision allowed is other than $⅛^{th}$ pixel, PMV may be rounded to the block precision allowed (PMV'). The delta motion vector may be added to PMV' to give the final motion vector at the precision allowed for the block. Else the delta motion vector may be added to PMV to give final motion vector.

Chroma Vectors and Filtering

In some implementations, chroma blocks (for YUV420) may use scaled co-located Luma motion vectors. All luma motion vectors may be converted to $⅛^{th}$ pixel accuracy before chroma scaling. All resulting scaled chroma motion vectors may be at $⅛^{th}$ pixel precision. Chroma may use a pre-decided Adaptive Filter code "Filt" of 256. For example, please refer to the psudo code listed below:

```
If(lumaMVx>0) chromaMVx = (lumaMVx + 1)/2
Else          chromaMVx = (lumaMVx - 1)/2
If(lumaMVy>0) chromaMVy = (lumaMVy + 1)/2
Else          chromaMVy = (lumaMVy - 1)/2
```

Overall the motion compensation with an adaptive precision system as described by this disclosure makes good tradeoffs between gains achievable and complexity as compared to existing approaches used by the standards.

Figure 28:
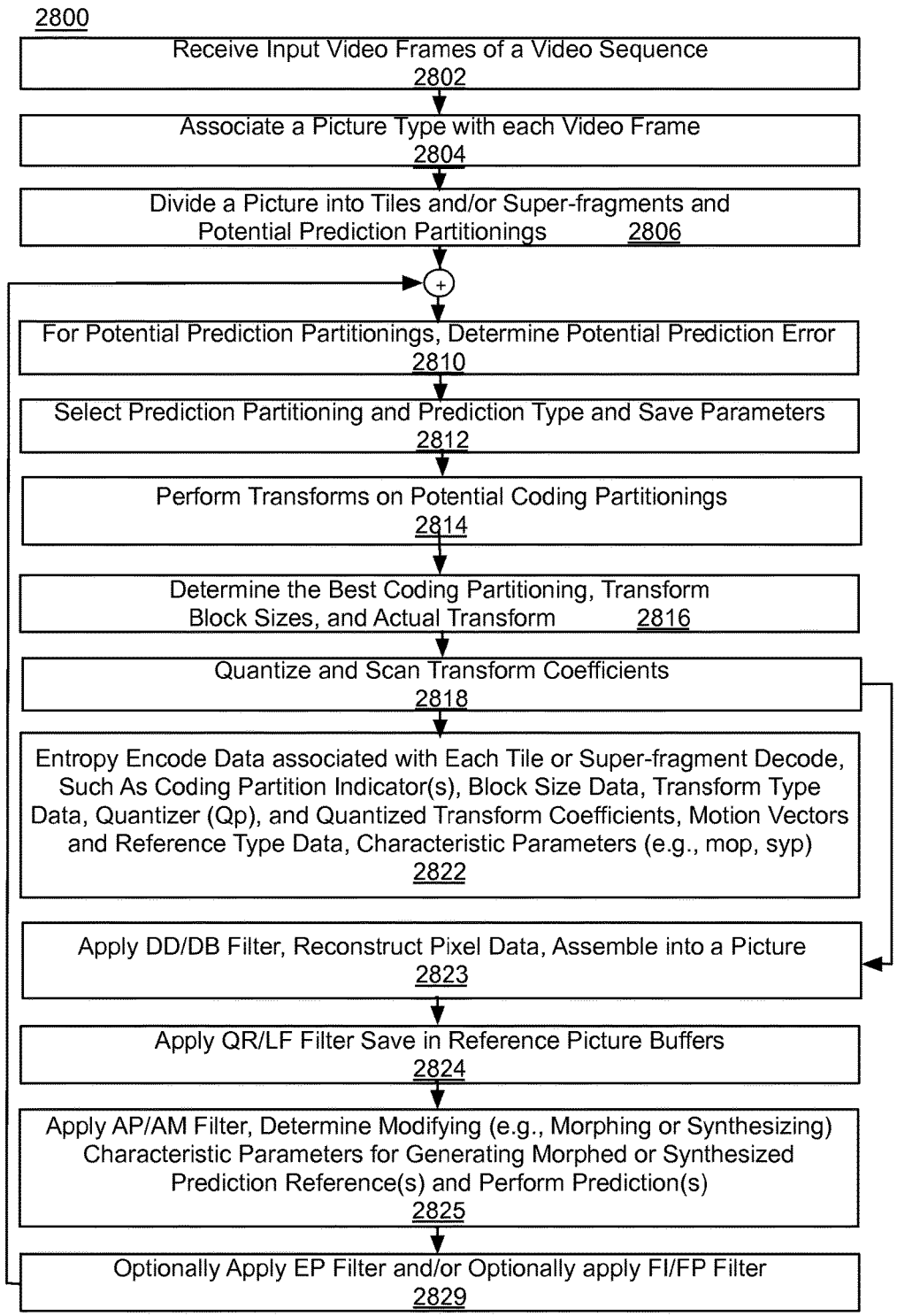
FIG. 28 is a flow diagram illustrating an example encoding process.

FIG. 28 is a flow diagram illustrating an example process 2800, arranged in accordance with at least some implementations of the present disclosure. Process 2800 may include one or more operations, functions or actions as illustrated by one or more operations. Process 2800 may form at least part of a next generation video coding process. By way of non-limiting example, process 2800 may form at least part of a next generation video encoding process as undertaken by encoder system 100 of FIG. 1 and/or any other encoder system or subsystems described herein.

Process 2800 may begin at operation 2802, "Receive Input Video Frames of a Video Sequence", where input video frames of a video sequence may be received via encoder 100 for example.

Process 2800 may continue at operation 2804, "Associate a Picture Type with each Video Frame", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein may be performed on a frame or picture of a group of pictures and the processing may be repeated for all frames or pictures of a group and then repeated for all groups of pictures in a video sequence.

Process 2800 may continue at operation 2806, "Divide a Picture into Tiles and/or Super-fragments and Potential Prediction Partitionings", where a picture may be divided into tiles or super-fragments and potential prediction partitions via prediction partitions generator 105 for example.

Process 2800 may continue at operation 2810, "For Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 2800 may continue at operation 2812, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 2800 may continue at operation 2814, "Perform Transforms on Potential Coding Partitionings", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 2800 may continue at operation 2816, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 2800 may continue at operation 2818, "Quantize and Scan Transform Coefficients", where transform coefficients associated with coding partitions (and/or transform blocks) may be quantized and scanned in preparation for entropy coding.

Process 2800 may continue at operation 2822, "Entropy Encode Data associated with Each Tile or Super-fragment Decode, Such As Coding Partition Indicator(s), Block Size Data, Transform Type Data, Quantizer (Qp), and Quantized Transform Coefficients, Motion Vectors and Reference Type Data, Characteristic Parameters (e.g., mop, syp)", where data may be entropy encoded. For example, the entropy encoded data may include the coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 2800 may continue at operation 2823 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 2800 may continue at operation 2824 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 2800 may continue at operation 2825, "Apply AP/AM Filter, Determine Modifying (e.g., Morphing or Synthesizing) Characteristic Parameters for Generating Morphed or Synthesized Prediction Reference(s) and Perform Prediction(s)", where, modifying (e.g., morphing or synthesizing) characteristic parameters and prediction(s) may be performed and adaptive motion filtering or adaptive precision filtering (e.g., AP/AM Filter) may be applied. For example, modifying (e.g., morphing or synthesizing) characteristic parameters for generating morphed or synthesized prediction reference(s) may be generated and prediction(s) may be performed. Additionally, adaptive motion filtering or adaptive precision filtering may be applied at this point in the process.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to nine reference types may be supported in P-pictures, and up to ten reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 2812) may include a frame reference, morphing parameters, or synthesizing parameters associated with the prediction partition.

Process 2800 may continue at operation 2829 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Operations 2802 through 2829 may provide for video encoding and bitstream transmission techniques, which may be employed by an encoder system as discussed herein.

FIG. 29 illustrates an example bitstream 2900, arranged in accordance with at least some implementations of the present disclosure. In some examples, bitstream 2900 may correspond to output bitstream 111 as shown in FIG. 1 and/or input bitstream 201 as shown in FIG. 2. Although not shown in FIG. 29 for the sake of clarity of presentation, in some examples bitstream 2900 may include a header portion and a data portion. In various examples, bitstream 2900 may include data, indicators, index values, mode selection data, or the like associated with encoding a video frame as discussed herein.

As discussed, bitstream 2900 may be generated by an encoder such as, for example, encoder 100 and/or received by a decoder 200 for decoding such that decoded video frames may be presented via a display device.

FIG. 30 is a flow diagram illustrating an example process 3000, arranged in accordance with at least some implementations of the present disclosure. Process 3000 may include one or more operations, functions or actions as illustrated by one or more operations. Process 3000 may form at least part of a next generation video coding process. By way of non-limiting example, process 3000 may form at least part of a next generation video decoding process as undertaken by decoder system 200 and/or any other decoder system or subsystems described herein.

Process 3000 may begin at operation 3002, "Receive Encoded Bitstream", where a bitstream may be received. For example, a bitstream encoded as discussed herein may be received at a video decoder. In some examples, bitstream 3000 may be received via decoder 200.

Process 3000 may continue at operation 3004, "Decode the Entropy Encoded Bitstream to Determine Coding Partition Indicator(s), Block Size Data, Transform Type Data, Quantizer (Qp), Quantized Transform Coefficients, Motion Vectors and Reference Type Data, Characteristic Parameters (e.g., mop, syp)", where the bitstream may be decoded to determine coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 3000 may continue at operation 3006, "Apply Quantizer (Qp) on Quantized Coefficients to Generate Inverse Quantized Transform Coefficients", where quantizer (Qp) may be applied to quantized transform coefficients to generate inverse quantized transform coefficients. For example, operation 3006 may be applied via adaptive inverse quantize module 203.

Process 3000 may continue at operation 3008, "On each Decoded Block of Coefficients in a Coding (or Intra Predicted) Partition Perform Inverse Transform based on Transform Type and Block Size Data to Generate Decoded Prediction Error Partitions", where, on each decode block of transform coefficients in a coding (or intra predicted) partition, an inverse transform based on the transform type and block size data may be performed to generate decoded prediction error partitions. In some examples, the inverse transform may include an inverse fixed transform. In some examples, the inverse transform may include an inverse content adaptive transform. In such examples, performing the inverse content adaptive transform may include determining basis functions associated with the inverse content adaptive transform based on a neighboring block of decoded video data, as discussed herein. Any forward transform used for encoding as discussed herein may be used for decoding using an associated inverse transform. In some examples, the inverse transform may be performed by adaptive inverse transform module 204. In some examples, generating the decoded prediction error partitions may also include assembling coding partitions via coding partitions assembler 205.

Process 3000 may continue at operation 3023 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 3000 may continue at operation 3024 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 3000 may continue at operation 3025, "Apply AP/AM Filter, Use Decoded Modifying Characteristics (e.g., mop, syp) to Generate Modified References for Prediction and Use Motion Vectors and Reference Info, Predicted Partition Info, and Modified References to Generate Predicted Partition", where modified references for prediction may be generated and predicted partitions may be generated as well, and where adaptive motion filtering or adaptive precision filtering (e.g., AP/AM Filter) may be applied. For example, where modified references for prediction may be generated based at least in part on decoded modifying characteristics (e.g., mop, syp) and predicted partitions may be generated based at least in part on motion vectors and reference information, predicted partition information, and modified references. Additionally, adaptive motion filtering or adaptive precision filtering may be applied at this point in the process.

Process 3000 may continue at operation 3029 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 3000 may continue at operation 3030, "Add Prediction Partition to the Decoded Prediction Error Data Partition to Generate a Reconstructed Partition", where a prediction partition my be added to the decoded prediction error data partition to generate a reconstructed prediction partition. For example, the decoded prediction error data partition may be added to the associated prediction partition via adder 206.

Process 3000 may continue at operation 3032, "Assemble Reconstructed Partitions to Generate a Tile or Super-Fragment", where the reconstructed prediction partitions may be assembled to generate tiles or super-fragments. For example, the reconstructed prediction partitions may be assembled to generate tiles or super-fragments via prediction partitions assembler module 207.

Process 3000 may continue at operation 3034, "Assemble Tiles or Super-Fragments of a Picture to Generate a Full Decoded Picture", where the tiles or super-fragments of a picture may be assembled to generate a full decoded picture.

For example, after optional deblock filtering and/or quality restoration filtering, tiles or super-fragments may be assembled to generate a full decoded picture, which may be stored via decoded picture buffer 210 and/or transmitted for presentment via a display device after processing via adaptive picture re-organizer module 217 and content post-restorer module 218.

Various components of the systems described herein may be implemented in software, firmware, and/or hardware and/or any combination thereof. For example, various components of system 300 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Some additional and/or alternative details related to process 2800, 3000 and other processes discussed herein may be illustrated in one or more examples of implementations discussed herein and, in particular, with respect to FIG. 31 below.

Figure 31A:
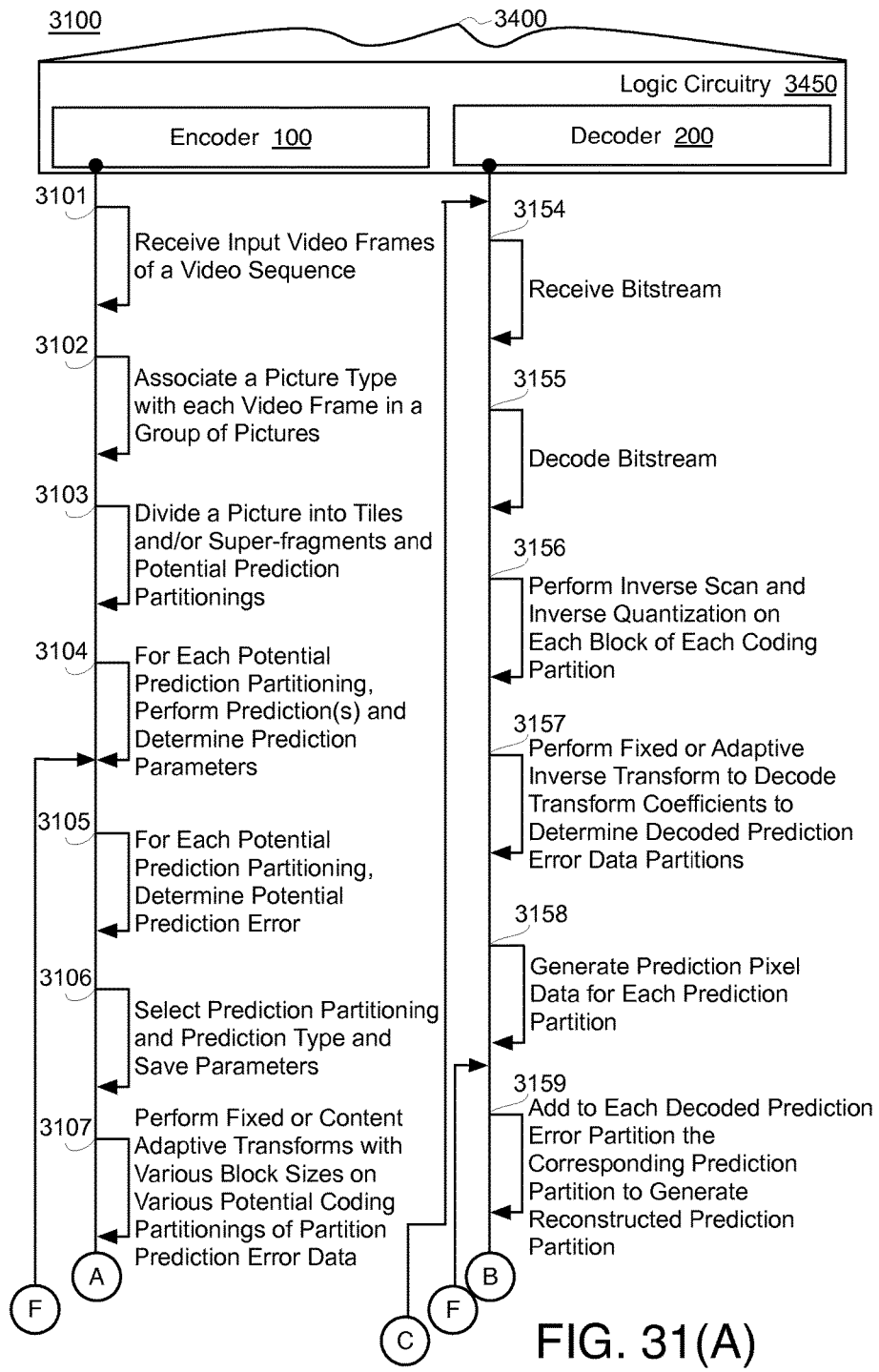
FIGS. 31(A), 31(B), and 31(C) provide an illustrative diagram of an example video coding system and video coding process in operation.
Figure 31B:
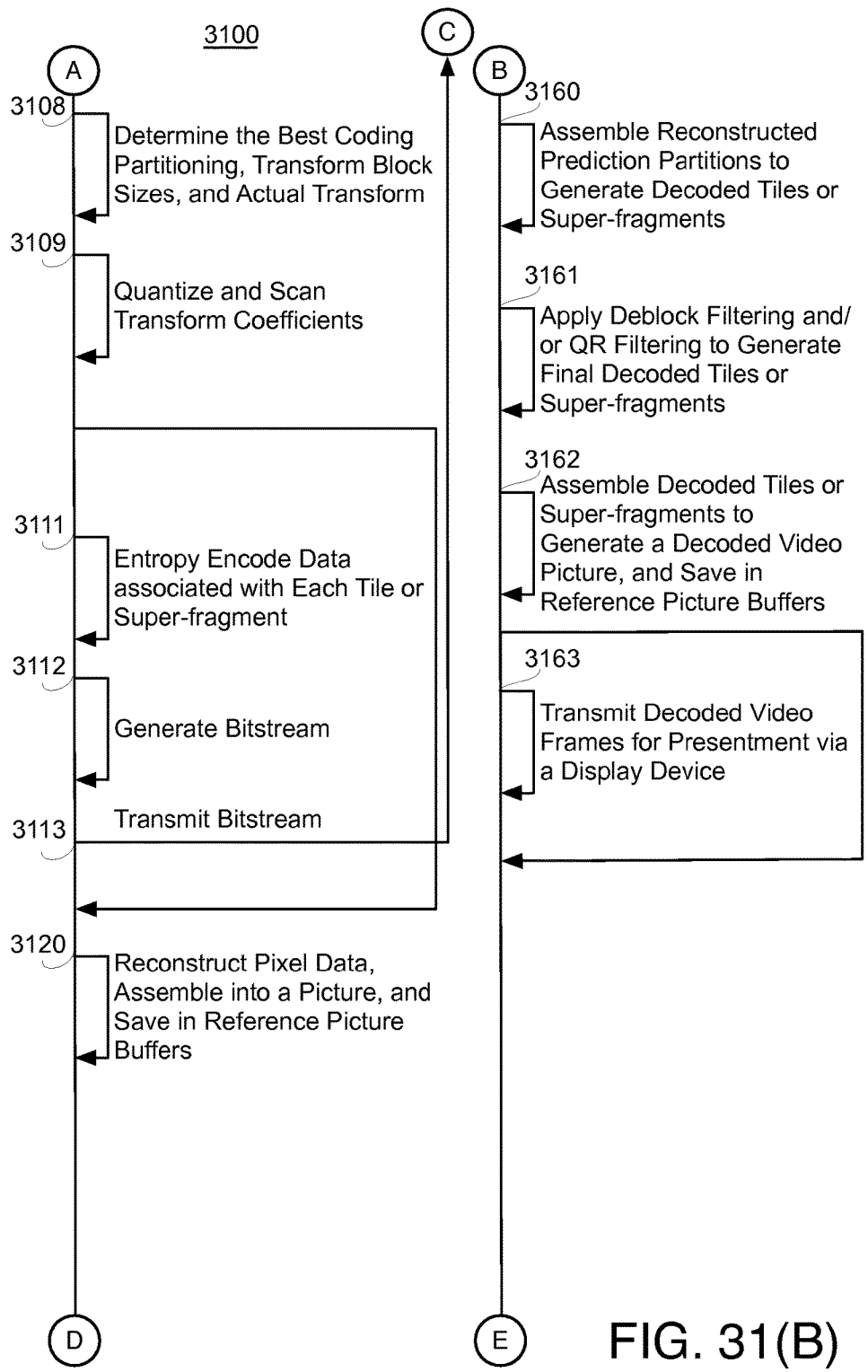
Figure 31C:
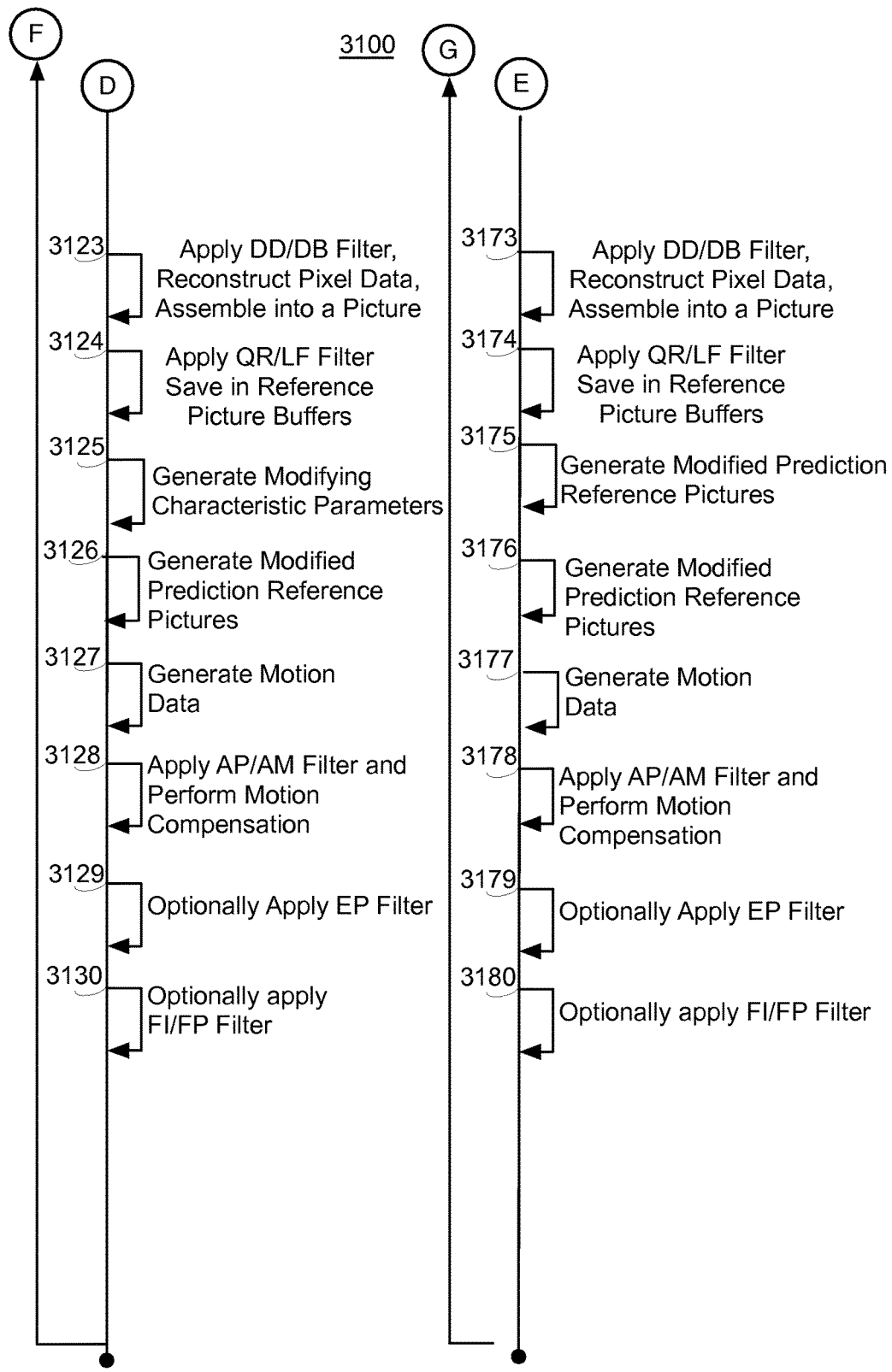

FIGS. 31(A), 31(B), and 31(C) provide an illustrative diagram of an example video coding system 3400 and video coding process 3100 in operation, arranged in accordance with at least some implementations of the present disclosure. In the illustrated implementation, process 3100 may include one or more operations, functions or actions as illustrated by one or more of actions 3101 through 3180. By way of non-limiting example, process 3100 will be described herein with reference to example video coding system 3400 including encoder 100 of FIG. 1 and decoder 200 of FIG. 2, as is discussed further herein below with respect to FIG. 34. In various examples, process 3100 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

In the illustrated implementation, video coding system 3400 may include logic circuitry 3450, the like, and/or combinations thereof. For example, logic circuitry 3450 may include encoder system 100 of FIG. 1 and/or decoder system 200 of FIG. 2 and may include any modules as discussed with respect to any of the encoder systems or subsystems described herein and/or decoder systems or subsystems described herein. Although video coding system 3400, as shown in FIGS. 31(A)-(C) may include one particular set of blocks or actions associated with particular modules, these blocks or actions may be associated with different modules than the particular modules illustrated here. Although process 3100, as illustrated, is directed to encoding and decoding, the concepts and/or operations described may be applied to encoding and/or decoding separately, and, more generally, to video coding.

Process 3100 may begin at operation 3101, "Receive Input Video Frames of a Video Sequence", where input video frames of a video sequence may be received via encoder 100 for example.

Process 3100 may continue at operation 3102, "Associate a Picture Type with each Video Frame in a Group of Pictures", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 3103 through 3111) may be performed on a frame or picture of a group of pictures and the processing may be repeated for all frames or pictures of a group and then repeated for all groups of pictures in a video sequence.

Process 3100 may continue at operation 3103, "Divide a Picture into Tiles and/or Super-fragments and Potential Prediction Partitionings", where a picture may be divided into tiles or super-fragments and potential prediction partitions via prediction partitions generator 105 for example.

Process 3100 may continue at operation 3104, "For Each Potential Prediction Partitioning, Perform Prediction(s) and Determine Prediction Parameters", where, for each potential prediction partitionings, prediction(s) may be performed and prediction parameters may be determined. For example, a range of potential prediction partitionings (each having various prediction partitions) may be generated and the associated prediction(s) and prediction parameters may be determined. For example, the prediction(s) may include prediction(s) using characteristics and motion based multi-reference predictions or intra-predictions.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures, and up to 10 reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 3112) may include a frame reference, morphing parameters, or synthesizing parameters associated with the prediction partition.

Process 3100 may continue at operation 3105, "For Each Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 3100 may continue at operation 3106, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 3100 may continue at operation 3107, "Perform Fixed or Content Adaptive Transforms with Various Block Sizes on Various Potential Coding Partitionings of Partition Prediction Error Data", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 3100 may continue at operation 3108, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 3100 may continue at operation 3109, "Quantize and Scan Transform Coefficients", where transform coefficients associated with coding partitions (and/or transform blocks) may be quantized and scanned in preparation for entropy coding.

Process 3100 may continue at operation 3111, "Entropy Encode Data associated with Each Tile or Super-fragment", where data associated with each tile or super-fragment may be entropy encoded. For example, data associated with each tile or super-fragment of each picture of each group of pictures of each video sequence may be entropy encoded. The entropy encoded data may include the prediction partitioning, prediction parameters, the selected coding partitioning, the selected characteristics data, motion vector data, quantized transform coefficients, filter parameters, selection data (such as mode selection data), and indictors.

Process 3100 may continue at operation 3112, "Generate Bitstream" where a bitstream may be generated based on the entropy encoded data. As discussed, in some examples, the bitstream may include a frame or picture reference, morphing parameters, or synthesizing parameters associated with a prediction partition.

Process 3100 may continue at operation 3113, "Transmit Bitstream", where the bitstream may be transmitted. For example, video coding system 3400 may transmit output bitstream 111, bitstream 2900, or the like via an antenna 3402 (please refer to FIG. 34).

Process 3100 may continue at operation 3120, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 3100 may continue at operation 3123 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 3100 may continue at operation 3124 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 3100 may continue at operation 3125, "Generate Modifying Characteristic Parameters", where, modified characteristic parameters may be generated. For example, a second modified prediction reference picture and second modifying characteristic parameters associated with the second modified prediction reference picture may be generated based at least in part on the second decoded prediction reference picture, where the second modified reference picture may be of a different type than the first modified reference picture.

Process 3100 may continue at operation 3126, "Generate Modified Prediction Reference Pictures", where modified prediction reference pictures may be generated, for example, a first modified prediction reference picture and first modifying characteristic parameters associated with the first modified prediction reference picture may be generated based at least in part on the first decoded prediction reference picture.

Process 3100 may continue at operation 3127, "Generate Motion Data", where, motion estimation data may be generated. For example, motion data associated with a prediction partition of a current picture may be generated based at least in part on one of the first modified prediction reference picture or the second modified prediction reference picture.

Process 3100 may continue at operation 3128, "Apply AP/AM Filter Perform Motion Compensation", where, motion compensation may be performed. For example, motion compensation may be performed based at least in part on the motion data and at least one of the first modified prediction reference picture or the second modified prediction reference picture to generate prediction partition data for the prediction partition and adaptive motion filtering or adaptive precision filtering (e.g., AP/AM Filter) may be applied. Process 3100 may feed this information back to operation 3104 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 3100 may continue at operation 3129 "Optionally Apply EP", where enhanced predicted partition (e.g., EP Filtering) may be optionally applied. In some examples, where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Process 3100 may continue at operation 3130 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Operations 3101 through 3140 may provide for video encoding and bitstream transmission techniques, which may be employed by an encoder system as discussed herein. The following operations, operations 3154 through 3168 may provide for video decoding and video display techniques, which may be employed by a decoder system as discussed herein.

Process 3100 may continue at operation 3154, "Receive Bitstream", where the bitstream may be received. For example, input bitstream 201, bitstream 2900, or the like may be received via decoder 200. In some examples, the bitstream may include data associated with a coding partition, one or more indicators, and/or data defining coding partition(s) as discussed above. In some examples, the bitstream may include the prediction partitioning, prediction parameters, the selected coding partitioning, the selected characteristics data, motion vector data, quantized transform coefficients, filter parameters, selection data (such as mode selection data), and indictors.

Process 3100 may continue at operation 3155, "Decode Bitstream", where the received bitstream may be decoded via adaptive entropy decoder module 202 for example. For example, received bitstream may be entropy decoded to determine the prediction partitioning, prediction parameters, the selected coding partitioning, the selected characteristics data, motion vector data, quantized transform coefficients, filter parameters, selection data (such as mode selection data), and indictors.

Process 3100 may continue at operation 3156, "Perform Inverse Scan and Inverse Quantization on Each Block of Each Coding Partition", where an inverse scan and inverse quantization may be performed on each block of each coding partition for the prediction partition being processed. For example, the inverse scan and inverse quantization may be performed via adaptive inverse quantize module 203.

Process 3100 may continue at operation 3157, "Perform Fixed or Content Adaptive Inverse Transform to Decode Transform Coefficients to Determine Decoded Prediction Error Data Partitions", where a fixed or content adaptive inverse transform may be performed to decode transform coefficients to determine decoded prediction error data partitions. For example, the inverse transform may include an inverse content adaptive transform such as a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. In some examples, the fixed inverse transform may include a discrete cosine inverse transform or a discrete cosine inverse transform approximator. For example, the fixed or content adaptive transform may be performed via adaptive inverse transform module 204. As discussed, the content adaptive inverse transform may be based on other previously decoded data, such as, for example, decoded neighboring partitions or blocks. In some examples, generating the decoded prediction error data partitions may include assembling decoded coding partitions via coding partitions assembler module 205.

Process 3100 may continue at operation 3158, "Generate Prediction Pixel Data for Each Prediction Partition", where prediction pixel data may be generated for each prediction partition. For example, prediction pixel data may be generated using the selected prediction type (e.g., based on characteristics and motion, or intra-, or other types) and associated prediction parameters.

Process 3100 may continue at operation 3159, "Add to Each Decoded Prediction Error Partition the Corresponding Prediction Partition to Generate Reconstructed Prediction Partition", where each decoded prediction error partition (e.g., including zero prediction error partitions) may be added to the corresponding prediction partition to generated a reconstructed prediction partition. For example, prediction partitions may be generated via the decode loop illustrated in FIG. 2 and added via adder 206 to decoded prediction error partitions.

Process 3100 may continue at operation 3160, "Assemble Reconstructed Prediction Partitions to Generate Decoded Tiles or Super-fragments", where reconstructed prediction partitions may be assembled to generate decoded tiles or super-fragments. For example, prediction partitions may be assembled to generate decoded tiles or super-fragments via prediction partitions assembler module 207.

Process 3100 may continue at operation 3161, "Apply Deblock Filtering and/or QR Filtering to Generate Final Decoded Tiles or Super-fragments", where optional deblock filtering and/or quality restoration filtering may be applied to the decoded tiles or super-fragments to generate final decoded tiles or super-fragments. For example, optional deblock filtering may be applied via deblock filtering module 208 and/or optional quality restoration filtering may be applied via quality restoration filtering module 209.

Process 3100 may continue at operation 3162, "Assemble Decoded Tiles or Super-fragments to Generate a Decoded Video Picture, and Save in Reference Picture Buffers", where decoded (or final decoded) tiles or super-fragments may be assembled to generate a decoded video picture, and the decoded video picture may be saved in reference picture buffers (e.g., decoded picture buffer 210) for use in future prediction.

Figure 34:
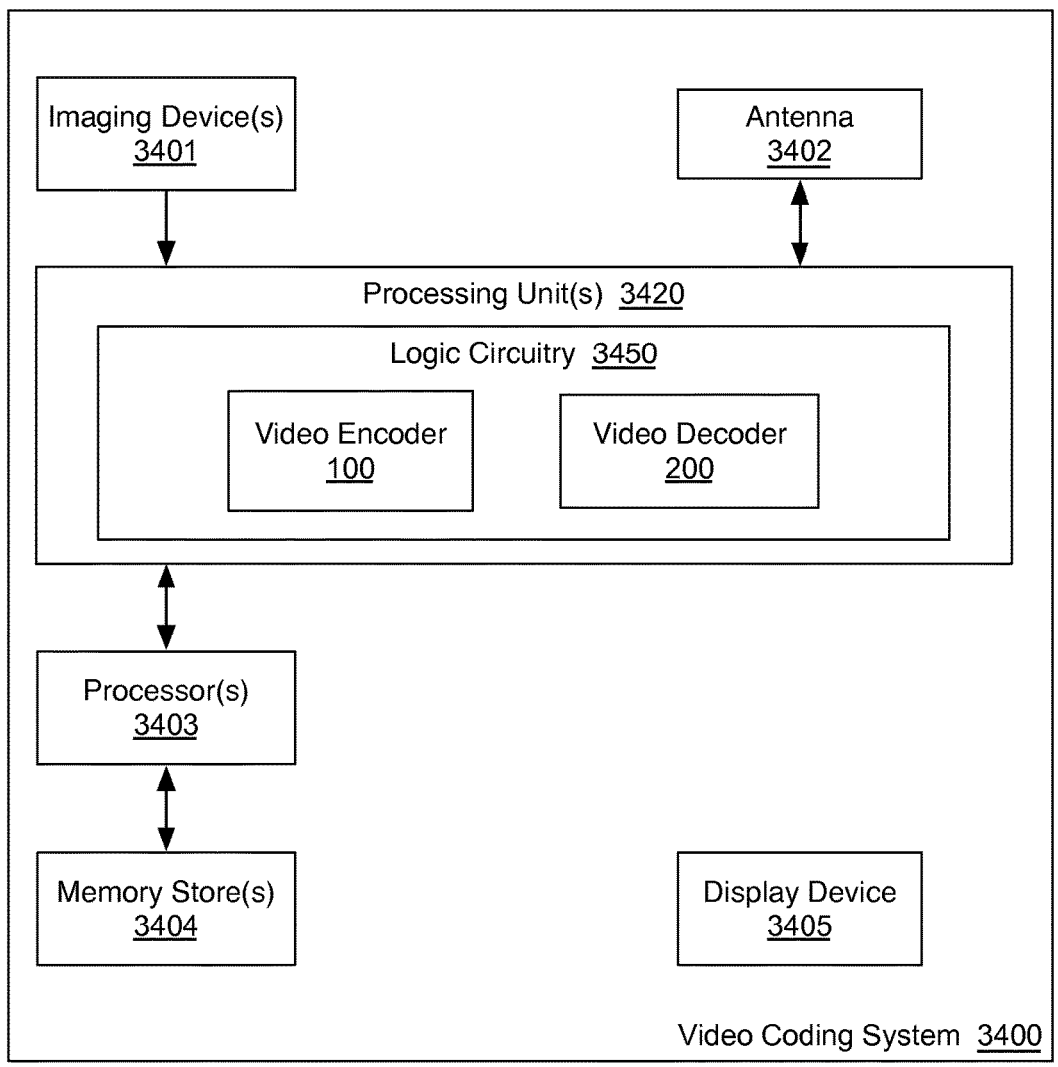
FIG. 34 is an illustrative diagram of an example video coding system.

Process 3100 may continue at operation 3163, "Transmit Decoded Video Frames for Presentment via a Display Device", where decoded video frames may be transmitted for presentment via a display device. For example, decoded video pictures may be further processed via adaptive picture re-organizer 217 and content post restorer module 218 and transmitted to a display device as video frames of display video 219 for presentment to a user. For example, the video frame(s) may be transmitted to a display device 3405 (as shown in FIG. 34) for presentment.

Process 3100 may continue at operation 3173 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 3100 may continue at operation 3174 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in a picture buffer as a reference picture for prediction of other (e.g., following) pictures.

Process 3100 may continue at operation 3176, "Generate Modified Prediction Reference Pictures", where modified prediction reference pictures may be generated, for example, at least a portion of a third modified prediction reference picture may be generated based at least in part on the third modifying characteristic parameters. Similarly, at least a portion a fourth modified prediction reference picture may be generated based at least in part on the second modifying characteristic parameters associated.

Process 3100 may continue at operation 3177, "Generate Motion Data", where, motion estimation data may be generated. For example, motion data associated with a prediction partition of a current picture may be generated based at least in part on one of the third modified prediction reference picture or the third modified prediction reference picture.

Process 3100 may continue at operation 3178, "Apply AP/AM Filter and Perform Motion Compensation", where, motion compensation may be performed and where adaptive motion filtering or adaptive precision filtering (e.g., AP/AM Filter) may be applied. For example, motion compensation may be performed based at least in part on the motion data and at least one of the third modified prediction reference picture or the fourth modified prediction reference picture to generate prediction partition data for the prediction partition. Process 3100 may feed this information back to operation 3159 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 3100 may continue at operation 3179 "Optionally Apply EP Filter", where enhanced predicted partition (e.g., EP Filtering) may be optionally applied. In some examples, where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 3100 may continue at operation 3180 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Process 3100 may be implemented via any of the coder systems as discussed herein. Further, process 3100 may be repeated either in serial or in parallel on any number of instantiations of video data such as prediction error data partitions, original data partitions, or wavelet data or the like.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Various components of the systems described herein may be implemented in software, firmware, and/or hardware and/or any combination thereof. For example, various components of system 1400 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

FIG. 32 is a flow diagram illustrating an example process 3200, arranged in accordance with at least some implementations of the present disclosure. Process 3200 may include one or more operations, functions or actions as illustrated by one or more operations. Process 3200 may form at least part of a next generation video coding process. By way of non-limiting example, process 3200 may form at least part of a next generation video encoding process as undertaken by encoder system 100 of FIG. 1 and/or any other encoder system or subsystems described herein.

Process 3200 may begin at operation 3202, "DETERMINE MOTION COMPENSATION PREDICTION PRECISION ASSOCIATED WITH AT LEAST A PORTION OF A CURRENT PICTURE BEING DECODED", where a motion compensation prediction precision associated with at least a portion of a current picture being decoded may be determined. For example, a motion compensated filtering predictor module may determine a motion compensation prediction precision associated with at least a portion of a current picture being decoded, where the motion compensation prediction precision comprises at least one of a quarter pel precision or an eighth pel precision.

Process 3200 may continue at operation 3204, "GENERATE PREDICTED PIXEL DATA OF A PREDICTED PARTITION ASSOCIATED WITH A PREDICTION PARTITION OF THE CURRENT PICTURE", where predicted pixel data of a predicted partition associated with a prediction partition of the current picture may be generated. For example, predicted pixel data of a predicted partition associated with a prediction partition of the current picture may be generated, via the motion compensated filtering predictor module, by filtering a portion of a decoded reference picture based at least in part on the motion compensation prediction precision.

Process 3200 may continue at operation 3206, "CODE PREDICTION PARTITIONING INDICATORS ASSOCIATED WITH THE PREDICTION PARTITION AND A MOTION VECTOR INDICATING A POSITIONAL DIFFERENCE BETWEEN THE PREDICTION PARTITION AND AN ASSOCIATED PARTITION OF THE DECODED REFERENCE PICTURE", where prediction partitioning indicators associated with the prediction partition and a motion vector indicating a positional difference between the prediction partition and an associated partition of the decoded reference picture may be coded. For example, prediction partitioning indicators associated with the prediction partition and a motion vector indicating a positional difference between the prediction partition and an associated partition of the decoded reference picture may be coded, via an entropy encoder, into a bitstream.

In some implementations, process 3200 may further include partitioning, via a prediction partitions generator module, the current picture into a plurality of prediction partitions including the prediction partition and a second prediction partition based on a partitioning technique including at least one of a bi-tree partitioning technique, a k-d tree partitioning technique, a codebook representation of a bi-tree partitioning technique, or a codebook representation of a k-d tree partitioning technique. The portion of the current picture may include the prediction partition. A second motion compensation prediction precision associated with the second prediction partition may be determined, via the motion compensated filtering predictor module. The second motion compensation prediction precision may include at least one of the quarter pel precision or the eighth pel precision. Determining the motion compensation prediction precision and the second motion compensation prediction precision may include determining the motion compensation prediction precision based on a size of the prediction partition and the second motion compensation prediction precision based on a second size of the second prediction partition. The motion compensation prediction precision may include the quarter pel precision and the prediction partition may include a small prediction partition. The small prediction partition may include a 4×4, 4×8, 8×4 or 8×8 pixel partition. The second motion compensation prediction precision may include the eighth pel precision and the second prediction partition may include a large prediction partition. The large prediction partition may include a partition having a size including at least one of greater than 4×4 pixels or greater than 8×8 pixels. The motion compensation prediction precision indicators may include a first indicator indicating the motion compensation prediction precision for the prediction partition, which may include the quarter pel precision, and a second indicator indicating the second motion compensation prediction precision for the second prediction partition, which may include the eighth pel precision. The computer-implemented method for video coding may further include determining, via the motion compensated filtering predictor module, a third motion compensation prediction precision associated with the current picture, where the motion compensation prediction precision may be based at least in part on a reference type of the decoded reference picture. The third motion compensation prediction precision may be based at least in part on a second reference type of the second decoded reference picture. The reference type may include an immediately previous decoded picture reference type and the motion compensation prediction precision may include the eighth pel precision. The second reference type may include a non-immediately previous decoded picture reference type and the second motion compensation prediction precision may include the quarter pel precision. Determining the predicted pixel data may include filtering the portion of the decoded reference picture with the eighth pel precision to determine a first predicted partition, filtering a second portion of the second decoded reference picture with the quarter pel precision to determine a second predicted partition, and combining the first predicted partition and the second predicted partition to generate the predicted partition of predicted pixel data. Combining the first predicted partition and the second predicted partition may include a weighted average. The computer-implemented method for video coding may further include determining, via the motion compensated filtering predictor module, a fourth motion compensation prediction precision associated with at least a portion of a second current picture being decoded, where the fourth motion compensation prediction precision may include the quarter pel precision and the compensation prediction precision may include the eighth pel precision. Determining the motion compensation prediction precision associated with at least the portion of the current picture being decoded may include determining the motion compensation prediction precision for the entire current picture based on at least one of a picture type of the current picture or a location of the current picture in a picture hierarchy. Determining the motion compensation prediction precision associated with at least the portion of the current picture being decoded may include determining the motion compensation prediction precision based on a size of the prediction partition and a prediction partition size-based motion compensation prediction precision rule based at least in part on a picture type of the current picture or a location of the current picture in a picture hierarchy. Determining the motion compensation prediction precision associated with at least the portion of the current picture being decoded may include determining the motion compensation prediction precision based on a characteristic of the portion of the current picture. The characteristic may include a texture value of the portion of the current picture. When the texture value may be above a threshold, the motion compensation prediction precision may include the quarter pel precision. When the texture value may be less than or equal to the threshold, the motion compensation prediction precision may include the eighth pel precision. The motion compensation prediction precision may include the quarter pel precision and where filtering the portion of the decoded reference picture may include determining a selected filter from a predefined codebook of a set of available filters. The motion compensation prediction precision may include the eighth pel precision. Filtering the portion of the decoded reference picture may include determining the selected filter from the predefined codebook of the set of available filters, applying the selected filter to determine quarter pel locations of the eighth pel precision, and applying a fixed filter to determine remaining eighth pel locations of the eighth pel precision. The portion of the decoded reference picture may include a portion of a morphed reference picture generated based on a previously decoded reference picture and morphing parameters. The morphing parameters may include at least one of gain parameters, blur parameters, registration parameters, or dominant motion parameters. The portion of the decoded reference picture may include a portion of a synthesized reference picture generated based on a previously decoded reference picture and synthesizing parameters. The synthesizing parameters may include at least one super resolution parameters or projected interpolation parameters. The portion of the decoded reference picture may include the portion of the morphed reference picture generated based on a previously decoded reference picture and the morphing parameters. Determining the motion compensation prediction precision associated with at least the portion of the current picture being decoded may include determining the motion compensation for the entire current picture based at least in part on a reference type of the morphed reference picture. The reference type may include at least one of gain, blur, registration, or dominant motion. The reference type may include dominant motion and the motion compensation prediction precision may include the quarter pel precision. The portion of the decoded reference picture may include the portion of the synthesized reference picture generated based on the previously decoded reference picture and the synthesizing parameters. Determining the motion compensation prediction precision associated with at least the portion of the current picture being decoded may include determining the motion compensation for the entire current picture based at least in part on a reference type of the synthesized reference picture. The reference type may include at least one of super resolution or projected interpolation. The reference type may include projected interpolation and the motion compensation prediction precision may include the eighth pel precision. The portion of the decoded reference picture may include the portion of the morphed reference picture generated based on the previously decoded reference picture and the morphing parameters. The portion of the current picture may include the prediction partition. Determining the motion compensation prediction precision associated the prediction partition may include determining the motion compensation for the prediction partition based at least in part on the reference type of the morphed reference picture. The decoded reference picture may include the synthesized reference picture generated based on the previously decoded reference picture and the synthesizing parameters. The portion of the current picture may include the prediction partition. Determining the motion compensation prediction precision associated the prediction partition may include determining the motion compensation for the prediction partition based at least in part on the reference type of the synthesized reference picture. The portion of the current picture may include at least one of the prediction partition, a tile, a super-fragment, a coding unit, a slice, a region, or the entire current picture. The computer-implemented method for video coding may further include coding, via the entropy encoder, motion compensation prediction precision indicators comprising a first indicator indicating whether the motion compensation prediction precision for the prediction partition may include the quarter pel precision or the eighth pel precision and a second indicator indicating whether the second motion compensation prediction precision for the second prediction partition may include the quarter pel precision or the eighth pel precision, the picture type of the current picture, the location of the current picture in the picture hierarchy, the morphing parameters, the synthesizing parameters, a selected filter indicator indicating the selected filter, and a prediction error data partition associated with the prediction partition. The computer-implemented method for video coding may further include transmitting the bitstream, receiving the bitstream, and decoding, via an adaptive entropy decoder, the bitstream to determine the prediction partitioning indicators, the motion vector, the motion compensation prediction precision indicators, the picture type of the current picture, the location of the current picture in the picture hierarchy, the morphing parameters, the synthesizing parameters, the selected filter indicator indicating the selected filter, and the prediction error data partition. The computer-implemented method for video coding may further include determining, via a motion compensated filtering predictor decoder module, a decoder motion compensation prediction precision associated with at least the portion of a current decoder picture being decoded, based on the motion compensation prediction precision indicators. The motion compensation prediction precision may include at least one of a quarter pel precision or an eighth pel precision. The computer-implemented method for video coding may further include determining, via the motion compensated filtering predictor module, decoded predicted pixel data of a decoded predicted partition for a decoded prediction partition of the current picture based at least in part on filtering a portion of a decoder decoded reference picture and the decoder motion compensation prediction precision. The computer-implemented method for video coding may further include adding, via an adder, the decoded predicted pixel data of the decoded predicted partition to the prediction error data partition to generate a first reconstructed partition. The computer-implemented method for video coding may further include adding, via a prediction partitions assembler module, the first reconstructed partition and a second reconstructed partition to generate a reconstructed tile or super-fragment. The computer-implemented method for video coding may further include applying, via a deblock filtering module, a deblock filter to the reconstructed tile or super-fragment to generate a first final reconstructed tile or super-fragment, assembling, via the deblock filtering module the first final reconstructed tile or super-fragment and a second final reconstructed tile or super-fragment to generate a final reconstructed video frame, and transmitting the final reconstructed video frame for presentment via a display device.

In operation, process 3200 may operate so that there may be adaptive selection of Motion Compensated Prediction Precision that may select between ¼ and ⅛th pel motion compensation with respect to decoder picture from Decoded Prediction Reference picture.

In some examples, (BiTree or Kd-Tree or some other codebook) based prediction partitioning may be performed with each prediction partition (block) including info in bitstream regarding which motion compensated prediction resolution (¼ pixel or ⅛th pixel) to use.

In some examples, (BiTree or Kd-Tree or some other codebook) based prediction partitioning with some partitions (blocks) sizes including info in bitstream on which motion compensation resolution (¼ pixel or ⅛th pixel) to use, other partition sizes use pre-determined decision on motion compensated prediction resolution.

In some examples, process 3200 may choose based on picture type (I, P, B, as well as location of B in picture hierarchy) a pre-determined decision on which motion compensated prediction resolution (¼ pixel or ⅛th) pixel to use.

In some examples, process 3200 may decide on the best motion compensated prediction resolution (¼ pixel or ⅛th pixel) to use on each picture basis (regardless of picture type, or partly taking into account the picture type).

In some examples, process 3200 may decide on the best motion compensated prediction resolution (¼ pixel or ⅛th pixel) to use on each picture to be coded basis (regardless of picture type, or partly taking into account the picture type) and based on each reference picture (such as in multi-reference prediction). For instance immediate previous (first previous decoded picture) may use say ⅛th pixel prediction, while pictures further away in time may use ¼ pixel prediction.

In some examples, process 3200 may perform ¼ pel motion compensated prediction using ¼ pel location based filter from a predefined codebook that contains a set of filters, with each filter set containing filters to be used for the 15 subpel locations in ¼ pel motion compensated prediction.

In some examples, process 3200 may perform ¼ pel motion compensated prediction using ¼ pel location based filter from a predefined codebook that contains a set of filters, with each filter set containing filters to be used for the 15 subpel locations in ¼ pel motion compensated prediction. Further, the ⅛th pel locations that are not part of ¼th pel locations use predetermined fixed filter In some examples, process 3200 may use modified reference pictures for prediction to generate prediction on a partition basis. The modified references are generated using morphing parameters (such as for gain parameters, blur parameters, registration parameters, dominant motion parameters).

In some examples, process 3200 may use synthesized reference pictures for prediction to generate prediction on a partition basis. The synthesized references may be generated using decoded reference pictures and synthesizing parameters (such as for Super Resolution, Projected Interpolation).

In some examples, process 3200 may use modified reference pictures for prediction to generate prediction on a partition basis. The modified references may be generated using morphing parameters (such as for gain parameters, blur parameters, registration parameters, dominant motion parameters), and uses synthesized reference pictures for prediction to generate prediction on a partition basis. The synthesized references may be generated using decoded reference pictures and synthesizing parameters (such as for Super Resolution, Projected Interpolation).

In some examples, process 3200 may use modified reference pictures for prediction to generate prediction on a partition basis. The modified references may be generated using morphing parameters (such as for gain parameters, blur parameters, registration parameters, dominant motion parameters). The ¼ pel vs ⅛th pel decision may be made per picture, and with respect to one of many modified reference pictures. For instance in a dominant motion compensated frame, ¼ the accuracy instead of ⅛th pixel accuracy may be used.

In some examples, process 3200 may use synthesized reference pictures for prediction to generate prediction on a partition basis. The synthesized references may be generated using decoded reference pictures and synthesizing parameters (such as for Super Resolution, Projected Interpolation). The ¼ pel vs ⅛th pel decision may be made per picture, and with respect to one of many modified reference pictures. For instance in a correction motion vector into a Proected Interpolation frame ⅛th pel accuracy may be used.

FIG. 33 is a flow diagram illustrating an example process 3300, arranged in accordance with at least some implementations of the present disclosure. Process 3300 may include one or more operations, functions or actions as illustrated by one or more operations. Process 3300 may form at least part of a next generation video coding process. By way of non-limiting example, process 3300 may form at least part of a next generation video decoding process as undertaken by encoder system 200 of FIG. 2 and/or any other decoder system or subsystems described herein.

Process 3300 may begin at operation 3302, "DECODE AN ENCODED BITSTREAM TO DETERMINE PREDICTION PARTITIONING INDICATORS, A PLURALITY OF MOTION VECTORS, AND A PLURALITY OF PREDICTION ERROR DATA PARTITIONS", where an encoded bitstream to determine prediction partitioning indicators, a plurality of motion vectors, and a plurality of prediction error data partitions may be decoded. For example, this operation may decode an encoded bitstream to determine prediction partitioning indicators, a plurality of motion vectors, and a plurality of prediction error data partitions.

Process 3300 may continue at operation 3304, "DETERMINE A PREDICTION PARTITION OF THE CURRENT PICTURE BASED ON THE PREDICTION PARTITIONING INDICATORS", where a prediction partition of the current picture based on the prediction partitioning indicators may be determined. For example, this operation may determine a prediction partition of the current picture based on the prediction partitioning indicators.

Process 3300 may continue at operation 3306, "DETERMINE A MOTION COMPENSATION PREDICTION PRECISION ASSOCIATED WITH AT LEAST A PORTION OF A CURRENT PICTURE BEING DECODED", where a motion compensation prediction precision associated with at least a portion of a current picture being decoded may be determined. For example, this operation may determine a motion compensation prediction precision associated with at least a portion of a current picture being decoded. The motion compensation prediction precision may include at least one of a quarter pel precision or an eighth pel precision.

Process 3300 may continue at operation 3308, "GENERATE PREDICTED PIXEL DATA OF A PREDICTED PARTITION ASSOCIATED WITH THE PREDICTION PARTITION OF THE CURRENT PICTURE BY THE VIDEO DECODER", where predicted pixel data of a predicted partition associated with the prediction partition of the current picture by the video decoder may be generated. For example, this operation may generate predicted pixel data of a predicted partition associated with the prediction partition of the current picture by the video decoder being configured to filter a portion of a decoded reference picture based at least in part on a motion vector of the plurality of motion vectors and the motion compensation prediction precision.

Process 3300 may continue at operation 3310, "ADD THE PREDICTED PIXEL DATA OF THE DECODED PREDICTED PARTITION TO A PREDICTION ERROR DATA PARTITION OF THE PLURALITY OF PREDICTION ERROR DATA PARTITIONS", where the predicted pixel data of the decoded predicted partition to a prediction error data partition of the plurality of prediction error data partitions may be added. For example, this operation may add the predicted pixel data of the decoded predicted partition to a prediction error data partition of the plurality of prediction error data partitions to generate a first reconstructed partition.

Process 3300 may continue at operation 3312, "ADD THE FIRST RECONSTRUCTED PARTITION AND A SECOND RECONSTRUCTED PARTITION TO GENERATE A RECONSTRUCTED TILE OR SUPER-FRAGMENT", where the first reconstructed partition and a second reconstructed partition to generate a reconstructed tile or super-fragment may be added. For example, this operation may add the first reconstructed partition and a second reconstructed partition to generate a reconstructed tile or super-fragment.

Process 3300 may continue at operation 3314, "APPLY A DEBLOCK FILTER TO THE RECONSTRUCTED TILE OR SUPER-FRAGMENT TO GENERATE A FIRST FINAL RECONSTRUCTED TILE OR SUPER-FRAGMENT", where a deblock filter to the reconstructed tile or super-fragment may be applied to generate a first final reconstructed tile or super-fragment. For example, this operation may apply a deblock filter to the reconstructed tile or super-fragment to generate a first final reconstructed tile or super-fragment.

Process 3300 may continue at operation 3316, "ASSEMBLE THE FIRST FINAL RECONSTRUCTED TILE OR SUPER-FRAGMENT AND A SECOND FINAL RECONSTRUCTED TILE OR SUPER-FRAGMENT TO GENERATE A FINAL RECONSTRUCTED VIDEO FRAME", where the first final reconstructed tile or super-fragment and a second final reconstructed tile or super-fragment to generate a final reconstructed video frame may be assembled. For example, this operation may assemble the first final reconstructed tile or super-fragment and a second final reconstructed tile or super-fragment to generate a final reconstructed video frame.

Process 3300 may continue at operation 3318, "TRANSMIT THE FINAL RECONSTRUCTED VIDEO FRAME FOR PRESENTMENT", where the final reconstructed video frame may be may transmitted for presentment. For example, this operation may transmit the final reconstructed video frame for presentment.

In some examples, process 3300 may receive the encoded bitstream of video data and a display device configured to present video frames. The video decoder may be further configured to receive the bitstream. The video decoder may be further configured to decode the bitstream to determine motion compensation prediction precision indicators, a plurality of picture types, a plurality of locations of pictures in a picture hierarchy, morphing parameters, synthesizing parameters, a plurality of reference types of pictures, and a plurality of selected filter indicators. The video decoder may be further configured to determine a second prediction partition of the current picture based on the prediction partitioning indicators. The video decoder may be further configured to determine a second motion compensation prediction precision associated with the second prediction partition. The second motion compensation prediction precision may include at least one of a quarter pel precision or an eighth pel precision. The video decoder may be further configured to determine a third motion compensation prediction precision associated with the current picture. The motion compensation prediction precision may be based at least in part on a reference type of the decoded reference picture. The third motion compensation prediction precision may be based at least in part on a second reference type of a second decoded reference picture. The reference type may include an immediately previous decoded picture reference type and the motion compensation prediction precision may include the eighth pel precision. The second reference type may include a non-immediately previous decoded picture reference type and the third motion compensation prediction precision may include the quarter pel precision. To determine the predicted partition of predicted pixel data may include the video coder being configured to filter the portion of the decoded reference picture with the eighth pel precision to determine a first predicted partition, filter a second portion of the second decoded reference picture with the quarter pel precision to determine a second predicted partition, and combine the first predicted partition and the second predicted partition to generate the predicted partition. To combine the first predicted partition and the second predicted partition may include the video coder being configured to implement a weighted average. The motion compensation prediction precision indicators may include a first indicator indicating whether the motion compensation prediction precision for the prediction partition which may include the quarter pel precision or the eighth pel precision. To determine the motion compensation prediction precision may include the video coder being configured to determine the motion compensation prediction precision based on the first indicator. To determine the motion compensation prediction precision and the second motion compensation prediction precision may include the video coder being configured to determine the motion compensation prediction precision based on a size of the prediction partition and the second motion compensation prediction precision based on a second size of the second prediction partition. The motion compensation prediction precision may include the quarter pel precision and the prediction partition may include a small prediction partition. The small prediction partition may include a 4×4, 4×8, 8×4 or 8×8 pixel partition. The second motion compensation prediction precision may include the eighth pel precision and the second prediction partition may include a large prediction partition. The large prediction partition may include a partition having a size comprising at least one of greater than 4×4 pixels or greater than 8×8 pixels. The motion compensation prediction precision indicators may include a first indicator indicating the motion compensation prediction precision for the prediction partition which may include the quarter pel precision and a second indicator indicating the second motion compensation prediction precision for the second prediction partition which may include the eighth pel precision. To determine the motion compensation prediction precision associated with at least the portion of the current picture being decoded may include the video coder being configured to determine the motion compensation for the entire current picture based on a picture type of the current picture from the plurality of picture types. To determine the motion compensation prediction precision associated with at least the portion of the current picture being decoded may include the video coder being configured to determine the motion compensation prediction precision based on a size of the prediction partition and a prediction partition size-based motion compensation prediction precision rule based at least in part on the picture type of the current picture from the plurality of picture types or a location of the current picture in the picture hierarchy from the plurality of locations of pictures in the picture hierarchy. To determine the motion compensation prediction precision associated with at least the portion of the current picture being decoded may include the video coder being configured to determine the motion compensation prediction precision based on a characteristic of the portion of the current picture. The characteristic may include a texture value of the portion of the current picture. When the texture value may be above a threshold, the motion compensation prediction precision may include the quarter pel precision. When the texture value may be less than or equal to the threshold, the motion compensation prediction precision may include the eighth pel precision. The motion compensation prediction precision may include the quarter pel precision. To filter the portion of the decoded reference picture may include the video coder being configured to determine a selected filter from a predefined codebook of a set of available filters based on an individual selected filter indicator of the plurality of selected filter indicators. The motion compensation prediction precision may include the eighth pel precision. To filter the portion of the decoded reference picture may include the video coder being configured to determine a selected filter from a predefined codebook of a set of available filters based on an individual selected filter indicator of the plurality of selected filter indicators, apply the selected filter to determine quarter pel locations of the eighth pel precision, and apply a fixed filter to determine remaining eighth pel locations of the eighth pel precision. The portion of the decoded reference picture may include a portion of a morphed reference picture generated based on a previously decoded reference picture and the morphing parameters. The morphing parameters may include at least one of gain parameters, blur parameters, registration parameters, or dominant motion parameters. Determining the motion compensation prediction precision associated with at least the portion of the current picture being decoded may include determining the motion compensation for the entire current picture based at least in part on a reference type of the morphed reference picture. The reference type may include at least one of gain, blur, registration, or dominant motion. The portion of the decoded reference picture may include a portion of a synthesized reference picture generated based on a previously decoded reference picture and the synthesizing parameters. The synthesizing parameters may include at least one super resolution parameters or projected interpolation parameters. Determining the motion compensation prediction precision associated with at least the portion of the current picture being decoded may include determining the motion compensation for the entire current picture based at least in part on a reference type of the synthesized reference picture. The reference type may include at least one of super resolution or projected interpolation.

FIG. 34 is an illustrative diagram of example video coding system 3400, arranged in accordance with at least some implementations of the present disclosure. In the illustrated implementation, video coding system 3400 may include imaging device(s) 3401, video encoder 100, video decoder 200 (and/or a video coder implemented via logic circuitry 3450 of processing unit(s) 3420), an antenna 3402, one or more processor(s) 3403, one or more memory store(s) 3404, and/or a display device 3405.

As illustrated, imaging device(s) 3401, antenna 3402, processing unit(s) 3420, logic circuitry 3450, video encoder 100, video decoder 200, processor(s) 3403, memory store(s) 3404, and/or display device 3405 may be capable of communication with one another. As discussed, although illustrated with both video encoder 100 and video decoder 200, video coding system 3400 may include only video encoder 100 or only video decoder 200 in various examples.

As shown, in some examples, video coding system 3400 may include antenna 3402. Antenna 3402 may be configured to transmit or receive an encoded bitstream of video data, for example. Further, in some examples, video coding system 3400 may include display device 3405. Display device 3405 may be configured to present video data. As shown, in some examples, logic circuitry 3450 may be implemented via processing unit(s) 3420. Processing unit(s) 3420 may include application-specific integrated circuit (ASIC) logic, graphics processor(s), general purpose processor(s), or the like. Video coding system 3400 also may include optional processor(s) 3403, which may similarly include application-specific integrated circuit (ASIC) logic, graphics processor(s), general purpose processor(s), or the like. In some examples, logic circuitry 3450 may be implemented via hardware, video coding dedicated hardware, or the like, and processor(s) 3403 may implemented general purpose software, operating systems, or the like. In addition, memory store(s) 3404 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 3404 may be implemented by cache memory. In some examples, logic circuitry 3450 may access memory store(s) 3404 (for implementation of an image buffer for example). In other examples, logic circuitry 3450 and/or processing unit(s) 3420 may include memory stores (e.g., cache or the like) for the implementation of an image buffer or the like.

In some examples, video encoder 100 implemented via logic circuitry may include an image buffer (e.g., via either processing unit(s) 3420 or memory store(s) 3404)) and a graphics processing unit (e.g., via processing unit(s) 3420). The graphics processing unit may be communicatively coupled to the image buffer. The graphics processing unit may include video encoder 100 as implemented via logic circuitry 3450 to embody the various modules as discussed with respect to FIG. 1 and/or any other encoder system or subsystem described herein. For example, the graphics processing unit may include coding partitions generator logic circuitry, adaptive transform logic circuitry, content pre-analyzer, encode controller logic circuitry, adaptive entropy encoder logic circuitry, and so on. The logic circuitry may be configured to perform the various operations as discussed herein.

In one example, graphics processing unit of video encoder 100 may be configured to determine a motion compensation prediction precision associated with at least a portion of a current picture being decoded. The motion compensation prediction precision may include at least one of a quarter pel precision or an eighth pel precision. The graphics processing unit may be further configured to generate predicted pixel data of a predicted partition associated with a prediction partition of the current picture by the graphics processing unit being configured to filter a portion of a decoded reference picture based at least in part on the motion compensation prediction precision. The graphics processing unit may be further configured to code, via an entropy encoder, prediction partitioning indicators associated with the prediction partition and a motion vector indicating a positional difference between the prediction partition and an associated partition of the decoded reference picture into a bitstream.

In some examples, the graphics processing unit of video encoder 100 may be further configured to partition the current picture into a plurality of prediction partitions including the prediction partition and a second prediction partition based on a partitioning technique including at least one of a bi-tree partitioning technique, a k-d tree partitioning technique, a codebook representation of a bi-tree partitioning technique, or a codebook representation of a k-d tree partitioning technique. The portion of the current picture may include the prediction partition. The motion compensation prediction precision indicators may include a first indicator indicating whether the motion compensation prediction precision for the prediction partition may include the quarter pel precision or the eighth pel precision. The prediction partitioning indicators may include indicators associated with the second prediction partition. The graphics processing unit may be further configured to determine a second motion compensation prediction precision associated with the second prediction partition. The second motion compensation prediction precision may include at least one of the quarter pel precision or the eighth pel precision. To determine the motion compensation prediction precision and the second motion compensation prediction precision may include the graphics processing unit being configured to determine the motion compensation prediction precision based on a size of the prediction partition and the second motion compensation prediction precision based on a second size of the second prediction partition. The motion compensation prediction precision may include the quarter pel precision and the prediction partition may include a small prediction partition. The small prediction partition may include a 4×4, 4×8, 8×4 or 8×8 pixel partition. The second motion compensation prediction precision may include the eighth pel precision and the second prediction partition may include a large prediction partition. The large prediction partition may include a partition having a size comprising at least one of greater than 4×4 pixels or greater than 8×8 pixels. The motion compensation prediction precision indicators may include a first indicator indicating the motion compensation prediction precision for the prediction partition which may include the quarter pel precision and a second indicator indicating the second motion compensation prediction precision for the second prediction partition which may include the eighth pel precision. The graphics processing unit may be further configured to determine a third motion compensation prediction precision associated with the current picture. The motion compensation prediction precision may be based at least in part on a reference type of the decoded reference picture. The third motion compensation prediction precision may be based at least in part on a second reference type of the second decoded reference picture. The reference type may include an immediately previous decoded picture reference type and the motion compensation prediction precision may include the eighth pel precision. The second reference type may include a non-immediately previous decoded picture reference type and the second motion compensation prediction precision may include the quarter pel precision. To determine the predicted pixel data may include the graphics processing unit being configured to filter the portion of the decoded reference picture with the eighth pel precision to determine a first predicted partition, filter a second portion of the second decoded reference picture with the quarter pel precision to determine a second predicted partition, and combine the first predicted partition and the second predicted partition to generate the predicted partition of predicted pixel data. To combine the first predicted partition and the second predicted partition may include the graphics processing unit being configured to implement a weighted average. The graphics processing unit may be further configured to determine a fourth motion compensation prediction precision associated with at least a portion of a second current picture being decoded. The fourth motion compensation prediction precision may include the quarter pel precision and the compensation prediction precision may include the eighth pel precision. To determine the motion compensation prediction precision associated with at least the portion of the current picture being decoded may include the graphics processing unit being configured to determine the motion compensation prediction precision for the entire current picture based on at least one of a picture type of the current picture or a location of the current picture in a picture hierarchy. To determine the motion compensation prediction precision associated with at least the portion of the current picture being decoded may include the graphics processing unit being configured to determine the motion compensation prediction precision based on a size of the prediction partition and a prediction partition size-based motion compensation prediction precision rule based at least in part on a picture type of the current picture or a location of the current picture in a picture hierarchy. To determine the motion compensation prediction precision associated with at least the portion of the current picture being decoded may include the graphics processing unit being configured to determine the motion compensation prediction precision based on a characteristic of the portion of the current picture. The characteristic may include a texture value of the portion of the current picture. When the texture value may be above a threshold, the motion compensation prediction precision may include the quarter pel precision. When the texture value may be less than or equal to the threshold, the motion compensation prediction precision may include the eighth pel precision. The motion compensation prediction precision may include the quarter pel precision. To filter the portion of the decoded reference picture may include the graphics processing unit being configured to determine a selected filter from a predefined codebook of a set of available filters.

The motion compensation prediction precision may include the eighth pel precision. To filter the portion of the decoded reference picture may include the graphics processing unit being configured to determine the selected filter from the predefined codebook of the set of available filters, apply the selected filter to determine quarter pel locations of the eighth pel precision, and apply a fixed filter to determine remaining eighth pel locations of the eighth pel precision. The portion of the decoded reference picture may include a portion of a morphed reference picture generated based on a previously decoded reference picture and morphing parameters. The morphing parameters may include at least one of gain parameters, blur parameters, registration parameters, or dominant motion parameters. The portion of the decoded reference picture may include a portion of a synthesized reference picture generated based on a previously decoded reference picture and synthesizing parameters. The synthesizing parameters may include at least one super resolution parameters or projected interpolation parameters. The portion of the decoded reference picture may include the portion of the morphed reference picture generated based on a previously decoded reference picture and the morphing parameters. To determine the motion compensation prediction precision associated with at least the portion of the current picture being decoded may include the graphics processing unit being configured to determine the motion compensation for the entire current picture based at least in part on a reference type of the morphed reference picture. The reference type may include at least one of gain, blur, registration, or dominant motion. The reference type may include dominant motion and the motion compensation prediction precision may include the quarter pel precision. The portion of the decoded reference picture may include the portion of the synthesized reference picture generated based on the previously decoded reference picture and the synthesizing parameters. To determine the motion compensation prediction precision associated with at least the portion of the current picture being decoded may include the graphics processing unit being configured to determine the motion compensation for the entire current picture based at least in part on a reference type of the synthesized reference picture. The reference type may include at least one of super resolution or projected interpolation. The reference type may include projected interpolation and the motion compensation prediction precision may include the eighth pel precision. The portion of the decoded reference picture may include the portion of the morphed reference picture generated based on the previously decoded reference picture and the morphing parameters. The portion of the current picture may include the prediction partition. To determine the motion compensation prediction precision associated the prediction partition may include the graphics processing unit being configured to determine the motion compensation for the prediction partition based at least in part on the reference type of the morphed reference picture. The decoded reference picture may include the synthesized reference picture generated based on the previously decoded reference picture and the synthesizing parameters. The portion of the current picture may include the prediction partition. To determine the motion compensation prediction precision associated the prediction partition may include the graphics processing unit being configured to determine the motion compensation for the prediction partition based at least in part on the reference type of the synthesized reference picture. The portion of the current picture may include at least one of the prediction partition, a tile, a super-fragment, a coding unit, a slice, a region, or the entire current picture. The graphics processing unit may be further configured to code, via the entropy encoder, the picture type of the current picture, the location of the current picture in the picture hierarchy, the morphing parameters, the synthesizing parameters, a selected filter indicator indicating the selected filter, and a prediction error data partition associated with the prediction partition. The graphics processing unit may be further configured to transmit the bitstream.

Video decoder 200 may be implemented in a similar manner as implemented via logic circuitry 3450 to embody the various modules as discussed with respect to decoder 200 of FIG. 2 and/or any other decoder system or subsystem described herein.

In some examples, antenna 3402 of video coding system 3400 may be configured to receive an encoded bitstream of video data. As discussed, the encoded bitstream may include data associated with the coding partition (e.g., transform coefficients or quantized transform coefficients, optional indicators (as discussed), and/or data defining the coding partition (e.g., data associated with defining bi-tree partitions or k-d tree partitions using a symbol-run coding or codebook technique or the like)). Video coding system 3400 may also include video decoder 200

In another implementation, video coding system 3400 may include a video decoder 200 configured to decode an encoded bitstream. Video decoder 200 may be configured to decode the encoded bitstream to determine prediction partitioning indicators, a plurality of motion vectors, and a plurality of prediction error data partitions. The video decoder may be further configured to determine a prediction partition of the current picture based on the prediction partitioning indicators. The video decoder may be further configured to determine a motion compensation prediction precision associated with at least a portion of a current picture being decoded. The motion compensation prediction precision may include at least one of a quarter pel precision or an eighth pel precision. The video decoder may be further configured to generate predicted pixel data of a predicted partition associated with the prediction partition of the current picture by the video decoder being configured to filter a portion of a decoded reference picture based at least in part on a motion vector of the plurality of motion vectors and the motion compensation prediction precision. The video decoder may be further configured to add the predicted pixel data of the decoded predicted partition to a prediction error data partition of the plurality of prediction error data partitions to generate a first reconstructed partition. The video decoder may be further configured to add the first reconstructed partition and a second reconstructed partition to generate a reconstructed tile or super-fragment. The video decoder may be further configured to apply a deblock filter to the reconstructed tile or super-fragment to generate a first final reconstructed tile or super-fragment. The video decoder may be further configured to assemble the first final reconstructed tile or super-fragment and a second final reconstructed tile or super-fragment to generate a final reconstructed video frame. The video decoder may be further configured to transmit the final reconstructed video frame for presentment.

In some examples, the video decoder 200 may be further configured to receive the bitstream. The video decoder may be further configured to decode the bitstream to determine motion compensation prediction precision indicators, a plurality of picture types, a plurality of locations of pictures in a picture hierarchy, morphing parameters, synthesizing parameters, a plurality of reference types of pictures, and a plurality of selected filter indicators. The video decoder may be further configured to determine a second prediction partition of the current picture based on the prediction partitioning indicators. The video decoder may be further configured to determine a second motion compensation prediction precision associated with the second prediction partition. The second motion compensation prediction precision may include at least one of a quarter pel precision or an eighth pel precision. The video decoder may be further configured to determine a third motion compensation prediction precision associated with the current picture. The motion compensation prediction precision may be based at least in part on a reference type of the decoded reference picture. The third motion compensation prediction precision may be based at least in part on a second reference type of a second decoded reference picture. The reference type may include an immediately previous decoded picture reference type and the motion compensation prediction precision may include the eighth pel precision. The second reference type may include a non-immediately previous decoded picture reference type and the third motion compensation prediction precision may include the quarter pel precision. To determine the predicted partition of predicted pixel data may include the video coder being configured to filter the portion of the decoded reference picture with the eighth pel precision to determine a first predicted partition, filter a second portion of the second decoded reference picture with the quarter pel precision to determine a second predicted partition, and combine the first predicted partition and the second predicted partition to generate the predicted partition. To combine the first predicted partition and the second predicted partition may include the video coder being configured to implement a weighted average. The motion compensation prediction precision indicators may include a first indicator indicating whether the motion compensation prediction precision for the prediction partition which may include the quarter pel precision or the eighth pel precision. To determine the motion compensation prediction precision may include the video coder being configured to determine the motion compensation prediction precision based on the first indicator. To determine the motion compensation prediction precision and the second motion compensation prediction precision may include the video coder being configured to determine the motion compensation prediction precision based on a size of the prediction partition and the second motion compensation prediction precision based on a second size of the second prediction partition. The motion compensation prediction precision may include the quarter pel precision and the prediction partition may include a small prediction partition. The small prediction partition may include a 4×4, 4×8, 8×4 or 8×8 pixel partition. The second motion compensation prediction precision may include the eighth pel precision and the second prediction partition may include a large prediction partition. The large prediction partition may include a partition having a size comprising at least one of greater than 4×4 pixels or greater than 8×8 pixels. The motion compensation prediction precision indicators may include a first indicator indicating the motion compensation prediction precision for the prediction partition which may include the quarter pel precision and a second indicator indicating the second motion compensation prediction precision for the second prediction partition which may include the eighth pel precision. To determine the motion compensation prediction precision associated with at least the portion of the current picture being decoded may include the video coder being configured to determine the motion compensation for the entire current picture based on a picture type of the current picture from the plurality of picture types. To determine the motion compensation prediction precision associated with at least the portion of the current picture being decoded may include the video coder being configured to determine the motion compensation prediction precision based on a size of the prediction partition and a prediction partition size-based motion compensation prediction precision rule based at least in part on the picture type of the current picture from the plurality of picture types or a location of the current picture in the picture hierarchy from the plurality of locations of pictures in the picture hierarchy. To determine the motion compensation prediction precision associated with at least the portion of the current picture being decoded may include the video coder being configured to determine the motion compensation prediction precision based on a characteristic of the portion of the current picture. The characteristic may include a texture value of the portion of the current picture. When the texture value may be above a threshold, the motion compensation prediction precision may include the quarter pel precision. When the texture value may be less than or equal to the threshold, the motion compensation prediction precision may include the eighth pel precision. The motion compensation prediction precision may include the quarter pel precision. To filter the portion of the decoded reference picture may include the video coder being configured to determine a selected filter from a predefined codebook of a set of available filters based on an individual selected filter indicator of the plurality of selected filter indicators. The motion compensation prediction precision may include the eighth pel precision. To filter the portion of the decoded reference picture may include the video coder being configured to determine a selected filter from a predefined codebook of a set of available filters based on an individual selected filter indicator of the plurality of selected filter indicators, apply the selected filter to determine quarter pel locations of the eighth pel precision, and apply a fixed filter to determine remaining eighth pel locations of the eighth pel precision. The portion of the decoded reference picture may include a portion of a morphed reference picture generated based on a previously decoded reference picture and the morphing parameters. The morphing parameters may include at least one of gain parameters, blur parameters, registration parameters, or dominant motion parameters. Determining the motion compensation prediction precision associated with at least the portion of the current picture being decoded may include determining the motion compensation for the entire current picture based at least in part on a reference type of the morphed reference picture. The reference type may include at least one of gain, blur, registration, or dominant motion. The portion of the decoded reference picture may include a portion of a synthesized reference picture generated based on a previously decoded reference picture and the synthesizing parameters. The synthesizing parameters may include at least one super resolution parameters or projected interpolation parameters. Determining the motion compensation prediction precision associated with at least the portion of the current picture being decoded may include determining the motion compensation for the entire current picture based at least in part on a reference type of the synthesized reference picture. The reference type may include at least one of super resolution or projected interpolation.

In embodiments, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 35:
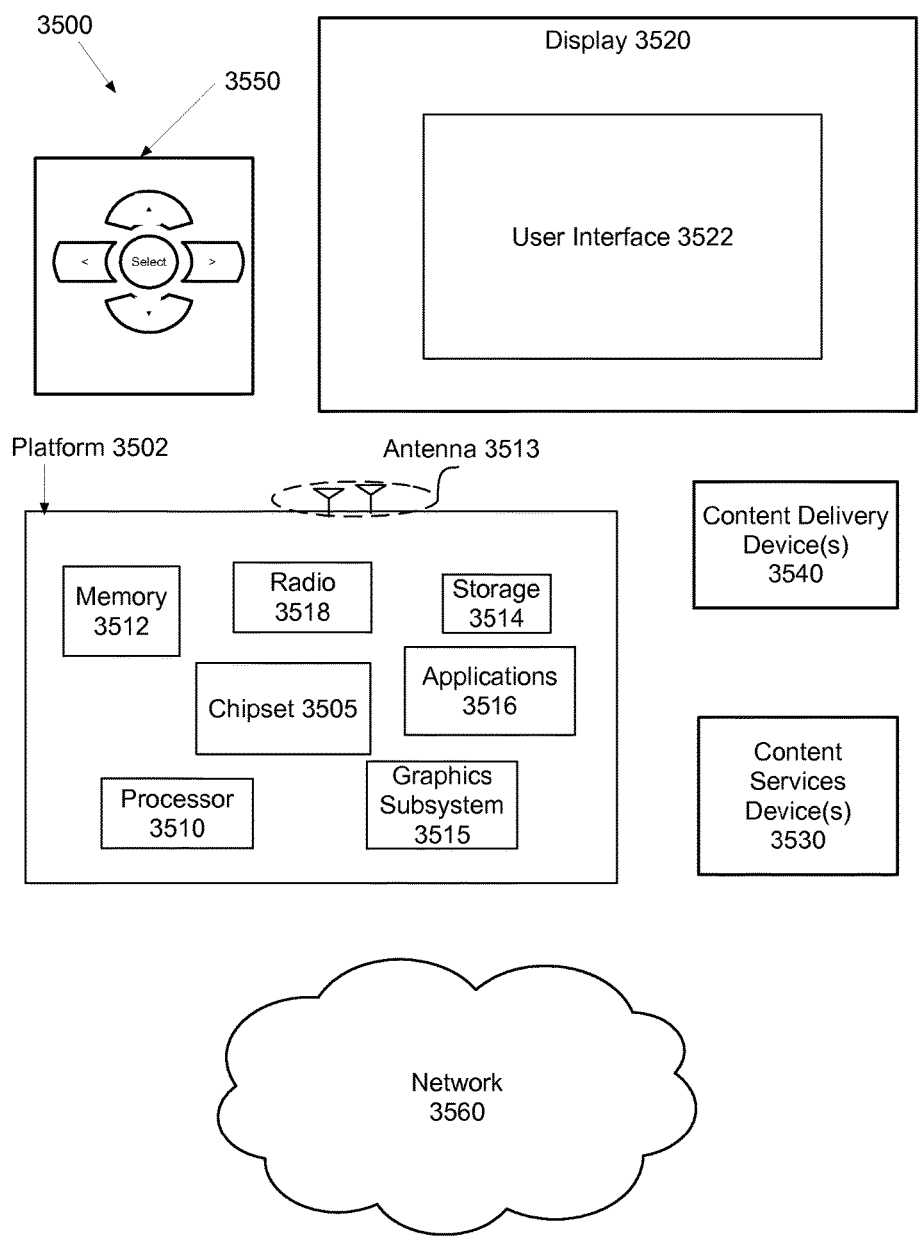
FIG. 35 is an illustrative diagram of an example system.

FIG. 35 is an illustrative diagram of an example system 3500, arranged in accordance with at least some implementations of the present disclosure. In various implementations, system 3500 may be a media system although system 3500 is not limited to this context. For example, system 3500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 3500 includes a platform 3502 coupled to a display 3520. Platform 3502 may receive content from a content device such as content services device(s) 3530 or content delivery device(s) 3540 or other similar content sources. A navigation controller 3550 including one or more navigation features may be used to interact with, for example, platform 3502 and/or display 3520. Each of these components is described in greater detail below.

In various implementations, platform 3502 may include any combination of a chipset 3505, processor 3510, memory 3512, antenna 3513, storage 3514, graphics subsystem 3515, applications 3516 and/or radio 3518. Chipset 3505 may provide intercommunication among processor 3510, memory 3512, storage 3514, graphics subsystem 3515, applications 3516 and/or radio 3518. For example, chipset 3505 may include a storage adapter (not depicted) capable of providing intercommunication with storage 3514.

Processor 3510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 3510 may be dual-core processor(s), dual-core mobile processor(s), and so forth.

Memory 3512 may be implemented as a volatile memory device such as, but not limited to, a Random Access Memory (RAM), Dynamic Random Access Memory (DRAM), or Static RAM (SRAM).

Storage 3514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 3514 may include technology to increase the storage performance enhanced protection for valuable digital media when multiple hard drives are included, for example.

Graphics subsystem 3515 may perform processing of images such as still or video for display. Graphics subsystem 3515 may be a graphics processing unit (GPU) or a visual processing unit (VPU), for example. An analog or digital interface may be used to communicatively couple graphics subsystem 3515 and display 3520. For example, the interface may be any of a High-Definition Multimedia Interface, DisplayPort, wireless HDMI, and/or wireless HD compliant techniques. Graphics subsystem 3515 may be integrated into processor 3510 or chipset 3505. In some implementations, graphics subsystem 3515 may be a stand-alone device communicatively coupled to chipset 3505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 3518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 3518 may operate in accordance with one or more applicable standards in any version.

In various implementations, display 3520 may include any television type monitor or display. Display 3520 may include, for example, a computer display screen, touch screen display, video monitor, television-like device, and/or a television. Display 3520 may be digital and/or analog. In various implementations, display 3520 may be a holographic display. Also, display 3520 may be a transparent surface that may receive a visual projection. Such projections may convey various forms of information, images, and/or objects. For example, such projections may be a visual overlay for a mobile augmented reality (MAR) application. Under the control of one or more software applications 3516, platform 3502 may display user interface 3522 on display 3520.

In various implementations, content services device(s) 3530 may be hosted by any national, international and/or independent service and thus accessible to platform 3502 via the Internet, for example. Content services device(s) 3530 may be coupled to platform 3502 and/or to display 3520. Platform 3502 and/or content services device(s) 3530 may be coupled to a network 3560 to communicate (e.g., send and/or receive) media information to and from network 3560. Content delivery device(s) 3540 also may be coupled to platform 3502 and/or to display 3520.

In various implementations, content services device(s) 3530 may include a cable television box, personal computer, network, telephone, Internet enabled devices or appliance capable of delivering digital information and/or content, and any other similar device capable of unidirectionally or bidirectionally communicating content between content providers and platform 3502 and/display 3520, via network 3560 or directly. It will be appreciated that the content may be communicated unidirectionally and/or bidirectionally to and from any one of the components in system 3500 and a content provider via network 3560. Examples of content may include any media information including, for example, video, music, medical and gaming information, and so forth.

Content services device(s) 3530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 3502 may receive control signals from navigation controller 3550 having one or more navigation features. The navigation features of controller 3550 may be used to interact with user interface 3522, for example. In various embodiments, navigation controller 3550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 3550 may be replicated on a display (e.g., display 3520) by movements of a pointer, cursor, focus ring, or other visual indicators displayed on the display. For example, under the control of software applications 3516, the navigation features located on navigation controller 3550 may be mapped to virtual navigation features displayed on user interface 3522. In various embodiments, controller 3550 may not be a separate component but may be integrated into platform 3502 and/or display 3520. The present disclosure, however, is not limited to the elements or in the context shown or described herein.

In various implementations, drivers (not shown) may include technology to enable users to instantly turn on and off platform 3502 like a television with the touch of a button after initial boot-up, when enabled, for example. Program logic may allow platform 3502 to stream content to media adaptors or other content services device(s) 3530 or content delivery device(s) 3540 even when the platform is turned "off" In addition, chipset 3505 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 3500 may be integrated. For example, platform 3502 and content services device(s) 3530 may be integrated, or platform 3502 and content delivery device(s) 3540 may be integrated, or platform 3502, content services device(s) 3530, and content delivery device(s) 3540 may be integrated, for example. In various embodiments, platform 3502 and display 3520 may be an integrated unit. Display 3520 and content service device(s) 3530 may be integrated, or display 3520 and content delivery device(s) 3540 may be integrated, for example. These examples are not meant to limit the present disclosure.

In various embodiments, system 3500 may be implemented as a wireless system, a wired system, or a combination of both. When implemented as a wireless system, system 3500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 3500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 3502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 35.

Figure 36:
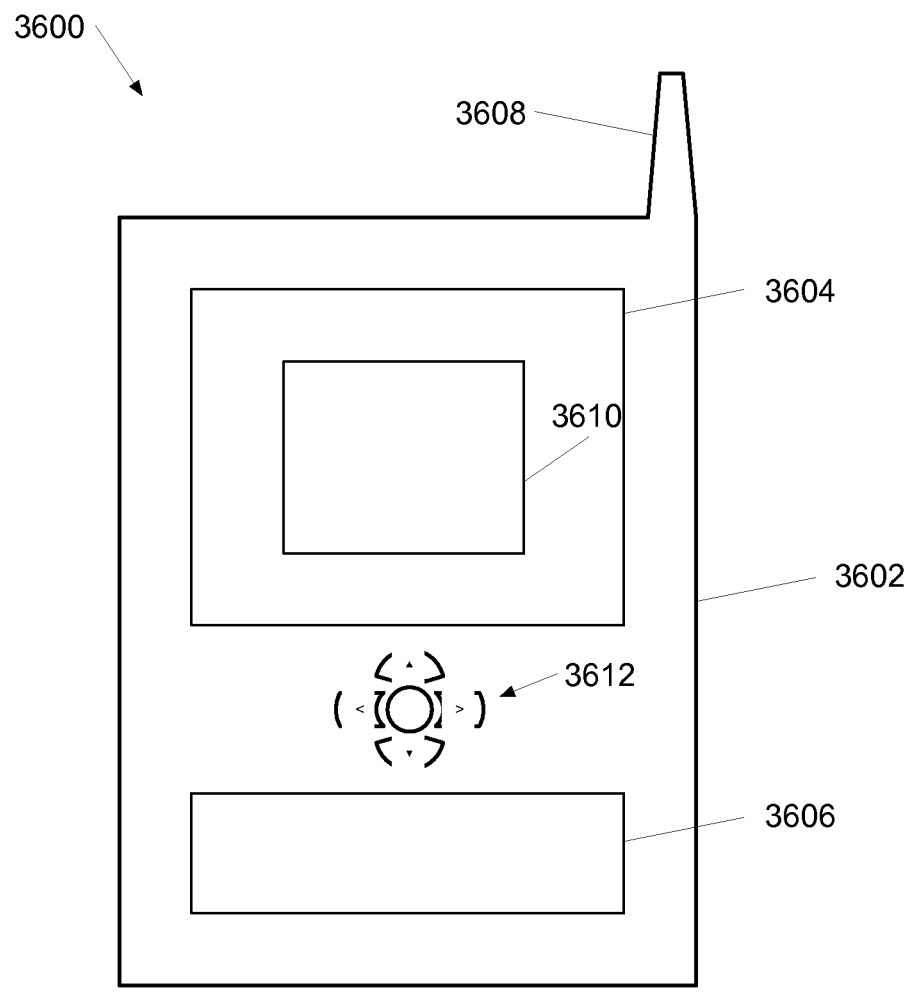
FIG. 36 illustrates an example device, all arranged in accordance with at least some implementations of the present disclosure.

As described above, system 3500 may be embodied in varying physical styles or form factors. FIG. 36 illustrates implementations of a small form factor device 3600 in which system 3600 may be embodied. In various embodiments, for example, device 3600 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 36, device 3600 may include a housing 3602, a display 3604 which may include a user interface 3610, an input/output (I/O) device 3606, and an antenna 3608. Device 3600 also may include navigation features 3612. Display 3604 may include any suitable display unit for displaying information appropriate for a mobile computing device. I/O device 3606 may include any suitable I/O device for entering information into a mobile computing device. Examples for I/O device 3606 may include an alphanumeric keyboard, a numeric keypad, a touch pad, input keys, buttons, switches, rocker switches, microphones, speakers, voice recognition device and software, and so forth. Information also may be entered into device 3600 by way of microphone (not shown). Such information may be digitized by a voice recognition device (not shown). The embodiments are not limited in this context.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding may include determining, via a motion compensated filtering predictor module, a motion compensation prediction precision associated with at least a portion of a current picture being decoded, where the motion compensation prediction precision comprises at least one of a quarter pel precision or an eighth pel precision. Predicted pixel data of a predicted partition associated with a prediction partition of the current picture may be generated, via the motion compensated filtering predictor module, by filtering a portion of a decoded reference picture based at least in part on the motion compensation prediction precision. Prediction partitioning indicators associated with the prediction partition and a motion vector indicating a positional difference between the prediction partition and an associated partition of the decoded reference picture may be coded, via an entropy encoder, into a bitstream.

In some implementations, the current picture may be partitioned, via a prediction partitions generator module, into a plurality of prediction partitions comprising the prediction partition based on a partitioning technique including at least one of a bi-tree partitioning technique, a k-d tree partitioning technique, a codebook representation of a bi-tree partitioning technique, or a codebook representation of a k-d tree partitioning technique, where the portion of the current picture comprises the prediction partition. Motion compensation prediction precision indicators may be coded, via the entropy encoder, including a first indicator indicating whether the motion compensation prediction precision for the prediction partition includes the quarter pel precision or the eighth pel precision into the bitstream.

In some implementations, the current picture may be partitioned, via a prediction partitions generator module, into a plurality of prediction partitions including the prediction partition and a second prediction partition, where the portion of the current picture comprises the prediction partition. A second motion compensation prediction precision associated with the second prediction partition may be determined, via the motion compensated filtering predictor module, where the second motion compensation prediction precision includes at least one of the quarter pel precision or the eighth pel precision. Determining the motion compensation prediction precision and the second motion compensation prediction precision may include determining the motion compensation prediction precision based on a size of the prediction partition and the second motion compensation prediction precision based on a second size of the second prediction partition.

In some implementations, determining the motion compensation prediction precision associated with at least the portion of the current picture being decoded may include determining the motion compensation for the entire current picture based on at least one of a picture type of the current picture or a location of the current picture in a picture hierarchy.

In some implementations, determining the motion compensation prediction precision associated with at least the portion of the current picture being decoded may include determining the motion compensation prediction precision based on a size of the prediction partition and a prediction partition size-based motion compensation prediction precision rule based at least in part on a picture type of the current picture or a location of the current picture in a picture hierarchy.

In some implementations, determining the motion compensation prediction precision associated with at least the portion of the current picture being decoded may include determining the motion compensation prediction precision based on a characteristic of the portion of the current picture, where the characteristic may include a texture value of the portion of the current picture. When the texture value is above a threshold, the motion compensation prediction precision may include the quarter pel precision. When the texture value is less than or equal to the threshold, the motion compensation prediction precision may include the eighth pel precision.

In some implementations, a second motion compensation prediction precision associated with the current picture may be determined, via the motion compensated filtering predictor module, where the motion compensation prediction precision is based at least in part on a reference type of the decoded reference picture, where the second motion compensation prediction precision is based at least in part on a second reference type of a second decoded reference picture, where the reference type may include an immediately previous decoded picture reference type and the motion compensation prediction precision may include the eighth pel precision, where the second reference type comprises a non-immediately previous decoded picture reference type and the second motion compensation prediction precision may include the quarter pel precision, and where determining the predicted partition of predicted pixel data may include filtering the portion of the decoded reference picture with the eighth pel precision to determine a first predicted partition, filtering a second portion of the second decoded reference picture with the quarter pel precision to determine a second predicted partition, and combining the first predicted partition and the second predicted partition to generate the predicted partition, where combining the first predicted partition and the second predicted partition may include a weighted average.

In some examples, the motion compensation prediction precision may include the quarter pel precision and filtering the portion of the decoded reference picture may include determining a selected filter from a predefined codebook of a set of available filters.

In some examples, the motion compensation prediction precision may include the eighth pel precision and filtering the portion of the decoded reference picture may include determining a selected filter from a predefined codebook of a set of available filters, applying the selected filter to determine quarter pel locations of the eighth pel precision, and applying a fixed filter to determine remaining eighth pel locations of the eighth pel precision.

In some examples, the portion of the decoded reference picture may include a portion of a morphed reference picture generated based on a previously decoded reference picture and morphing parameters and the morphing parameters may include at least one of gain parameters, blur parameters, registration parameters, or dominant motion parameters.

In some examples, the portion of the decoded reference picture may include a portion of a synthesized reference picture generated based on a previously decoded reference picture and synthesizing parameters and the synthesizing parameters may include at least one super resolution parameters or projected interpolation parameters.

In some examples, the portion of the decoded reference picture may include a portion of a morphed reference picture generated based on a previously decoded reference picture and morphing parameters. Determining the motion compensation prediction precision associated with at least the portion of the current picture being decoded may include determining the motion compensation for the entire current picture based at least in part on a reference type of the morphed reference picture. The reference type may include at least one of gain, blur, registration, or dominant motion.

In some examples, the portion of the decoded reference picture may include a portion of a synthesized reference picture generated based on a previously decoded reference picture and synthesizing parameters. Determining the motion compensation prediction precision associated with at least the portion of the current picture being decoded may include determining the motion compensation for the entire current picture based at least in part on a reference type of the synthesized reference picture. The reference type may include at least one of super resolution or projected interpolation.

In some examples, the portion of the decoded reference picture may include a portion of a morphed reference picture generated based on a previously decoded reference picture and morphing parameters. The portion of the current picture may include the prediction partition. Determining the motion compensation prediction precision associated the prediction partition may include determining the motion compensation for the prediction partition based at least in part on a reference type of the morphed reference picture. The reference type may include at least one of gain, blur, registration, or dominant motion.

In some examples, the portion of the decoded reference picture may include a portion of a synthesized reference picture generated based on a previously decoded reference picture and synthesizing parameters. The portion of the current picture may include the prediction partition. Determining the motion compensation prediction precision associated the prediction partition may include determining the motion compensation for the prediction partition based at least in part on a reference type of the synthesized reference picture. The reference type may include at least one of super resolution or projected interpolation.

In some implementations, a computer-implemented method for video coding may further include partitioning, via a prediction partitions generator module, the current picture into a plurality of prediction partitions including the prediction partition and a second prediction partition based on a partitioning technique including at least one of a bi-tree partitioning technique, a k-d tree partitioning technique, a codebook representation of a bi-tree partitioning technique, or a codebook representation of a k-d tree partitioning technique. The portion of the current picture may include the prediction partition. A second motion compensation prediction precision associated with the second prediction partition may be determined, via the motion compensated filtering predictor module. The second motion compensation prediction precision may include at least one of the quarter pel precision or the eighth pel precision. Determining the motion compensation prediction precision and the second motion compensation prediction precision may include determining the motion compensation prediction precision based on a size of the prediction partition and the second motion compensation prediction precision based on a second size of the second prediction partition. The motion compensation prediction precision may include the quarter pel precision and the prediction partition may include a small prediction partition. The small prediction partition may include a 4×4, 4×8, 8×4 or 8×8 pixel partition. The second motion compensation prediction precision may include the eighth pel precision and the second prediction partition may include a large prediction partition. The large prediction partition may include a partition having a size including at least one of greater than 4×4 pixels or greater than 8×8 pixels. The motion compensation prediction precision indicators may include a first indicator indicating the motion compensation prediction precision for the prediction partition, which may include the quarter pel precision, and a second indicator indicating the second motion compensation prediction precision for the second prediction partition, which may include the eighth pel precision. The computer-implemented method for video coding may further include determining, via the motion compensated filtering predictor module, a third motion compensation prediction precision associated with the current picture, where the motion compensation prediction precision may be based at least in part on a reference type of the decoded reference picture. The third motion compensation prediction precision may be based at least in part on a second reference type of the second decoded reference picture. The reference type may include an immediately previous decoded picture reference type and the motion compensation prediction precision may include the eighth pel precision. The second reference type may include a non-immediately previous decoded picture reference type and the second motion compensation prediction precision may include the quarter pel precision. Determining the predicted pixel data may include filtering the portion of the decoded reference picture with the eighth pel precision to determine a first predicted partition, filtering a second portion of the second decoded reference picture with the quarter pel precision to determine a second predicted partition, and combining the first predicted partition and the second predicted partition to generate the predicted partition of predicted pixel data. Combining the first predicted partition and the second predicted partition may include a weighted average. The computer-implemented method for video coding may further include determining, via the motion compensated filtering predictor module, a fourth motion compensation prediction precision associated with at least a portion of a second current picture being decoded, where the fourth motion compensation prediction precision may include the quarter pel precision and the compensation prediction precision may include the eighth pel precision. Determining the motion compensation prediction precision associated with at least the portion of the current picture being decoded may include determining the motion compensation prediction precision for the entire current picture based on at least one of a picture type of the current picture or a location of the current picture in a picture hierarchy. Determining the motion compensation prediction precision associated with at least the portion of the current picture being decoded may include determining the motion compensation prediction precision based on a size of the prediction partition and a prediction partition size-based motion compensation prediction precision rule based at least in part on a picture type of the current picture or a location of the current picture in a picture hierarchy. Determining the motion compensation prediction precision associated with at least the portion of the current picture being decoded may include determining the motion compensation prediction precision based on a characteristic of the portion of the current picture. The characteristic may include a texture value of the portion of the current picture. When the texture value may be above a threshold, the motion compensation prediction precision may include the quarter pel precision. When the texture value may be less than or equal to the threshold, the motion compensation prediction precision may include the eighth pel precision. The motion compensation prediction precision may include the quarter pel precision and where filtering the portion of the decoded reference picture may include determining a selected filter from a predefined codebook of a set of available filters. The motion compensation prediction precision may include the eighth pel precision. Filtering the portion of the decoded reference picture may include determining the selected filter from the predefined codebook of the set of available filters, applying the selected filter to determine quarter pel locations of the eighth pel precision, and applying a fixed filter to determine remaining eighth pel locations of the eighth pel precision. The portion of the decoded reference picture may include a portion of a morphed reference picture generated based on a previously decoded reference picture and morphing parameters. The morphing parameters may include at least one of gain parameters, blur parameters, registration parameters, or dominant motion parameters. The portion of the decoded reference picture may include a portion of a synthesized reference picture generated based on a previously decoded reference picture and synthesizing parameters. The synthesizing parameters may include at least one super resolution parameters or projected interpolation parameters. The portion of the decoded reference picture may include the portion of the morphed reference picture generated based on a previously decoded reference picture and the morphing parameters. Determining the motion compensation prediction precision associated with at least the portion of the current picture being decoded may include determining the motion compensation for the entire current picture based at least in part on a reference type of the morphed reference picture. The reference type may include at least one of gain, blur, registration, or dominant motion. The reference type may include dominant motion and the motion compensation prediction precision may include the quarter pel precision. The portion of the decoded reference picture may include the portion of the synthesized reference picture generated based on the previously decoded reference picture and the synthesizing parameters. Determining the motion compensation prediction precision associated with at least the portion of the current picture being decoded may include determining the motion compensation for the entire current picture based at least in part on a reference type of the synthesized reference picture. The reference type may include at least one of super resolution or projected interpolation. The reference type may include projected interpolation and the motion compensation prediction precision may include the eighth pel precision. The portion of the decoded reference picture may include the portion of the morphed reference picture generated based on the previously decoded reference picture and the morphing parameters. The portion of the current picture may include the prediction partition. Determining the motion compensation prediction precision associated the prediction partition may include determining the motion compensation for the prediction partition based at least in part on the reference type of the morphed reference picture. The decoded reference picture may include the synthesized reference picture generated based on the previously decoded reference picture and the synthesizing parameters. The portion of the current picture may include the prediction partition. Determining the motion compensation prediction precision associated the prediction partition may include determining the motion compensation for the prediction partition based at least in part on the reference type of the synthesized reference picture. The portion of the current picture may include at least one of the prediction partition, a tile, a super-fragment, a coding unit, a slice, a region, or the entire current picture. The computer-implemented method for video coding may further include coding, via the entropy encoder, motion compensation prediction precision indicators comprising a first indicator indicating whether the motion compensation prediction precision for the prediction partition may include the quarter pel precision or the eighth pel precision and a second indicator indicating whether the second motion compensation prediction precision for the second prediction partition may include the quarter pel precision or the eighth pel precision, the picture type of the current picture, the location of the current picture in the picture hierarchy, the morphing parameters, the synthesizing parameters, a selected filter indicator indicating the selected filter, and a prediction error data partition associated with the prediction partition. The computer-implemented method for video coding may further include transmitting the bitstream, receiving the bitstream, and decoding, via an adaptive entropy decoder, the bitstream to determine the prediction partitioning indicators, the motion vector, the motion compensation prediction precision indicators, the picture type of the current picture, the location of the current picture in the picture hierarchy, the morphing parameters, the synthesizing parameters, the selected filter indicator indicating the selected filter, and the prediction error data partition. The computer-implemented method for video coding may further include determining, via a motion compensated filtering predictor decoder module, a decoder motion compensation prediction precision associated with at least the portion of a current decoder picture being decoded, based on the motion compensation prediction precision indicators. The motion compensation prediction precision may include at least one of a quarter pel precision or an eighth pel precision. The computer-implemented method for video coding may further include determining, via the motion compensated filtering predictor module, decoded predicted pixel data of a decoded predicted partition for a decoded prediction partition of the current picture based at least in part on filtering a portion of a decoder decoded reference picture and the decoder motion compensation prediction precision. The computer-implemented method for video coding may further include adding, via an adder, the decoded predicted pixel data of the decoded predicted partition to the prediction error data partition to generate a first reconstructed partition. The computer-implemented method for video coding may further include adding, via a prediction partitions assembler module, the first reconstructed partition and a second reconstructed partition to generate a reconstructed tile or super-fragment. The computer-implemented method for video coding may further include applying, via a deblock filtering module, a deblock filter to the reconstructed tile or super-fragment to generate a first final reconstructed tile or super-fragment, assembling, via the deblock filtering module the first final reconstructed tile or super-fragment and a second final reconstructed tile or super-fragment to generate a final reconstructed video frame, and transmitting the final reconstructed video frame for presentment via a display device.

In a further example, a video encoder may include an image buffer and a graphics processing unit communicatively coupled to the image buffer and configured to determine a motion compensation prediction precision associated with at least a portion of a current picture being decoded. The motion compensation prediction precision may include at least one of a quarter pel precision or an eighth pel precision. The graphics processing unit may be further configured to generate predicted pixel data of a predicted partition associated with a prediction partition of the current picture by the graphics processing unit being configured to filter a portion of a decoded reference picture based at least in part on the motion compensation prediction precision. The graphics processing unit may be further configured to code, via an entropy encoder, prediction partitioning indicators associated with the prediction partition and a motion vector indicating a positional difference between the prediction partition and an associated partition of the decoded reference picture into a bitstream.

In some examples, the graphics processing unit may be further configured to partition the current picture into a plurality of prediction partitions including the prediction partition based on a partitioning technique including at least one of a bi-tree partitioning technique, a k-d tree partitioning technique, a codebook representation of a bi-tree partitioning technique, or a codebook representation of a k-d tree partitioning technique. The portion of the current picture may include the prediction partition. The graphics processing unit may be further configured to code, via the entropy encoder, motion compensation prediction precision indicators comprising an indicator indicating whether the motion compensation prediction precision for the prediction partition may include the quarter pel precision or the eighth pel precision into the bitstream.

In some examples, the graphics processing unit may be further configured to partition the current picture into a plurality of prediction partitions comprising the prediction partition and a second prediction partition, where the portion of the current picture may include the prediction partition. A second motion compensation prediction precision associated with the second prediction partition may be determined, where the second motion compensation prediction precision may include at least one of the quarter pel precision or the eighth pel precision. To determine the motion compensation prediction precision and the second motion compensation prediction precision may include the graphics processing unit being configured to determine the motion compensation prediction precision based on a size of the prediction partition and the second motion compensation prediction precision based on a second size of the second prediction partition.

In some examples, to determine the motion compensation prediction precision associated with at least the portion of the current picture being decoded may include the graphics processing unit being configured to determine the motion compensation for the entire current picture based on at least one of a picture type of the current picture or a location of the current picture in a picture hierarchy.

In some examples, to determine the motion compensation prediction precision associated with at least the portion of the current picture being decoded may include the graphics processing unit being configured to determine the motion compensation prediction precision based on a size of the prediction partition and a prediction partition size-based motion compensation prediction precision rule based at least in part on a picture type of the current picture or a location of the current picture in a picture hierarchy.

In some examples, to determine the motion compensation prediction precision associated with at least the portion of the current picture being decoded may include the graphics processing unit being configured to determine the motion compensation prediction precision based on a characteristic of the portion of the current picture. The characteristic may include a texture value of the portion of the current picture. When the texture value may be above a threshold, the motion compensation prediction precision may include the quarter pel precision. When the texture value may be less than or equal to the threshold, the motion compensation prediction precision may include the eighth pel precision.

In some examples, the graphics processing unit may be further configured to determine a second motion compensation prediction precision associated with the current picture, where the motion compensation prediction precision may be based at least in part on a reference type of the decoded reference picture, where the second motion compensation prediction precision may be based at least in part on a second reference type of a second decoded reference picture, where the reference type may include an immediately previous decoded picture reference type and the motion compensation prediction precision may include the eighth pel precision, where the second reference type may include a non-immediately previous decoded picture reference type and the second motion compensation prediction precision may include the quarter pel precision. To determine the predicted partition of predicted pixel data may include the graphics processing unit being configured to filter the portion of the decoded reference picture with the eighth pel precision to determine a first predicted partition, filter a second portion of the second decoded reference picture with the quarter pel precision to determine a second predicted partition, and combine the first predicted partition and the second predicted partition to generate the predicted partition.

In some examples, the motion compensation prediction precision may include the quarter pel precision. To filter the portion of the decoded reference picture may include the graphics processing unit being configured to determine a selected filter from a predefined codebook of a set of available filters.

In some examples, the motion compensation prediction precision may include the eighth pel precision. To filter the portion of the decoded reference picture may include the graphics processing unit being configured to determine a selected filter from a predefined codebook of a set of available filters, apply the selected filter to determine quarter pel locations of the eighth pel precision, and apply a fixed filter to determine remaining eighth pel locations of the eighth pel precision.

In some examples, the portion of the decoded reference picture may include a portion of a morphed reference picture generated based on a previously decoded reference picture and morphing parameters. The morphing parameters may include at least one of gain parameters, blur parameters, registration parameters, or dominant motion parameters.

In some examples, the portion of the decoded reference picture may include a portion of a synthesized reference picture generated based on a previously decoded reference picture and synthesizing parameters, where the synthesizing parameters comprise at least one super resolution parameters or projected interpolation parameters.

In some examples, the portion of the decoded reference picture may include a portion of a morphed reference picture generated based on a previously decoded reference picture and morphing parameters. To determine the motion compensation prediction precision associated with at least the portion of the current picture being decoded may include the graphics processing unit being configured to determine the motion compensation for the entire current picture based at least in part on a reference type of the morphed reference picture. The reference type may include at least one of gain, blur, registration, or dominant motion.

In some examples, the portion of the decoded reference picture may include a portion of a synthesized reference picture generated based on a previously decoded reference picture and synthesizing parameters. To determine the motion compensation prediction precision associated with at least the portion of the current picture being decoded may include the graphics processing unit being configured to determine the motion compensation for the entire current picture based at least in part on a reference type of the synthesized reference picture. The reference type may include at least one of super resolution or projected interpolation.

In some examples, the portion of the decoded reference picture may include a portion of a morphed reference picture generated based on a previously decoded reference picture and morphing parameters. The portion of the current picture may include the prediction partition. To determine the motion compensation prediction precision associated the prediction partition may include the graphics processing unit being configured to determine the motion compensation for the prediction partition based at least in part on a reference type of the morphed reference picture. The reference type may include at least one of gain, blur, registration, or dominant motion.

In some examples, the portion of the decoded reference picture may include a portion of a synthesized reference picture generated based on a previously decoded reference picture and synthesizing parameters. The portion of the current picture may include the prediction partition. To determine the motion compensation prediction precision associated the prediction partition may include the graphics processing unit being configured to determine the motion compensation for the prediction partition based at least in part on a reference type of the synthesized reference picture. The reference type may include at least one of super resolution or projected interpolation.

In some examples, the graphics processing unit may be further configured to partition the current picture into a plurality of prediction partitions including the prediction partition and a second prediction partition based on a partitioning technique including at least one of a bi-tree partitioning technique, a k-d tree partitioning technique, a codebook representation of a bi-tree partitioning technique, or a codebook representation of a k-d tree partitioning technique. The portion of the current picture may include the prediction partition. The motion compensation prediction precision indicators may include a first indicator indicating whether the motion compensation prediction precision for the prediction partition may include the quarter pel precision or the eighth pel precision. The prediction partitioning indicators may include indicators associated with the second prediction partition. The graphics processing unit may be further configured to determine a second motion compensation prediction precision associated with the second prediction partition. The second motion compensation prediction precision may include at least one of the quarter pel precision or the eighth pel precision. To determine the motion compensation prediction precision and the second motion compensation prediction precision may include the graphics processing unit being configured to determine the motion compensation prediction precision based on a size of the prediction partition and the second motion compensation prediction precision based on a second size of the second prediction partition. The motion compensation prediction precision may include the quarter pel precision and the prediction partition may include a small prediction partition. The small prediction partition may include a 4×4, 4×8, 8×4 or 8×8 pixel partition. The second motion compensation prediction precision may include the eighth pel precision and the second prediction partition may include a large prediction partition. The large prediction partition may include a partition having a size comprising at least one of greater than 4×4 pixels or greater than 8×8 pixels. The motion compensation prediction precision indicators may include a first indicator indicating the motion compensation prediction precision for the prediction partition which may include the quarter pel precision and a second indicator indicating the second motion compensation prediction precision for the second prediction partition which may include the eighth pel precision. The graphics processing unit may be further configured to determine a third motion compensation prediction precision associated with the current picture. The motion compensation prediction precision may be based at least in part on a reference type of the decoded reference picture. The third motion compensation prediction precision may be based at least in part on a second reference type of the second decoded reference picture. The reference type may include an immediately previous decoded picture reference type and the motion compensation prediction precision may include the eighth pel precision. The second reference type may include a non-immediately previous decoded picture reference type and the second motion compensation prediction precision may include the quarter pel precision. To determine the predicted pixel data may include the graphics processing unit being configured to filter the portion of the decoded reference picture with the eighth pel precision to determine a first predicted partition, filter a second portion of the second decoded reference picture with the quarter pel precision to determine a second predicted partition, and combine the first predicted partition and the second predicted partition to generate the predicted partition of predicted pixel data. To combine the first predicted partition and the second predicted partition may include the graphics processing unit being configured to implement a weighted average. The graphics processing unit may be further configured to determine a fourth motion compensation prediction precision associated with at least a portion of a second current picture being decoded. The fourth motion compensation prediction precision may include the quarter pel precision and the compensation prediction precision may include the eighth pel precision. To determine the motion compensation prediction precision associated with at least the portion of the current picture being decoded may include the graphics processing unit being configured to determine the motion compensation prediction precision for the entire current picture based on at least one of a picture type of the current picture or a location of the current picture in a picture hierarchy. To determine the motion compensation prediction precision associated with at least the portion of the current picture being decoded may include the graphics processing unit being configured to determine the motion compensation prediction precision based on a size of the prediction partition and a prediction partition size-based motion compensation prediction precision rule based at least in part on a picture type of the current picture or a location of the current picture in a picture hierarchy. To determine the motion compensation prediction precision associated with at least the portion of the current picture being decoded may include the graphics processing unit being configured to determine the motion compensation prediction precision based on a characteristic of the portion of the current picture. The characteristic may include a texture value of the portion of the current picture. When the texture value may be above a threshold, the motion compensation prediction precision may include the quarter pel precision. When the texture value may be less than or equal to the threshold, the motion compensation prediction precision may include the eighth pel precision. The motion compensation prediction precision may include the quarter pel precision. To filter the portion of the decoded reference picture may include the graphics processing unit being configured to determine a selected filter from a predefined codebook of a set of available filters. The motion compensation prediction precision may include the eighth pel precision. To filter the portion of the decoded reference picture may include the graphics processing unit being configured to determine the selected filter from the predefined codebook of the set of available filters, apply the selected filter to determine quarter pel locations of the eighth pel precision, and apply a fixed filter to determine remaining eighth pel locations of the eighth pel precision. The portion of the decoded reference picture may include a portion of a morphed reference picture generated based on a previously decoded reference picture and morphing parameters. The morphing parameters may include at least one of gain parameters, blur parameters, registration parameters, or dominant motion parameters. The portion of the decoded reference picture may include a portion of a synthesized reference picture generated based on a previously decoded reference picture and synthesizing parameters. The synthesizing parameters may include at least one super resolution parameters or projected interpolation parameters. The portion of the decoded reference picture may include the portion of the morphed reference picture generated based on a previously decoded reference picture and the morphing parameters. To determine the motion compensation prediction precision associated with at least the portion of the current picture being decoded may include the graphics processing unit being configured to determine the motion compensation for the entire current picture based at least in part on a reference type of the morphed reference picture. The reference type may include at least one of gain, blur, registration, or dominant motion. The reference type may include dominant motion and the motion compensation prediction precision may include the quarter pel precision. The portion of the decoded reference picture may include the portion of the synthesized reference picture generated based on the previously decoded reference picture and the synthesizing parameters. To determine the motion compensation prediction precision associated with at least the portion of the current picture being decoded may include the graphics processing unit being configured to determine the motion compensation for the entire current picture based at least in part on a reference type of the synthesized reference picture. The reference type may include at least one of super resolution or projected interpolation. The reference type may include projected interpolation and the motion compensation prediction precision may include the eighth pel precision. The portion of the decoded reference picture may include the portion of the morphed reference picture generated based on the previously decoded reference picture and the morphing parameters. The portion of the current picture may include the prediction partition. To determine the motion compensation prediction precision associated the prediction partition may include the graphics processing unit being configured to determine the motion compensation for the prediction partition based at least in part on the reference type of the morphed reference picture. The decoded reference picture may include the synthesized reference picture generated based on the previously decoded reference picture and the synthesizing parameters. The portion of the current picture may include the prediction partition. To determine the motion compensation prediction precision associated the prediction partition may include the graphics processing unit being configured to determine the motion compensation for the prediction partition based at least in part on the reference type of the synthesized reference picture. The portion of the current picture may include at least one of the prediction partition, a tile, a super-fragment, a coding unit, a slice, a region, or the entire current picture. The graphics processing unit may be further configured to code, via the entropy encoder, the picture type of the current picture, the location of the current picture in the picture hierarchy, the morphing parameters, the synthesizing parameters, a selected filter indicator indicating the selected filter, and a prediction error data partition associated with the prediction partition. The graphics processing unit may be further configured to transmit the bitstream.

In yet another example, a decoder system may include a video decoder configured to decode an encoded bitstream. The video decoder may be configured to decode the encoded bitstream to determine prediction partitioning indicators, a plurality of motion vectors, and a plurality of prediction error data partitions. The video decoder may be further configured to determine a prediction partition of the current picture based on the prediction partitioning indicators. The video decoder may be further configured to determine a motion compensation prediction precision associated with at least a portion of a current picture being decoded. The motion compensation prediction precision may include at least one of a quarter pel precision or an eighth pel precision. The video decoder may be further configured to generate predicted pixel data of a predicted partition associated with the prediction partition of the current picture by the video decoder being configured to filter a portion of a decoded reference picture based at least in part on a motion vector of the plurality of motion vectors and the motion compensation prediction precision. The video decoder may be further configured to add the predicted pixel data of the decoded predicted partition to a prediction error data partition of the plurality of prediction error data partitions to generate a first reconstructed partition. The video decoder may be further configured to add the first reconstructed partition and a second reconstructed partition to generate a reconstructed tile or super-fragment. The video decoder may be further configured to apply a deblock filter to the reconstructed tile or super-fragment to generate a first final reconstructed tile or super-fragment. The video decoder may be further configured to assemble the first final reconstructed tile or super-fragment and a second final reconstructed tile or super-fragment to generate a final reconstructed video frame. The video decoder may be further configured to transmit the final reconstructed video frame for presentment.

In some examples, the decoder system may further include an antenna communicatively coupled to the video decoder and configured to receive the encoded bitstream of video data and a display device configured to present video frames.

In some examples, the video decoder may be further configured to decode the bitstream to determine motion compensation prediction precision indicators including a first indicator indicating whether the motion compensation prediction precision for the prediction partition may include the quarter pel precision or the eighth pel precision. To determine the motion compensation prediction precision may include the video coder being configured to determine the motion compensation prediction precision based on the first indicator.

In some examples, the video decoder may be further configured to determine a second prediction partition of the current picture based on the prediction partitioning indicators and determine a second motion compensation prediction precision associated with the second prediction partition. The second motion compensation prediction precision may include at least one of a quarter pel precision or an eighth pel precision. To determine the motion compensation prediction precision and the second motion compensation prediction precision may include the video coder being configured to determine the motion compensation prediction precision based on a size of the prediction partition and the second motion compensation prediction precision based on a second size of the second prediction partition.

In some examples, the video decoder may be further configured to decode the bitstream to determine a plurality of picture types. To determine the motion compensation prediction precision associated with at least the portion of the current picture being decoded may include the video coder being configured to determine the motion compensation for the entire current picture based on a picture type of the current picture from the plurality of picture types.

In some examples, the video decoder may be further configured to decode the bitstream to determine a plurality of picture types. To determine the motion compensation prediction precision associated with at least the portion of the current picture being decoded may include the video coder being configured to determine the motion compensation based on a size of the prediction partition and a prediction partition size-based motion compensation prediction precision rule based at least in part on a picture type of the current picture from the plurality of picture types.

In some examples, the video decoder may be further configured to decode the bitstream to determine a plurality of reference types of pictures and determine a second motion compensation prediction precision associated with the current picture. The motion compensation prediction precision may be based at least in part on a reference type of the decoded reference picture and where the second motion compensation prediction precision may be based at least in part on a second reference type of a second decoded reference picture. The reference type may include an immediately previous decoded picture reference type and the motion compensation prediction precision may include the eighth pel precision. The second reference type may include a non-immediately previous decoded picture reference type and the second motion compensation prediction precision may include the quarter pel precision. To determine the predicted partition of predicted pixel data may include the video coder being configured to filter the portion of the decoded reference picture with the eighth pel precision to determine a first predicted partition, filter a second portion of the second decoded reference picture with the quarter pel precision to determine a second predicted partition, and combine the first predicted partition and the second predicted partition to generate the predicted partition.

In some examples, the video decoder may be further configured to decode the bitstream to determine a plurality of selected filter indicators. The motion compensation prediction precision may include the eighth pel precision. To filter the portion of the decoded reference picture may include the video coder being configured to determine a selected filter from a predefined codebook of a set of available filters based on an individual selected filter indicator of the plurality of selected filter indicators, apply the selected filter to determine quarter pel locations of the eighth pel precision, and apply a fixed filter to determine remaining eighth pel locations of the eighth pel precision.

In some examples, the video decoder may be further configured to decode the bitstream to determine morphing parameters or synthesizing parameters. The portion of the decoded reference picture may include a portion of a morphed reference picture or a synthesized reference picture generated based on a previously decoded reference picture and the morphing parameters or the synthesizing parameters.

In some examples, the decoder system may further include an antenna communicatively coupled to the video decoder and configured to receive the encoded bitstream of video data and a display device configured to present video frames. The video decoder may be further configured to receive the bitstream. The video decoder may be further configured to decode the bitstream to determine motion compensation prediction precision indicators, a plurality of picture types, a plurality of locations of pictures in a picture hierarchy, morphing parameters, synthesizing parameters, a plurality of reference types of pictures, and a plurality of selected filter indicators. The video decoder may be further configured to determine a second prediction partition of the current picture based on the prediction partitioning indicators. The video decoder may be further configured to determine a second motion compensation prediction precision associated with the second prediction partition. The second motion compensation prediction precision may include at least one of a quarter pel precision or an eighth pel precision. The video decoder may be further configured to determine a third motion compensation prediction precision associated with the current picture. The motion compensation prediction precision may be based at least in part on a reference type of the decoded reference picture. The third motion compensation prediction precision may be based at least in part on a second reference type of a second decoded reference picture. The reference type may include an immediately previous decoded picture reference type and the motion compensation prediction precision may include the eighth pel precision. The second reference type may include a non-immediately previous decoded picture reference type and the third motion compensation prediction precision may include the quarter pel precision. To determine the predicted partition of predicted pixel data may include the video coder being configured to filter the portion of the decoded reference picture with the eighth pel precision to determine a first predicted partition, filter a second portion of the second decoded reference picture with the quarter pel precision to determine a second predicted partition, and combine the first predicted partition and the second predicted partition to generate the predicted partition. To combine the first predicted partition and the second predicted partition may include the video coder being configured to implement a weighted average. The motion compensation prediction precision indicators may include a first indicator indicating whether the motion compensation prediction precision for the prediction partition which may include the quarter pel precision or the eighth pel precision. To determine the motion compensation prediction precision may include the video coder being configured to determine the motion compensation prediction precision based on the first indicator. To determine the motion compensation prediction precision and the second motion compensation prediction precision may include the video coder being configured to determine the motion compensation prediction precision based on a size of the prediction partition and the second motion compensation prediction precision based on a second size of the second prediction partition. The motion compensation prediction precision may include the quarter pel precision and the prediction partition may include a small prediction partition. The small prediction partition may include a 4×4, 4×8, 8×4 or 8×8 pixel partition. The second motion compensation prediction precision may include the eighth pel precision and the second prediction partition may include a large prediction partition. The large prediction partition may include a partition having a size comprising at least one of greater than 4×4 pixels or greater than 8×8 pixels. The motion compensation prediction precision indicators may include a first indicator indicating the motion compensation prediction precision for the prediction partition which may include the quarter pel precision and a second indicator indicating the second motion compensation prediction precision for the second prediction partition which may include the eighth pel precision. To determine the motion compensation prediction precision associated with at least the portion of the current picture being decoded may include the video coder being configured to determine the motion compensation for the entire current picture based on a picture type of the current picture from the plurality of picture types. To determine the motion compensation prediction precision associated with at least the portion of the current picture being decoded may include the video coder being configured to determine the motion compensation prediction precision based on a size of the prediction partition and a prediction partition size-based motion compensation prediction precision rule based at least in part on the picture type of the current picture from the plurality of picture types or a location of the current picture in the picture hierarchy from the plurality of locations of pictures in the picture hierarchy. To determine the motion compensation prediction precision associated with at least the portion of the current picture being decoded may include the video coder being configured to determine the motion compensation prediction precision based on a characteristic of the portion of the current picture. The characteristic may include a texture value of the portion of the current picture. When the texture value may be above a threshold, the motion compensation prediction precision may include the quarter pel precision. When the texture value may be less than or equal to the threshold, the motion compensation prediction precision may include the eighth pel precision. The motion compensation prediction precision may include the quarter pel precision. To filter the portion of the decoded reference picture may include the video coder being configured to determine a selected filter from a predefined codebook of a set of available filters based on an individual selected filter indicator of the plurality of selected filter indicators. The motion compensation prediction precision may include the eighth pel precision. To filter the portion of the decoded reference picture may include the video coder being configured to determine a selected filter from a predefined codebook of a set of available filters based on an individual selected filter indicator of the plurality of selected filter indicators, apply the selected filter to determine quarter pel locations of the eighth pel precision, and apply a fixed filter to determine remaining eighth pel locations of the eighth pel precision. The portion of the decoded reference picture may include a portion of a morphed reference picture generated based on a previously decoded reference picture and the morphing parameters. The morphing parameters may include at least one of gain parameters, blur parameters, registration parameters, or dominant motion parameters. Determining the motion compensation prediction precision associated with at least the portion of the current picture being decoded may include determining the motion compensation for the entire current picture based at least in part on a reference type of the morphed reference picture. The reference type may include at least one of gain, blur, registration, or dominant motion. The portion of the decoded reference picture may include a portion of a synthesized reference picture generated based on a previously decoded reference picture and the synthesizing parameters. The synthesizing parameters may include at least one super resolution parameters or projected interpolation parameters. Determining the motion compensation prediction precision associated with at least the portion of the current picture being decoded may include determining the motion compensation for the entire current picture based at least in part on a reference type of the synthesized reference picture. The reference type may include at least one of super resolution or projected interpolation.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:
   determining, via a motion compensated filtering predictor module, a motion compensation prediction precision associated with at least a portion of a current picture being decoded, wherein the motion compensation prediction precision comprises at least one of a quarter pel precision or an eighth pel precision;

determining, via the motion compensated filtering predictor module, a second motion compensation prediction precision associated with the current picture, wherein the motion compensation prediction precision is based at least in part on a reference type of the decoded reference picture, wherein the second motion compensation prediction precision is based at least in part on a second reference type of a second decoded reference picture, wherein the reference type comprises an immediately previous decoded picture reference type and the motion compensation prediction precision comprises the eighth pel precision, wherein the second reference type comprises a non-immediately previous decoded picture reference type and the second motion compensation prediction precision comprises the quarter pel precision, and wherein determining the predicted partition of predicted pixel data comprises filtering the portion of the decoded reference picture with the eighth pel precision to determine a first predicted partition, filtering a second portion of the second decoded reference picture with the quarter pel precision to determine a second predicted partition, and combining the first predicted partition and the second predicted partition to generate the predicted partition, wherein combining the first predicted partition and the second predicted partition comprises a weighted average;

generating, via the motion compensated filtering predictor module, predicted pixel data of a predicted partition associated with a prediction partition of the current picture by filtering a portion of a decoded reference picture based at least in part on the motion compensation prediction precision; and coding, via an entropy encoder, prediction partitioning indicators associated with the prediction partition and a motion vector indicating a positional difference between the prediction partition and an associated partition of the decoded reference picture into a bitstream.

2. The method of claim 1, further comprising:

partitioning, via a prediction partitions generator module, the current picture into a plurality of prediction partitions comprising the prediction partition based on a partitioning technique comprising at least one of a bi-tree partitioning technique, a k-d tree partitioning technique, a codebook representation of a bi-tree partitioning technique, or a codebook representation of a k-d tree partitioning technique, wherein the portion of the current picture comprises the prediction partition; and coding, via the entropy encoder, motion compensation prediction precision indicators comprising a first indicator indicating whether the motion compensation prediction precision for the prediction partition comprises the quarter pel precision or the eighth pel precision into the bitstream.

3. The method of claim 1, further comprising:

partitioning, via a prediction partitions generator module, the current picture into a plurality of prediction partitions comprising the prediction partition and a second prediction partition, wherein the portion of the current picture comprises the prediction partition; and determining, via the motion compensated filtering predictor module, a third motion compensation prediction precision associated with the second prediction partition, wherein the third motion compensation prediction precision comprises at least one of the quarter pel precision or the eighth pel precision, wherein determining the motion compensation prediction precision and the third motion compensation prediction precision comprises determining the motion compensation prediction precision based on a size of the prediction partition and the third motion compensation prediction precision based on a second size of the second prediction partition.

4. The method of claim 1, wherein determining the motion compensation prediction precision associated with at least the portion of the current picture being decoded comprises determining the motion compensation for the entire current picture based on at least one of a picture type of the current picture or a location of the current picture in a picture hierarchy.

5. The method of claim 1, wherein determining the motion compensation prediction precision associated with at least the portion of the current picture being decoded comprises determining the motion compensation prediction precision based on a size of the prediction partition and a prediction partition size-based motion compensation prediction precision rule based at least in part on a picture type of the current picture or a location of the current picture in a picture hierarchy.

6. The method of claim 1, wherein determining the motion compensation prediction precision associated with at least the portion of the current picture being decoded comprises determining the motion compensation prediction precision based on a characteristic of the portion of the current picture, wherein the characteristic comprises a texture value of the portion of the current picture, and wherein, when the texture value is above a threshold, the motion compensation prediction precision comprises the quarter pel precision and, when the texture value is less than or equal to the threshold, the motion compensation prediction precision comprises the eighth pel precision.

7. The method of claim 1, wherein the motion compensation prediction precision comprises the quarter pel precision and wherein filtering the portion of the decoded reference picture comprises determining a selected filter from a predefined codebook of a set of available filters.

8. The method of claim 1, wherein the motion compensation prediction precision comprises the eighth pel precision and wherein filtering the portion of the decoded reference picture comprises determining a selected filter from a predefined codebook of a set of available filters, applying the selected filter to determine quarter pel locations of the eighth pel precision, and applying a fixed filter to determine remaining eighth pel locations of the eighth pel precision.

9. The method of claim 1, wherein the portion of the decoded reference picture comprises a portion of a morphed reference picture generated based on a previously decoded reference picture and morphing parameters, wherein the morphing parameters comprise at least one of gain parameters, blur parameters, registration parameters, or dominant motion parameters.

10. The method of claim 1, wherein the portion of the decoded reference picture comprises a portion of a synthesized reference picture generated based on a previously decoded reference picture and synthesizing parameters, wherein the synthesizing parameters comprise at least one super resolution parameters or projected interpolation parameters.

11. The method of claim 1, wherein the portion of the decoded reference picture comprises a portion of a morphed reference picture generated based on a previously decoded reference picture and morphing parameters, and wherein determining the motion compensation prediction precision associated with at least the portion of the current picture being decoded comprises determining the motion compensation for the entire current picture based at least in part on a reference type of the morphed reference picture, wherein the reference type comprises at least one of gain, blur, registration, or dominant motion.

12. The method of claim 1, wherein the portion of the decoded reference picture comprises a portion of a synthesized reference picture generated based on a previously decoded reference picture and synthesizing parameters, and wherein determining the motion compensation prediction precision associated with at least the portion of the current picture being decoded comprises determining the motion compensation for the entire current picture based at least in part on a reference type of the synthesized reference picture, wherein the reference type comprises at least one of super resolution or projected interpolation.

13. The method of claim 1, wherein the portion of the decoded reference picture comprises a portion of a morphed reference picture generated based on a previously decoded reference picture and morphing parameters, wherein the portion of the current picture comprises the prediction partition, and wherein determining the motion compensation prediction precision associated the prediction partition comprises determining the motion compensation for the prediction partition based at least in part on a reference type of the morphed reference picture, wherein the reference type comprises at least one of gain, blur, registration, or dominant motion.

14. The method of claim 1, wherein the portion of the decoded reference picture comprises a portion of a synthesized reference picture generated based on a previously decoded reference picture and synthesizing parameters, wherein the portion of the current picture comprises the prediction partition, and wherein determining the motion compensation prediction precision associated the prediction partition comprises determining the motion compensation for the prediction partition based at least in part on a reference type of the synthesized reference picture, wherein the reference type comprises at least one of super resolution or projected interpolation.

15. The method of claim 1, further comprising:
partitioning, via a prediction partitions generator module, the current picture into a plurality of prediction partitions comprising the prediction partition and a second prediction partition based on a partitioning technique comprising at least one of a bi-tree partitioning technique, a k-d tree partitioning technique, a codebook representation of a bi-tree partitioning technique, or a codebook representation of a k-d tree partitioning technique, wherein the portion of the current picture comprises the prediction partition;
determining, via the motion compensated filtering predictor module, a third motion compensation prediction precision associated with the second prediction partition, wherein the third motion compensation prediction precision comprises at least one of the quarter pel precision or the eighth pel precision, wherein determining the motion compensation prediction precision and the third motion compensation prediction precision comprises determining the motion compensation prediction precision based on a size of the prediction partition and the third motion compensation prediction precision based on a second size of the second prediction partition, wherein the motion compensation prediction precision comprises the quarter pel precision and the prediction partition comprises a small prediction partition, wherein the small prediction partition comprises a 4×4, 4×8, 8×4 or 8×8 pixel partition, wherein the third motion compensation prediction precision comprises the eighth pel precision and the second prediction partition comprises a large prediction partition, wherein the large prediction partition comprises a partition having a size comprising at least one of greater than 4×4 pixels or greater than 8×8 pixels, and wherein the motion compensation prediction precision indicators comprise a first indicator indicating the motion compensation prediction precision for the prediction partition comprises the quarter pel precision and a second indicator indicating the third motion compensation prediction precision for the second prediction partition comprises the eighth pel precision;
wherein determining the motion compensation prediction precision associated with at least the portion of the current picture being decoded comprises determining the motion compensation prediction precision for the entire current picture based on at least one of a picture type of the current picture or a location of the current picture in a picture hierarchy,
wherein determining the motion compensation prediction precision associated with at least the portion of the current picture being decoded comprises determining the motion compensation prediction precision based on a size of the prediction partition and a prediction partition size-based motion compensation prediction precision rule based at least in part on a picture type of the current picture or a location of the current picture in a picture hierarchy,
wherein determining the motion compensation prediction precision associated with at least the portion of the current picture being decoded comprises determining the motion compensation prediction precision based on a characteristic of the portion of the current picture, wherein the characteristic comprises a texture value of the portion of the current picture, and wherein, when the texture value is above a threshold, the motion compensation prediction precision comprises the quarter pel precision and, when the texture value is less than or equal to the threshold, the motion compensation prediction precision comprises the eighth pel precision,
wherein the motion compensation prediction precision comprises the quarter pel precision and wherein filtering the portion of the decoded reference picture comprises determining a selected filter from a predefined codebook of a set of available filters,
wherein the motion compensation prediction precision comprises the eighth pel precision and wherein filtering the portion of the decoded reference picture comprises determining the selected filter from the predefined codebook of the set of available filters, applying the selected filter to determine quarter pel locations of the eighth pel precision, and applying a fixed filter to determine remaining eighth pel locations of the eighth pel precision,
wherein the portion of the decoded reference picture comprises a portion of a morphed reference picture generated based on a previously decoded reference picture and morphing parameters, wherein the morphing parameters comprise at least one of gain parameters, blur parameters, registration parameters, or dominant motion parameters, wherein the portion of the decoded reference picture comprises a portion of a synthesized reference picture generated based on a previously decoded reference picture and synthesizing parameters, wherein the synthesizing parameters comprise at least one super resolution parameters or projected interpolation parameters, wherein the portion of the decoded reference picture comprises the portion of the morphed reference picture generated based on a previously decoded reference picture and the morphing parameters, wherein determining the motion compensation prediction precision associated with at least the portion of the current picture being decoded comprises determining the motion compensation for the entire current picture based at least in part on a reference type of the morphed reference picture, wherein the reference type comprises at least one of gain, blur, registration, or dominant motion, and wherein the reference type comprises dominant motion and the motion compensation prediction precision comprises the quarter pel precision, wherein the portion of the decoded reference picture comprises the portion of the synthesized reference picture generated based on the previously decoded reference picture and the synthesizing parameters, wherein determining the motion compensation prediction precision associated with at least the portion of the current picture being decoded comprises determining the motion compensation for the entire current picture based at least in part on a reference type of the synthesized reference picture, wherein the reference type comprises at least one of super resolution or projected interpolation, and wherein the reference type comprises projected interpolation and the motion compensation prediction precision comprises the eighth pel precision, wherein the portion of the decoded reference picture comprises the portion of the morphed reference picture generated based on the previously decoded reference picture and the morphing parameters, wherein the portion of the current picture comprises the prediction partition, and wherein determining the motion compensation prediction precision associated the prediction partition comprises determining the motion compensation for the prediction partition based at least in part on the reference type of the morphed reference picture, wherein the decoded reference picture comprises the synthesized reference picture generated based on the previously decoded reference picture and the synthesizing parameters, wherein the portion of the current picture comprises the prediction partition, and wherein determining the motion compensation prediction precision associated the prediction partition comprises determining the motion compensation for the prediction partition based at least in part on the reference type of the synthesized reference picture, wherein the portion of the current picture comprises at least one of a tile, a super-fragment, a coding unit, a slice, or a region;

coding, via the entropy encoder, motion compensation prediction precision indicators comprising a first indicator indicating whether the motion compensation prediction precision for the prediction partition comprises the quarter pel precision or the eighth pel precision and a second indicator indicating whether the second motion compensation prediction precision for the second prediction partition comprises the quarter pel precision or the eighth pel precision, the picture type of the current picture, the location of the current picture in the picture hierarchy, the morphing parameters, the synthesizing parameters, a selected filter indicator indicating the selected filter, and a prediction error data partition associated with the prediction partition;

transmitting the bitstream;

receiving the bitstream;

decoding, via an adaptive entropy decoder, the bitstream to determine the prediction partitioning indicators, the motion vector, the motion compensation prediction precision indicators, the picture type of the current picture, the location of the current picture in the picture hierarchy, the morphing parameters, the synthesizing parameters, the selected filter indicator indicating the selected filter, and the prediction error data partition;

determining, via a motion compensated filtering predictor decoder module, a decoder motion compensation prediction precision associated with at least the portion of a current decoder picture being decoded, based on the motion compensation prediction precision indicators, wherein the motion compensation prediction precision comprises at least one of a quarter pel precision or an eighth pel precision;

determining, via the motion compensated filtering predictor module, decoded predicted pixel data of a decoded predicted partition for a decoded prediction partition of the current picture based at least in part on filtering a portion of a decoder decoded reference picture and the decoder motion compensation prediction precision;

adding, via an adder, the decoded predicted pixel data of the decoded predicted partition to the prediction error data partition to generate a first reconstructed partition;

adding, via a prediction partitions assembler module, the first reconstructed partition and a second reconstructed partition to generate a reconstructed tile or super-fragment;

applying, via a deblock filtering module, a deblock filter to the reconstructed tile or super-fragment to generate a first final reconstructed tile or super-fragment;

assembling, via the deblock filtering module the first final reconstructed tile or super-fragment and a second final reconstructed tile or super-fragment to generate a final reconstructed video frame; and transmitting the final reconstructed video frame for presentment via a display device.

16. A video encoder comprising:

an image buffer;

a graphics processing unit communicatively coupled to the image buffer and configured to:
  determine a motion compensation prediction precision associated with at least a portion of a current picture being decoded, wherein the motion compensation prediction precision comprises at least one of a quarter pel precision or an eighth pel precision;
  determine a second motion compensation prediction precision associated with the current picture, wherein the motion compensation prediction precision is based at least in part on a reference type of the decoded reference picture, wherein the second motion compensation prediction precision is based at least in part on a second reference type of a second decoded reference picture, wherein the reference type comprises an immediately previous decoded picture reference type and the motion compensation prediction precision comprises the eighth pel precision, wherein the second reference type comprises a non-immediately previous decoded picture reference type and the second motion compensation prediction precision comprises the quarter pel precision, and wherein determining the predicted partition of predicted pixel data comprises filtering the portion of the decoded reference picture with the eighth pel precision to determine a first predicted partition, filtering a second portion of the second decoded reference picture with the quarter pel precision to determine a second predicted partition, and combining the first predicted partition and the second predicted partition to generate the predicted partition, wherein combining the first predicted partition and the second predicted partition comprises a weighted average;
- generate predicted pixel data of a predicted partition associated with a prediction partition of the current picture by the graphics processing unit being configured to filter a portion of a decoded reference picture based at least in part on the motion compensation prediction precision; and
- code, via an entropy encoder, prediction partitioning indicators associated with the prediction partition and a motion vector indicating a positional difference between the prediction partition and an associated partition of the decoded reference picture into a bitstream.

17. The video encoder of claim 16, wherein the graphics processing unit is further configured to:
- partition the current picture into a plurality of prediction partitions comprising the prediction partition and a second prediction partition based on a partitioning technique comprising at least one of a bi-tree partitioning technique, a k-d tree partitioning technique, a codebook representation of a bi-tree partitioning technique, or a codebook representation of a k-d tree partitioning technique, wherein the portion of the current picture comprises the prediction partition, and wherein the motion compensation prediction precision indicators comprise a first indicator indicating whether the motion compensation prediction precision for the prediction partition comprises the quarter pel precision or the eighth pel precision, and wherein the prediction partitioning indicators comprise indicators associated with the second prediction partition;
- determine a third motion compensation prediction precision associated with the second prediction partition, wherein the second motion compensation prediction precision comprises at least one of the quarter pel precision or the eighth pel precision, wherein to determine the motion compensation prediction precision and the third motion compensation prediction precision comprises the graphics processing unit being configured to determine the motion compensation prediction precision based on a size of the prediction partition and the third motion compensation prediction precision based on a second size of the second prediction partition, wherein the motion compensation prediction precision comprises the quarter pel precision and the prediction partition comprises a small prediction partition, wherein the small prediction partition comprises a 4×4, 4×8, 8×4 or 8×8 pixel partition, wherein the third motion compensation prediction precision comprises the eighth pel precision and the second prediction partition comprises a large prediction partition, wherein the large prediction partition comprises a partition having a size comprising at least one of greater than 4×4 pixels or greater than 8×8 pixels, and wherein the motion compensation prediction precision indicators comprise a first indicator indicating the motion compensation prediction precision for the prediction partition comprises the quarter pel precision and a second indicator indicating the third motion compensation prediction precision for the second prediction partition comprises the eighth pel precision;
- wherein to determine the motion compensation prediction precision associated with at least the portion of the current picture being decoded comprises the graphics processing unit being configured to determine the motion compensation prediction precision for the entire current picture based on at least one of a picture type of the current picture or a location of the current picture in a picture hierarchy,
- wherein to determine the motion compensation prediction precision associated with at least the portion of the current picture being decoded comprises the graphics processing unit being configured to determine the motion compensation prediction precision based on a size of the prediction partition and a prediction partition size-based motion compensation prediction precision rule based at least in part on a picture type of the current picture or a location of the current picture in a picture hierarchy,
- wherein to determine the motion compensation prediction precision associated with at least the portion of the current picture being decoded comprises the graphics processing unit being configured to determine the motion compensation prediction precision based on a characteristic of the portion of the current picture, wherein the characteristic comprises a texture value of the portion of the current picture, and wherein, when the texture value is above a threshold, the motion compensation prediction precision comprises the quarter pel precision and, when the texture value is less than or equal to the threshold, the motion compensation prediction precision comprises the eighth pel precision,
- wherein the motion compensation prediction precision comprises the quarter pel precision and wherein to filter the portion of the decoded reference picture comprises the graphics processing unit being configured to determine a selected filter from a predefined codebook of a set of available filters,
- wherein the motion compensation prediction precision comprises the eighth pel precision and wherein to filter the portion of the decoded reference picture comprises the graphics processing unit being configured to determine the selected filter from the predefined codebook of the set of available filters, apply the selected filter to determine quarter pel locations of the eighth pel precision, and apply a fixed filter to determine remaining eighth pel locations of the eighth pel precision,
- wherein the portion of the decoded reference picture comprises a portion of a morphed reference picture generated based on a previously decoded reference picture and morphing parameters, wherein the morphing parameters comprise at least one of gain parameters, blur parameters, registration parameters, or dominant motion parameters,
- wherein the portion of the decoded reference picture comprises a portion of a synthesized reference picture generated based on a previously decoded reference picture and synthesizing parameters, wherein the synthesizing parameters comprise at least one super resolution parameters or projected interpolation parameters, wherein the portion of the decoded reference picture comprises the portion of the morphed reference picture generated based on a previously decoded reference picture and the morphing parameters, wherein to determine the motion compensation prediction precision associated with at least the portion of the current picture being decoded comprises the graphics processing unit being configured to determine the motion compensation for the entire current picture based at least in part on a reference type of the morphed reference picture, wherein the reference type comprises at least one of gain, blur, registration, or dominant motion, and wherein the reference type comprises dominant motion and the motion compensation prediction precision comprises the quarter pel precision, wherein the portion of the decoded reference picture comprises the portion of the synthesized reference picture generated based on the previously decoded reference picture and the synthesizing parameters, wherein to determine the motion compensation prediction precision associated with at least the portion of the current picture being decoded comprises the graphics processing unit being configured to determine the motion compensation for the entire current picture based at least in part on a reference type of the synthesized reference picture, wherein the reference type comprises at least one of super resolution or projected interpolation, and wherein the reference type comprises projected interpolation and the motion compensation prediction precision comprises the eighth pel precision, wherein the portion of the decoded reference picture comprises the portion of the morphed reference picture generated based on the previously decoded reference picture and the morphing parameters, wherein the portion of the current picture comprises the prediction partition, and wherein to determine the motion compensation prediction precision associated the prediction partition comprises the graphics processing unit being configured to determine the motion compensation for the prediction partition based at least in part on the reference type of the morphed reference picture, wherein the decoded reference picture comprises the synthesized reference picture generated based on the previously decoded reference picture and the synthesizing parameters, wherein the portion of the current picture comprises the prediction partition, and wherein to determine the motion compensation prediction precision associated the prediction partition comprises the graphics processing unit being configured to determine the motion compensation for the prediction partition based at least in part on the reference type of the synthesized reference picture, and wherein the portion of the current picture comprises at least one of a tile, a super-fragment, a coding unit, a slice, or a region;

code, via the entropy encoder, the picture type of the current picture, the location of the current picture in the picture hierarchy, the morphing parameters, the synthesizing parameters, a selected filter indicator indicating the selected filter, and a prediction error data partition associated with the prediction partition; and transmit the bitstream.

18. A decoder system comprising:

a video decoder configured to decode an encoded bitstream, wherein the video decoder is configured to:

decode the encoded bitstream to determine prediction partitioning indicators, a plurality of motion vectors, and a plurality of prediction error data partitions;

determine a prediction partition of the current picture based on the prediction partitioning indicators;

determine a motion compensation prediction precision associated with at least a portion of a current picture being decoded, wherein the motion compensation prediction precision comprises at least one of a quarter pel precision or an eighth pel precision;

determine a second motion compensation prediction precision associated with the current picture, wherein the motion compensation prediction precision is based at least in part on a reference type of the decoded reference picture, wherein the second motion compensation prediction precision is based at least in part on a second reference type of a second decoded reference picture, wherein the reference type comprises an immediately previous decoded picture reference type and the motion compensation prediction precision comprises the eighth pel precision, wherein the second reference type comprises a non-immediately previous decoded picture reference type and the second motion compensation prediction precision comprises the quarter pel precision, and wherein determining the predicted partition of predicted pixel data comprises filtering the portion of the decoded reference picture with the eighth pel precision to determine a first predicted partition, filtering a second portion of the second decoded reference picture with the quarter pel precision to determine a second predicted partition, and combining the first predicted partition and the second predicted partition to generate the predicted partition, wherein combining the first predicted partition and the second predicted partition comprises a weighted average;

generate predicted pixel data of a predicted partition associated with the prediction partition of the current picture by the video decoder being configured to filter a portion of a decoded reference picture based at least in part on a motion vector of the plurality of motion vectors and the motion compensation prediction precision;

add the predicted pixel data of the decoded predicted partition to a prediction error data partition of the plurality of prediction error data partitions to generate a first reconstructed partition;

add the first reconstructed partition and a second reconstructed partition to generate a reconstructed tile or super-fragment;

apply a deblock filter to the reconstructed tile or super-fragment to generate a first final reconstructed tile or super-fragment;

assemble the first final reconstructed tile or super-fragment and a second final reconstructed tile or super-fragment to generate a final reconstructed video frame; and transmit the final reconstructed video frame for presentment.

19. The decoder system of claim 18, further comprising:

an antenna communicatively coupled to the video decoder and configured to receive the encoded bitstream of video data; and a display device configured to present video frames, wherein the video decoder is further configured to:

receive the bitstream;

decode the bitstream to determine motion compensation prediction precision indicators, a plurality of picture types, a plurality of locations of pictures in a picture hierarchy, morphing parameters, synthesizing parameters, a plurality of reference types of pictures, and a plurality of selected filter indicators;

determine a second prediction partition of the current picture based on the prediction partitioning indicators;

wherein the motion compensation prediction precision indicators comprise a first indicator indicating whether the motion compensation prediction precision for the prediction partition comprises the quarter pel precision or the eighth pel precision and wherein to determine the motion compensation prediction precision comprises the video coder being configured to determine the motion compensation prediction precision based on the first indicator, wherein to determine the motion compensation prediction precision and the second motion compensation prediction precision comprises the video coder being configured to determine the motion compensation prediction precision based on a size of the prediction partition and the second motion compensation prediction precision based on a second size of the second prediction partition, wherein the motion compensation prediction precision comprises the quarter pel precision and the prediction partition comprises a small prediction partition, wherein the small prediction partition comprises a 4×4, 4×8, 8×4 or 8×8 pixel partition, wherein the second motion compensation prediction precision comprises the eighth pel precision and the second prediction partition comprises a large prediction partition, wherein the large prediction partition comprises a partition having a size comprising at least one of greater than 4×4 pixels or greater than 8×8 pixels, and wherein the motion compensation prediction precision indicators comprise a first indicator indicating the motion compensation prediction precision for the prediction partition comprises the quarter pel precision and a second indicator indicating the second motion compensation prediction precision for the second prediction partition comprises the eighth pel precision, wherein to determine the motion compensation prediction precision associated with at least the portion of the current picture being decoded comprises the video coder being configured to determine the motion compensation for the entire current picture based on a picture type of the current picture from the plurality of picture types, wherein to determine the motion compensation prediction precision associated with at least the portion of the current picture being decoded comprises the video coder being configured to determine the motion compensation prediction precision based on a size of the prediction partition and a prediction partition size-based motion compensation prediction precision rule based at least in part on the picture type of the current picture from the plurality of picture types or a location of the current picture in the picture hierarchy from the plurality of locations of pictures in the picture hierarchy, wherein to determine the motion compensation prediction precision associated with at least the portion of the current picture being decoded comprises the video coder being configured to determine the motion compensation prediction precision based on a characteristic of the portion of the current picture, wherein the characteristic comprises a texture value of the portion of the current picture, and wherein, when the texture value is above a threshold, the motion compensation prediction precision comprises the quarter pel precision and, when the texture value is less than or equal to the threshold, the motion compensation prediction precision comprises the eighth pel precision, wherein the motion compensation prediction precision comprises the quarter pel precision and wherein to filter the portion of the decoded reference picture comprises the video coder being configured to determine a selected filter from a predefined codebook of a set of available filters based on an individual selected filter indicator of the plurality of selected filter indicators, wherein the motion compensation prediction precision comprises the eighth pel precision and wherein to filter the portion of the decoded reference picture comprises the video coder being configured to determine a selected filter from a predefined codebook of a set of available filters based on an individual selected filter indicator of the plurality of selected filter indicators, apply the selected filter to determine quarter pel locations of the eighth pel precision, and apply a fixed filter to determine remaining eighth pel locations of the eighth pel precision, wherein the portion of the decoded reference picture comprises a portion of a morphed reference picture generated based on a previously decoded reference picture and the morphing parameters, wherein the morphing parameters comprise at least one of gain parameters, blur parameters, registration parameters, or dominant motion parameters, and wherein determining the motion compensation prediction precision associated with at least the portion of the current picture being decoded comprises determining the motion compensation for the entire current picture based at least in part on a reference type of the morphed reference picture, wherein the reference type comprises at least one of gain, blur, registration, or dominant motion, and wherein the portion of the decoded reference picture comprises a portion of a synthesized reference picture generated based on a previously decoded reference picture and the synthesizing parameters, wherein the synthesizing parameters comprise at least one super resolution parameters or projected interpolation parameters, and wherein determining the motion compensation prediction precision associated with at least the portion of the current picture being decoded comprises determining the motion compensation for the entire current picture based at least in part on a reference type of the synthesized reference picture, wherein the reference type comprises at least one of super resolution or projected interpolation.

20. At least one non-transitory machine readable medium comprising a plurality of instructions that in response to being executed on a computing device, cause the computing device to:

determine, via a motion compensated filtering predictor module, a motion compensation prediction precision associated with at least a portion of a current picture being decoded, wherein the motion compensation prediction precision comprises at least one of a quarter pel precision or an eighth pel precision;

determine, via the motion compensated filtering predictor module, a second motion compensation prediction precision associated with the current picture, wherein the motion compensation prediction precision is based at least in part on a reference type of the decoded reference picture, wherein the second motion compensation prediction precision is based at least in part on a second reference type of a second decoded reference picture, wherein the reference type comprises an immediately previous decoded picture reference type and the motion compensation prediction precision comprises the eighth pel precision, wherein the second reference type comprises a non-immediately previous decoded picture reference type and the second motion compensation prediction precision comprises the quarter pel precision, and wherein determining the predicted partition of predicted pixel data comprises filtering the portion of the decoded reference picture with the eighth pel precision to determine a first predicted partition, filtering a second portion of the second decoded reference picture with the quarter pel precision to determine a second predicted partition, and combining the first predicted partition and the second predicted partition to generate the predicted partition, wherein combining the first predicted partition and the second predicted partition comprises a weighted average;

generate, via the motion compensated filtering predictor module, predicted pixel data of a predicted partition associated with a prediction partition of the current picture by filtering a portion of a decoded reference picture based at least in part on the motion compensation prediction precision; and code, via an entropy encoder, prediction partitioning indicators associated with the prediction partition and a motion vector indicating a positional difference between the prediction partition and an associated partition of the decoded reference picture into a bitstream.

21. The non-transitory machine readable medium of claim 20, further comprising instructions that in response to being executed on the computing device, cause the computing device to:

partition, via a prediction partitions generator module, the current picture into a plurality of prediction partitions comprising the prediction partition and a second prediction partition based on a partitioning technique comprising at least one of a bi-tree partitioning technique, a k-d tree partitioning technique, a codebook representation of a bi-tree partitioning technique, or a codebook representation of a k-d tree partitioning technique, wherein the portion of the current picture comprises the prediction partition;

determine, via the motion compensated filtering predictor module, a third motion compensation prediction precision associated with the second prediction partition, wherein the third motion compensation prediction precision comprises at least one of the quarter pel precision or the eighth pel precision, wherein determining the motion compensation prediction precision and the third motion compensation prediction precision comprises determining the motion compensation prediction precision based on a size of the prediction partition and the third motion compensation prediction precision based on a second size of the second prediction partition, wherein the motion compensation prediction precision comprises the quarter pel precision and the prediction partition comprises a small prediction partition, wherein the small prediction partition comprises a 4×4, 4×8, 8×4 or 8×8 pixel partition, wherein the third motion compensation prediction precision comprises the eighth pel precision and the second prediction partition comprises a large prediction partition, wherein the large prediction partition comprises a partition having a size comprising at least one of greater than 4×4 pixels or greater than 8×8 pixels, and wherein the motion compensation prediction precision indicators comprise a first indicator indicating the motion compensation prediction precision for the prediction partition comprises the quarter pel precision and a second indicator indicating the third motion compensation prediction precision for the second prediction partition comprises the eighth pel precision;

wherein determining the motion compensation prediction precision associated with at least the portion of the current picture being decoded comprises determining the motion compensation prediction precision for the entire current picture based on at least one of a picture type of the current picture or a location of the current picture in a picture hierarchy, wherein determining the motion compensation prediction precision associated with at least the portion of the current picture being decoded comprises determining the motion compensation prediction precision based on a size of the prediction partition and a prediction partition size-based motion compensation prediction precision rule based at least in part on a picture type of the current picture or a location of the current picture in a picture hierarchy, wherein determining the motion compensation prediction precision associated with at least the portion of the current picture being decoded comprises determining the motion compensation prediction precision based on a characteristic of the portion of the current picture, wherein the characteristic comprises a texture value of the portion of the current picture, and wherein, when the texture value is above a threshold, the motion compensation prediction precision comprises the quarter pel precision and, when the texture value is less than or equal to the threshold, the motion compensation prediction precision comprises the eighth pel precision, wherein the motion compensation prediction precision comprises the quarter pel precision and wherein filtering the portion of the decoded reference picture comprises determining a selected filter from a predefined codebook of a set of available filters, wherein the motion compensation prediction precision comprises the eighth pel precision and wherein filtering the portion of the decoded reference picture comprises determining the selected filter from the predefined codebook of the set of available filters, applying the selected filter to determine quarter pel locations of the eighth pel precision, and applying a fixed filter to determine remaining eighth pel locations of the eighth pel precision, wherein the portion of the decoded reference picture comprises a portion of a morphed reference picture generated based on a previously decoded reference picture and morphing parameters, wherein the morphing parameters comprise at least one of gain parameters, blur parameters, registration parameters, or dominant motion parameters, wherein the portion of the decoded reference picture comprises a portion of a synthesized reference picture generated based on a previously decoded reference picture and synthesizing parameters, wherein the synthesizing parameters comprise at least one super resolution parameters or projected interpolation parameters, wherein the portion of the decoded reference picture comprises the portion of the morphed reference picture generated based on a previously decoded reference picture and the morphing parameters, wherein determining the motion compensation prediction precision associated with at least the portion of the current picture being decoded comprises determining the motion compensation for the entire current picture based at least in part on a reference type of the morphed reference picture, wherein the reference type comprises at least one of gain, blur, registration, or dominant motion, and wherein the reference type comprises dominant motion and the motion compensation prediction precision comprises the quarter pel precision, wherein the portion of the decoded reference picture comprises the portion of the synthesized reference picture generated based on the previously decoded reference picture and the synthesizing parameters, wherein determining the motion compensation prediction precision associated with at least the portion of the current picture being decoded comprises determining the motion compensation for the entire current picture based at least in part on a reference type of the synthesized reference picture, wherein the reference type comprises at least one of super resolution or projected interpolation, and wherein the reference type comprises projected interpolation and the motion compensation prediction precision comprises the eighth pel precision, wherein the portion of the decoded reference picture comprises the portion of the morphed reference picture generated based on the previously decoded reference picture and the morphing parameters, wherein the portion of the current picture comprises the prediction partition, and wherein determining the motion compensation prediction precision associated the prediction partition comprises determining the motion compensation for the prediction partition based at least in part on the reference type of the morphed reference picture, wherein the decoded reference picture comprises the synthesized reference picture generated based on the previously decoded reference picture and the synthesizing parameters, wherein the portion of the current picture comprises the prediction partition, and wherein determining the motion compensation prediction precision associated the prediction partition comprises determining the motion compensation for the prediction partition based at least in part on the reference type of the synthesized reference picture, wherein the portion of the current picture comprises at least one of a tile, a super-fragment, a coding unit, a slice, or a region;

code, via the entropy encoder, motion compensation prediction precision indicators comprising a first indicator indicating whether the motion compensation prediction precision for the prediction partition comprises the quarter pel precision or the eighth pel precision and a second indicator indicating whether the second motion compensation prediction precision for the second prediction partition comprises the quarter pel precision or the eighth pel precision, the picture type of the current picture, the location of the current picture in the picture hierarchy, the morphing parameters, the synthesizing parameters, a selected filter indicator indicating the selected filter, and a prediction error data partition associated with the prediction partition;

transmit the bitstream;

receive the bitstream;

decode, via an adaptive entropy decoder, the bitstream to determine the prediction partitioning indicators, the motion vector, the motion compensation prediction precision indicators, the picture type of the current picture, the location of the current picture in the picture hierarchy, the morphing parameters, the synthesizing parameters, the selected filter indicator indicating the selected filter, and the prediction error data partition;

determine, via a motion compensated filtering predictor decoder module, a decoder motion compensation prediction precision associated with at least the portion of a current decoder picture being decoded, based on the motion compensation prediction precision indicators, wherein the motion compensation prediction precision comprises at least one of a quarter pel precision or an eighth pel precision;

determine, via the motion compensated filtering predictor module, decoded predicted pixel data of a decoded predicted partition for a decoded prediction partition of the current picture based at least in part on filtering a portion of a decoder decoded reference picture and the decoder motion compensation prediction precision;

add, via an adder, the decoded predicted pixel data of the decoded predicted partition to the prediction error data partition to generate a first reconstructed partition;

add, via a prediction partitions assembler module, the first reconstructed partition and a second reconstructed partition to generate a reconstructed tile or super-fragment;

apply, via a deblock filtering module, a deblock filter to the reconstructed tile or super-fragment to generate a first final reconstructed tile or super-fragment;

assemble, via the deblock filtering module the first final reconstructed tile or super-fragment and a second final reconstructed tile or super-fragment to generate a final reconstructed video frame; and transmit the final reconstructed video frame for presentment via a display device.

\* \* \* \* \*